US011464032B2

(12) United States Patent
Qu et al.

(10) Patent No.: US 11,464,032 B2
(45) **Date of Patent: *Oct. 4, 2022**

(54) SEQUENCE-BASED SIGNAL PROCESSING METHOD AND APPARATUS

(71) Applicant: Huawei Technologies Co., Ltd., Shenzhen (CN)

(72) Inventors: Bingyu Qu, Beijing (CN); Hao Sun, Xi'an (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/991,141

(22) Filed: Aug. 12, 2020

(65) Prior Publication Data

US 2021/0068131 A1 Mar. 4, 2021

Related U.S. Application Data

(63) Continuation of application No. 16/746,652, filed on Jan. 17, 2020, now Pat. No. 10,764,915, which is a (Continued)

(30) Foreign Application Priority Data

Sep. 8, 2017 (CN) ........................ 201710806190.X
Nov. 16, 2017 (CN) ........................ 201711140559.4

(51) Int. Cl.
*H04W 72/12* (2009.01)
*H04W 72/14* (2009.01)
(Continued)

(52) U.S. Cl.
CPC ....... *H04W 72/1268* (2013.01); *H04L 5/0048* (2013.01); *H04L 5/0053* (2013.01);
(Continued)

(58) Field of Classification Search
CPC ......... H04W 72/1268; H04W 72/1231; H04W 72/14; H04L 5/0048; H04L 5/0053;
(Continued)

(56) References Cited

U.S. PATENT DOCUMENTS 8,902,849 B2 * 12/2014 Noh .................. H04W 72/0446 370/330
9,124,407 B2 9/2015 Han et al.
(Continued)

FOREIGN PATENT DOCUMENTS

CN 101262255 A 9/2008
CN 101296513 A 10/2008
(Continued)

OTHER PUBLICATIONS

"3rd Generation Partnership Project; Technical Specification Group Radio Access Network; NR; Physical channels and modulation (Release 15)," 3GPP TS 38.211 V0.2. 2, total 47 pages, 3rd Generation Partnership Project, Valbonne, France (Sep. 2017).
(Continued)

*Primary Examiner* — Will W Lin
(74) *Attorney, Agent, or Firm* — Leydig, Voit & Mayer, Ltd.

(57) ABSTRACT

A sequence-based signal processing method and apparatus are provided. A sequence meeting a requirement for sending a signal by using a physical uplink control channel (PUCCH) is determined, where the sequence is a sequence $\{f_n\}$ consisting of N elements, $f_n$ is an element in the sequence $\{f_n\}$, and the determined sequence $\{f_n\}$ is a sequence meeting a preset condition; then, the N elements in the sequence $\{f_n\}$ are respectively mapped to N subcarriers to generate a first signal; and the first signal is sent. By using the determined sequence, when a signal is sent by using a PUCCH, a low sequence correlation can be maintained, and
(Continued)

Transmitter side

Receiver side

S101 Determine a sequence $\{f_n\}$ including N elements

S102 Respectively map the N elements in the sequence $\{f_n\}$ to N subcarriers to generate a first signal S103 Receive the first signal a relatively small peak-to-average power ratio (PAPR) value and cubic metric (CM) value can also be maintained, thereby meeting a requirement of a communication application environment in which a signal is sent by using a PUCCH.

18 Claims, 5 Drawing Sheets

Related U.S. Application Data continuation of application No. 16/519,922, filed on Jul. 23, 2019, now Pat. No. 10,568,120, which is a continuation of application No. 16/248,527, filed on Jan. 15, 2019, now Pat. No. 10,827,515, which is a continuation of application No. PCT/CN2018/096168, filed on Jul. 18, 2018.

(51) Int. Cl.
*H04L 5/00* (2006.01)
*H04L 27/26* (2006.01)

(52) U.S. Cl.
CPC .......... *H04L 27/26* (2013.01); *H04L 27/2613* (2013.01); *H04L 27/2614* (2013.01); *H04L 27/2628* (2013.01); *H04W 72/1231* (2013.01); *H04W 72/14* (2013.01); *H04L 5/0007* (2013.01)

(58) Field of Classification Search
CPC . H04L 27/26; H04L 27/2613; H04L 27/2614; H04L 27/2628; H04L 5/0007; H04L 5/0055; H04L 5/0008; H04L 5/0057; H04L 5/0094
See application file for complete search history.

(56) References Cited

U.S. PATENT DOCUMENTS

| | | | | |
|---|---|---|---|---|
| 2008/0123515 | A1* | 5/2008 | Boehlke | H04L 27/2626 370/206 |
| 2010/0062716 | A1 | 3/2010 | Nangia et al. | |
| 2010/0309958 | A1* | 12/2010 | Lakkis | H04J 13/0014 375/146 |
| 2011/0002322 | A1 | 1/2011 | Kim et al. | |
| 2011/0032926 | A1 | 2/2011 | Xia et al. | |
| 2011/0075760 | A1 | 3/2011 | Ogawa et al. | |
| 2011/0164489 | A1 | 7/2011 | Papasakellariou et al. | |
| 2012/0076100 | A1 | 3/2012 | Noh et al. | |
| 2012/0177145 | A1 | 7/2012 | Han et al. | |
| 2013/0114514 | A1 | 5/2013 | Nissila et al. | |
| 2013/0182692 | A1 | 7/2013 | Dai et al. | |
| 2014/0119323 | A1 | 5/2014 | Chung et al. | |
| 2014/0161067 | A1 | 6/2014 | Lee et al. | |
| 2014/0286255 | A1 | 9/2014 | Nam et al. | |
| 2015/0009971 | A1 | 1/2015 | Han et al. | |
| 2015/0172021 | A1 | 6/2015 | Noh et al. | |
| 2015/0222404 | A1 | 8/2015 | Jeong et al. | |
| 2017/0272287 | A1 | 9/2017 | Shen et al. | |
| 2017/0353213 | A1 | 12/2017 | Yuan et al. | |
| 2018/0054218 | A1 | 2/2018 | Qian et al. | |
| 2018/0115446 | A1 | 4/2018 | Adhikary et al. | |
| 2018/0176903 | A1 | 6/2018 | Lee et al. | |
| 2018/0248642 | A1 | 8/2018 | Si et al. | |
| 2019/0149377 | A1 | 5/2019 | Qu et al. | |
| 2019/0173704 | A1 | 6/2019 | Liang et al. | |

FOREIGN PATENT DOCUMENTS

| | | | |
|---|---|---|---|
| CN | 101515809 | A | 8/2009 |
| CN | 101766008 | A | 6/2010 |
| CN | 101772220 | A | 7/2010 |
| CN | 101877884 | A | 11/2010 |
| CN | 101958774 | A | 1/2011 |
| CN | 102088434 | A | 6/2011 |
| CN | 102437986 | A | 5/2012 |
| CN | 102461034 | A | 5/2012 |
| CN | 102474376 | A | 5/2012 |
| CN | 103973392 | A | 8/2014 |
| CN | 105680979 | A | 6/2016 |
| CN | 106792778 | A | 5/2017 |
| CN | 109039978 | A | 12/2018 |
| CN | 105409301 | B | 7/2019 |
| EP | 2104295 | A2 | 9/2009 |
| EP | 2421184 | A2 | 2/2012 |
| EP | 2293507 | B1 | 1/2014 |
| JP | 2010538569 | A | 12/2010 |
| JP | 2012527154 | A | 11/2012 |
| JP | 2021505056 | A | 2/2021 |
| KR | 20090026019 | A | 3/2009 |
| RU | 2467481 | C2 | 11/2012 |
| WO | 2017003047 | A1 | 1/2017 |

OTHER PUBLICATIONS

"Long PUCCH for up to 2 bits UCI," 3GPP TSG RAN WG1 Meeting #90, Prague, Czech Republic, R1-1712192, pp. 1-7, 3rd Generation Partnership Project, Valbonne, France (Aug. 21-25, 2017).

"Structure of 1-symbol PUCCH for up to 2 bits," 3GPP TSG RAN WG1 Meeting #89, Hangzhou, China, R1-1706950, pp.1-6, 3rd Generation Partnership Project, Valbonne, France (May 15-19, 2017).

"3rd Generation Partnership Project; Technical Specification Group Radio Access Network; NR; Physical channels and modulation (Release 15)," 3GPP TS 38.211 V1.0.0, pp. 1-37, 3rd Generation Partnership Project, Valbonne, France (Sep. 2017).

Gong, "New Designs for Signal Sets With Low Cross Correlation, Balance Property, and Large Linear Span: GF(p) Case," IEEE Transactions on Information Theory, vol. 48, No. 11, pp. 1-21, Institute of Electrical and Electronics Engineers, New York, New York (Nov. 2002).

"Design of short NR-PUCCH for up to 2 UCI bits," 3GPP TSG RAN WG1 Meeting #90, Prague, Czech Republic R1-1713174, pp. 1-6, 3rd Generation Partnership Project, Valbonne, France (Aug. 21-25, 2017).

"3rd Generation Partnership Project; Technical Specification Group Radio Access Network; NR; Multiplexing and channel coding (Release 15)," 3GPP TS 38.212 V1.0.0, pp. 1-28, 3rd Generation Partnership Project, Valbonne, France (Sep. 2017).

"3rd Generation Partnership Project; Technical Specification Group Radio Access Network; NR; Physical layer procedures for control (Release 15)," 3GPP TS 38.213 V1.0.0, pp. 1-16, 3rd Generation Partnership Project, Valbonne, France (Sep. 2017).

"3rd Generation Partnership Project; Technical Specification Group Radio Access Network; NR; Physical layer procedures for data (Release 15)," 3GPP TS 38.214 V1.0.0, pp. 1-32, 3rd Generation Partnership Project, Valbonne, France (Sep. 2017).

"3rd Generation Partnership Project; Technical Specification Group Radio Access Network; NR; Radio Resource Control (RRC); Protocol specification (Release 15)," 3GPP TS 38.331 V0.0.5, pp. 1-38, 3rd Generation Partnership Project, Valbonne, France (Aug. 2017).

Huawei, HiSilicon, "Short duration PUCCH for smaller payload sizes," 3GPP TSG RAN WG1 Meeting #88, Athens, Greece, R1-1701645, total 9 pages, 3rd Generation Partnership Project, Valbonne, France (Feb. 13-17, 2017).

Qualcomm Incorporated, "Remaining details of Uplink Reference Signal Design," 3GPP TSG RAN WG1 Meeting #84bis, Busan, Korea, R1-163016, total 7 pages, 3rd Generation Partnership Project, Valbonne, France (Apr. 11-15, 2016).

LG Electronics, "Remaining issues on uplink narrowband DM-RS," 3GPP TSG RAN WG1 Meeting #84bis, Busan, Korea, R1-162462, total 5 pages, 3rd Generation Partnership Project, Valbonne, France (Apr. 11-15, 2016).

(56) References Cited

OTHER PUBLICATIONS

Ericsson, "WF on UL Narrowband DMRS," 3GPP TSG RAN WG1#84bis, Busan, Korea, R1-163591, total 9 pages, 3rd Generation Partnership Project, Valbonne, France (Apr. 11-15, 2016).

* cited by examiner

SEQUENCE-BASED SIGNAL PROCESSING METHOD AND APPARATUS

CROSS-REFERENCE TO RELATED APPLICATIONS

This application is a continuation of International Application No. PCT/CN2018/096168, filed on Jul. 18, 2018, which claims priority to Chinese Patent Application No. 201710806190.X, filed on Sep. 8, 2017 and Chinese Patent Application No. 201711140559.4, filed on Nov. 16, 2017. All of the aforementioned patent applications are hereby incorporated by reference in their entireties.

TECHNICAL FIELD

Embodiments of this application relate to the field of communications technologies, and in particular, to a sequence-based signal processing method and apparatus.

BACKGROUND

In a Long Term Evolution (LTE) system, a physical uplink control channel (PUCCH) occupies, for sending uplink control information (UCI), 13 or 14 orthogonal frequency division multiplexing (OFDM) symbols or discrete Fourier transform spread orthogonal frequency division multiplexing (DFT-s-OFDM) symbols in one subframe. A PUCCH format 1a/1b is used to transmit response information of 1 or 2 bits, and the PUCCH format 1a/1b is sent in a sequence modulation manner. Generally, in the LTE system, to avoid interference between PUCCHs in two neighboring cells, sequences selected for the neighboring cells need to have a low correlation with each other. To expand coverage of a PUCCH, it is necessary to ensure that all sent signals have relatively small peak to average power ratio (PAPR) values and cubic metric (CM) values.

Currently, in the LTE system, there are 30 existing length-N root sequences $x_i$, i=0, 1, . . . , N−1, where N=12, 18, 24, or 6. The root sequence is used for sending UCI or a demodulation reference signal (DMRS) by using a PUCCH format 1a/1b in the LTE system. However, in preliminary design of the LTE system, optimization of the CM value and the sequence correlation is mainly considered for the 30 length-N root sequences. A relationship between the CM value and the PAPR value is: the PAPR may not be small if the CM value is small. Therefore, it cannot be ensured that PAPR values are small when it is ensured that all the 30 length-N root sequences have relatively small CM values and low correlations.

A length-24 CGS in LTE has a relatively large PAPR, and PAPR values are as follows:

3.4088, 3.7273, 3.5504, 3.5747, 3.6863, 3.5919, 3.9650, 3.8684, 4.2962, 3.2399, 4.1349, 2.9308, 3.3087, 4.0994, 3.7059, 3.7320, 4.0424, 4.0889, 3.0390, 3.4151, 3.9811, 4.2336, 4.1542, 3.5316, 2.8697, 2.6239, 3.2999, 3.8447, 3.8657, and 3.7505.

PAPRs of length-18 sequences in LTE are as follows: 3.3052, 3.0602, 3.2669, 3.7847, 3.5747, 3.6053, 3.3331, 3.1714, 3.1280, 3.7510, 2.9786, 3.4392, 3.0917, 3.6472, 3.4528, 3.4566, 3.8168, 3.1846, 3.0146, 3.4002, 3.1365, 3.7687, 3.1833, 3.9640, 3.9144, 3.4006, 3.4189, 3.6522, 2.8956, and 3.8309.

PAPRs of length-6 sequences in LTE are as follows: 3.5139, 3.5139, 4.1492, 3.0076, 4.0755, 4.2597, 4.1492, 4.1492, 2.9721, 3.1240, 4.2597, 4.2597, 4.0755, 3.0076, 4.0755, 2.8129, 2.9721, 4.1492, 3.0076, 3.0076, 4.1492, 2.8129, 3.0076, 3.5139, 3.5139, 4.0755, 4.1492, 4.1492, 4.0755, and 4.2597. It can be seen that not a few PAPR values are greater than 3 dB.

SUMMARY

In view of this, embodiments of this application provide a sequence-based signal processing method, a signal processing apparatus, and a communications system, to resolve a prior-art problem that 30 existing root sequences cannot meet a requirement of an existing communication application environment in which a signal is sent by using a PUCCH.

A first aspect of the embodiments of this application provides a sequence-based signal processing method, including: determining a sequence $\{f_n\}$ consisting of N elements, where $f_n$ is an element in the sequence $\{f_n\}$, the sequence $\{f_n\}$ is a sequence meeting a preset condition, the preset condition is $f_n=A\cdot x_n\cdot e^{2\pi\cdot j\cdot a\cdot n}$, a value of n ranges from 0 to N−1, A is a non-zero complex number, a is a real number, $j=\sqrt{-1}$, an element $x_n=u\cdot e^{\pi\cdot j\cdot s_n/4}$, is a non-zero complex number, a sequence $\{s_n\}$ consisting of elements $s_n$ is a sequence in a first sequence set or an equivalent sequence of a sequence in the first sequence set, or a sequence in a second sequence set or an equivalent sequence of a sequence in the second sequence set, or a sequence in a third sequence set or an equivalent sequence of a sequence in the third sequence set, and for the sequences in the first sequence set, the second sequence set, and the third sequence set herein, refer to descriptions in the specification; mapping the sequence $\{f_n\}$ to N subcarriers to generate a first signal; and sending the first signal.

In the foregoing solution, by using the determined sequence, when a signal is sent by using a PUCCH, a low sequence correlation can be maintained, and a relatively small PAPR value and CM value can also be maintained, thereby meeting a requirement of a communication application environment in which a signal is sent by using a PUCCH.

In a possible design, the mapping the sequence $\{f_n\}$ to N subcarriers includes: respectively mapping the N elements in the sequence $\{f_n\}$ to N consecutive subcarriers; or respectively mapping the N elements in the sequence $\{f_n\}$ to N equally spaced subcarriers.

In a possible design, the first signal is a reference signal, or the first signal is a signal used to carry communication information.

In a possible design, the sequence $\{s_n\}$ consisting of the elements $s_n$ is a sequence in a fourth sequence set or an equivalent sequence of a sequence in the fourth sequence set. For the sequence in the fourth sequence set herein, refer to descriptions in the specification.

In a possible design, a set including the sequence $\{s_n\}$ consisting of the elements $s_n$ includes some or all of sequences in a fifth sequence set or some or all of equivalent sequences of sequences in the fifth sequence set. For the sequence in the fifth sequence set herein, refer to descriptions in the specification.

In a possible design, the sequence $\{s_n\}$ consisting of the elements $s_n$ is a sequence in a sixth sequence set or an equivalent sequence of a sequence in the sixth sequence set. For the sequence in the sixth sequence set herein, refer to descriptions in the specification.

In a possible design, the equivalent sequence is $\{q_n\}$, the equivalent sequence $\{_q\}$ meets $q_n=s_n+u_n$ (mod 8) a sequence $\{u_n\}$ consisting of $u_n$ meets $u_n=f+g\cdot n \pmod 8$, $f\in\{0,2,4,6\}$, and $g\in\{0,2,4,6\}$.

A second aspect of the embodiments of this application provides a sequence-based signal processing method, and the signal processing method includes: receiving a first signal carried on N subcarriers; obtaining N elements in a sequence $\{f_n\}$, where the first signal is generated by mapping the sequence $\{f_n\}$ to the N subcarriers, $f_n$ is an element in the sequence $\{f_n\}$, the sequence $\{f_n\}$ is a sequence meeting a preset condition, the preset condition is $f_n = A \cdot x_n \cdot e^{2\pi \cdot j \cdot a \cdot n}$, a value of n ranges from 0 to N−1, A is a non-zero complex number, a is a real number, an element $x_n = u \cdot \exp(\pi \cdot j \cdot s_n / 4)$, u is a non-zero complex number, a sequence $\{s_n\}$ consisting of elements $s_n$ is a sequence in a first sequence set or an equivalent sequence of a sequence in the first sequence set, or a sequence in a second sequence set or an equivalent sequence of a sequence in the second sequence set, or a sequence in a third sequence set or an equivalent sequence of a sequence in the third sequence set, and for the sequences in the first sequence set, the second sequence set, and the third sequence set herein, refer to descriptions in the specification; and processing the first signal based on the N elements in the sequence $\{f_n\}$.

In the foregoing solution, by using the determined sequence, when a signal is sent by using a PUCCH, a low sequence correlation can be maintained, and a relatively small PAPR value and CM value can also be maintained, thereby meeting a requirement of a communication application environment in which a signal is sent by using a PUCCH.

In a possible design, the receiving a first signal carried on N subcarriers includes: obtaining the first signal on the N subcarriers on N consecutive subcarriers; or obtaining the first signal on the N subcarriers on N equally spaced subcarriers.

In a possible design, the first signal is a reference signal, or the first signal is a signal used to carry communication information.

In a possible design, the sequence $\{s_n\}$ consisting of the elements $s_n$ is a sequence in a fourth sequence set or an equivalent sequence of a sequence in the fourth sequence set. For the sequence in the fourth sequence set herein, refer to descriptions in the specification.

In a possible design, a set including the sequence $\{s_n\}$ consisting of the elements $s_n$ includes some or all of sequences in a fifth sequence set or some or all of equivalent sequences of sequences in the fifth sequence set. For the sequence in the fifth sequence set herein, refer to descriptions in the specification.

In a possible design, the sequence $\{s_n\}$ consisting of the elements $s_n$ is a sequence in a sixth sequence set or an equivalent sequence of a sequence in the sixth sequence set. For the sequence in the sixth sequence set herein, refer to descriptions in the specification.

In a possible design, the equivalent sequence is $\{q_n\}$, the equivalent sequence $\{q_n\}$ meets $q_n = s_n + u_n \pmod 8$, a sequence $\{u_n\}$ consisting of $u_n$ meets $u_n = f + g \cdot n \pmod 8$, $f \in \{0,2,4,6\}$, and $g \in \{0,2,4,6\}$.

A third aspect of the embodiments of this application provides a signal processing apparatus, the signal processing apparatus may be a communications device, or may be a chip in a communications device, and the communications device or the chip has a function of performing the sequence-based signal processing method according to any one of the first aspect and the possible designs of the first aspect. The function may be implemented by hardware, or may be implemented by hardware by executing corresponding software. The hardware or the software includes one or more units corresponding to the function.

The communications device includes a processing unit and a transceiver unit. The processing unit may be a processor, the transceiver unit may be a transceiver, and the transceiver includes a radio frequency circuit. Optionally, the communications device further includes a storage unit, and the storage unit may be, for example, a memory. When the communications device includes the storage unit, the storage unit is configured to store a computer executable instruction, the processing unit is connected to the storage unit, and the processing unit executes the computer executable instruction stored in the storage unit, so that the communications device performs the sequence-based signal processing method according to any one of the first aspect and the possible designs of the first aspect.

The chip includes a processing unit and a transceiver unit. The processing unit may be a processor, and the transceiver unit may be an input/output interface, a pin, a circuit, or the like in the chip. The processing unit may execute a computer executable instruction stored in a storage unit, so that the chip performs the sequence-based signal processing method according to any one of the first aspect and the possible designs of the first aspect. Optionally, the storage unit may be a storage unit (for example, a register or a buffer) in the chip, or the storage unit may be a storage unit (for example, a read-only memory (ROM)) or another type of static storage device (for example, a random access memory (RAM)) that may store static information and an instruction that is in the communications device and that is outside the chip.

The processor mentioned in the third aspect may be a central processing unit (CPU), a microprocessor, or an application-specific integrated circuit (ASIC), or may be one or more integrated circuits configured to control program execution of the sequence-based signal processing method according to any one of the first aspect and the possible designs of the first aspect.

A fourth aspect of the embodiments of this application provides a signal processing apparatus, the signal processing apparatus may be a communications device, or may be a chip in a communications device, and the communications device or the chip has a function of performing the sequence-based signal processing method according to any one of the second aspect and the possible designs of the second aspect. The function may be implemented by hardware, or may be implemented by hardware by executing corresponding software. The hardware or the software includes one or more units corresponding to the function.

The communications device includes a processing unit and a transceiver unit. The processing unit may be a processor, the transceiver unit may be a transceiver, and the transceiver includes a radio frequency circuit. Optionally, the communications device further includes a storage unit, and the storage unit may be, for example, a memory. When the communications device includes the storage unit, the storage unit is configured to store a computer executable instruction, the processing unit is connected to the storage unit, and the processing unit executes the computer executable instruction stored in the storage unit, so that the communications device performs the sequence-based signal processing method according to any one of the second aspect and the possible designs of the second aspect.

The chip includes a processing unit and a transceiver unit. The processing unit may be a processor, and the transceiver unit may be an input/output interface, a pin, a circuit, or the like in the chip. The processing unit may execute a computer executable instruction stored in a storage unit, so that the chip performs the sequence-based signal processing method according to any one of the second aspect and the possible designs of the second aspect. Optionally, the storage unit may be a storage unit (for example, a register or a buffer) in the chip, or the storage unit may be a storage unit (for example, a read-only memory (ROM)) or another type of static storage device (for example, a random access memory (RAM)) that may store static information and an instruction that is in the communications device and that is outside the chip.

The processor mentioned in the fourth aspect may be a central processing unit (CPU), a microprocessor, or an application-specific integrated circuit (ASIC), or may be one or more integrated circuits configured to control program execution of the sequence-based signal processing method according to any one of the second aspect and the possible designs of the second aspect.

A fifth aspect of the embodiments of this application provides a communications system, and the communications system includes the communications device provided in the third aspect of the embodiments of this application and the communications device provided in the fourth aspect of the embodiments of this application.

A sixth aspect of the embodiments of this application provides a computer readable storage medium, configured to store a computer instruction, and when the computer instruction runs on a computer, the computer performs the sequence-based signal processing method according to the first aspect or the second aspect of the embodiments of this application.

A seventh aspect of the embodiments of this application provides a computer program product including an instruction, and when the computer program product runs on a computer, the computer performs the sequence-based signal processing method according to the first aspect or the second aspect of the embodiments of this application.

An eighth aspect of the embodiments of this application provides a chip, and the chip includes an input interface, an output interface, at least one memory, and at least one processor. The at least one memory is configured to store code, the at least one processor is configured to execute the code in the memory, and when executing the code, the processor performs the sequence-based signal processing method according to the first aspect or the second aspect of the embodiments of this application.

According to the sequence-based signal processing method, the signal processing apparatus, the communications system, the computer readable storage medium, the computer program product, and the chip disclosed in the embodiments of this application, a sequence meeting a requirement for sending a signal by using a PUCCH is determined, where the sequence is the sequence $\{f_n\}$ consisting the N elements, $f_n$ is an element in the sequence $\{f_n\}$, and the determined sequence $\{f_n\}$ is a sequence meeting the preset condition; then, the N elements in the sequence $\{f_n\}$ are respectively mapped to the N subcarriers to generate the first signal; and the first signal is sent. By using the determined sequence, when a signal is sent by using a PUCCH, a low sequence correlation can be maintained, and a relatively small PAPR value and CM value can also be maintained, thereby meeting a requirement of a communication application environment in which a signal is sent by using a PUCCH.

DESCRIPTION OF EMBODIMENTS

Figure 1:
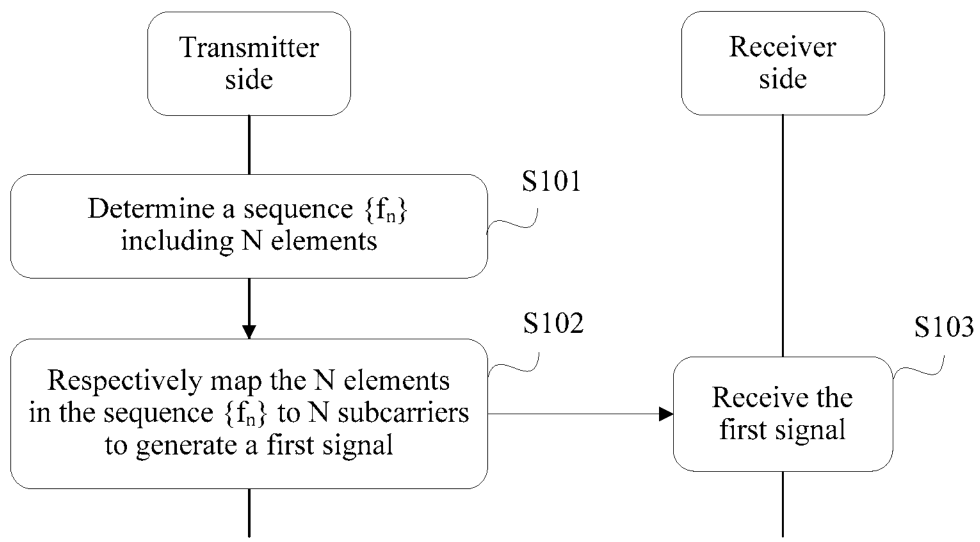
FIG. 1 is a schematic flowchart of a sequence-based signal sending processing method according to an embodiment of this application.

Embodiments of this application provide a sequence-based signal processing method, a related device, and a communications system. A sequence meeting a requirement for sending a signal by using a PUCCH is determined, so that when a signal is sent by using a PUCCH, a low sequence correlation can be maintained, and a relatively small PAPR value and CM value can also be maintained, thereby meeting a requirement of a communication application environment in which a signal is sent by using a PUCCH.

In the embodiments, the claims, and the accompanying drawings of this application, terms "first", "second", and the like are intended to distinguish between different objects but do not indicate a particular order. In addition, the terms "include" and "with" are not exclusive. For example, a process, a method, a system, a product, or a device including a series of steps or units is not limited to the listed steps or units, and may further include steps or units that are not listed.

Currently, in an LTE system, a 4G system, a 4.5G system, and a 5G system, sending UCI and a DMRS by using a PUCCH can be supported. To improve coverage performance of the PUCCH, the PUCCH is sent in a sequence modulation manner. To be specific, on all OFDM symbols for transmitting UCI, a to-be-sent signal is modulated onto a computer generated sequence (CGS). CGSs are screened to ensure that all sent signals have relatively small PAPR values and CM values, thereby expanding PUCCH coverage. The PUCCH is also used at a cell boundary. For a user at the cell boundary, a sequence correlation further needs to be considered during CGS screening.

For example, a first cell and a second cell are neighboring cells. If a first sequence used by the first cell is highly correlated with a second sequence used by the second cell, at a boundary of the first cell, a PUCCH sent by user equipment in the first cell may interfere with receiving a signal by a base station of the second cell by using a PUCCH. Consequently, PUCCH receiving performance is degraded. Therefore, sequences with a low correlation need to be determined during CGS screening.

To ensure that, in the LTE system, the 4G system, the 4.5G system, the 5G system, and even another communications system or a communication application environment with a higher requirement, when UCI and a DMRS are sent by using a PUCCH, relatively small PAPR values and CM values can be maintained, and a low sequence correlation can also be maintained, the embodiments of this application provide a specific implementation process of sequence-based signal processing. The process is described in detail in the following embodiments.

In the embodiments of this application, sequence-based signal processing is described mainly from a receiver side and a transmitter side in a communications system or a communication application environment. The receiver side may be a network device, and the transmitter side may be a terminal; or the receiver side may be a terminal, and the transmitter side may be a network side. In the following embodiments, an example in which the receiver side is a network device and the transmitter side is a terminal is used for description, but the present invention is not limited thereto.

The terminal in the embodiments of this application may be user equipment. The user equipment may be a wired device or may be a wireless device. The wireless device may be a handheld device with a wireless connection function, another processing device connected to a wireless modem, or a mobile terminal that communicates with one or more core networks by using a radio access network. For example, the wireless terminal may be a mobile phone, a computer, a tablet computer, a personal digital assistant (PDA), a mobile internet device (MID), a wearable device, or an e-book reader. For another example, the wireless terminal may be a portable, pocket-sized, handheld, computer built-in, or in-vehicle mobile device. For another example, the wireless terminal may be a mobile station or an access point.

The network device in the embodiments of this application may be a base station. The base station may include various forms of macro base stations, micro base stations, relay nodes, access point base station controllers, transmission and reception points, and the like. In systems using different radio access technologies, the base station may have different specific names.

As shown in FIG. 1, FIG. 1 is a schematic flowchart of a sequence-based signal processing method according to an embodiment of this application. The method includes the following steps.

S101. A terminal determines a sequence $\{f_n\}$ consisting of N elements. N is a positive integer greater than 1, for example, may be 6, 18, or 24.

Optionally, the determining a sequence $\{f_n\}$ consisting of N elements in S101 may be performed by the terminal after the terminal accesses a network. Alternatively, after the terminal accesses a network, a network device determines a sequence $\{x_n\}$ and configures the sequence $\{x_n\}$ for the terminal, and the terminal determines, based on the sequence $\{x_n\}$, the sequence $\{f_n\}$ consisting the N elements.

During specific implementation, $f_n$ is an element in the sequence $\{f_n\}$, and the determined sequence $\{f_n\}$ is a sequence meeting a preset condition. The preset condition is $f_n = A\cdot x_n\cdot e^{2\pi\cdot j\cdot a\cdot n}$. Herein n is an integer, and a value of n ranges from 0 to N−1. A is a non-zero complex number, a is a real number, $j=\sqrt{-1}$, $\exp(2\pi\cdot j\cdot a\cdot n)$ indicates $e^{2\pi\cdot j\cdot a\cdot n}$, an element $x_n = u\cdot\exp(\pi\cdot j\cdot s_n/4)$, and u is a non-zero complex number.

A sequence $\{s_n\}$ consisting of elements $s_n$ is a sequence in a first sequence set or an equivalent sequence of a sequence in the first sequence set, or a sequence in a second sequence set or an equivalent sequence of a sequence in the second sequence set, or a sequence in a third sequence set or an equivalent sequence of a sequence in the third sequence set.

A length of the sequence in the first sequence set is 18, and the sequence in the first sequence set includes a sequence in a sequence set 1A and/or a sequence in a sequence set 1B.

The sequence in the sequence set 1A includes some or all of the following 208 sequences, and PAPRs of $\{f_n\}$ corresponding to the sequences and equivalent sequences of the sequences are all less than 2.6 dB:

{3, −1, 1, −3, −3, 1, 3, 1, −3, −3, 1, −1, 3, −3, −3, −3, −3, −3}, {1, −1, 3, 1, 3, 1, −3, −3, 1, 1, 3, 3, −1, 1, −3, −1, −3, −3}, {−1, −1, 3, 1, 3, 3, −1, 3, −3, −1, 3, −1, −3, −1, 1, −1, −3, −3}, {−1, −3, −3, −3, 1, −3, −1, 1, −3, 1, −3, 3, −1, −1, 3, 3, −3, −3}, {−1, −3, 3, −1, 3, −1, 3, −3, 3, 3, 3, 3, 3, −3, −1, 1, −3, −3}, {−3, 1, 3, −3, 3, −1, 1, 3, 1, −1, 3, −3, 3, 1, −3, −3, −3, −3}, {3, 1, −3, 3, 1, −3, 1, 3, 1, 1, 3, −3, 1, 1, 1, −3, −3, −3}, {1, −1, 3, −3, 3, 1, −3, −3, 3, −3, −1, 3, −1, −1, −1, 1, −3, −3}, {3, −1, 3, −1, 3, −3, −3, 3, 3, −1, −1, −3, −1, −1, 3, 3, −3, −3}, {1, 1, −1, −1, −3, 1, −3, −3, 1, 3, −1, −3, 1, 3, 3, 3, −3, −3}, {3, 3, 1, 1, 1, −1, 3, −1, 1, −3, 1, 1, −3, 3, 1, 3, −3, −3}, {−1, −1, −3, 3, −3, −1, 3, 3, −1, 3, 1, −3, 1, 3, 3, 3, −3, −3}, {1, −3, 1, 3, −3, 1, −3, 3, −1, −1, −3, 3, −1, −1, −1, −3, −3, −3}, {1, 1, −1, 3, 3, 3, 1, −3, 3, −1, 1, −3, −1, −1, −1, 3, −3, −3}, {1, 3, 1, 3, −3, 1, −3, 3, 1, 3, 1, −1, 1, 3, 1, −1, −3, −3}, {3, 1, −3, 3, −1, 3, −3, 3, −3, −1, −1, 1, 3, −1, −1, −3, −3, −3}, {−1, 1, 1, −3, 3, −1, −3, −1, 3, −3, 3, −3, 3, 3, −1, −1, −3, −3}, {1, −3, −3, 3, 1, −3, 1, −3, −1, −3, −1, −1, −3, −1, 3, 3, −3, −3}, {−3, 1, 1, −1, 3, −1, 3, −3, −1, 1, 3, 1, −3, −3, −3, 3, −3, −3}, {1, −3, 1, −3, −3, 1, −3, 1, 1, −3, −3, 1, 1, −3, −3, −3, −3, −3}, {1, 3, −1, 3, −1, 1, −1, −1, −1, 3, 3, 3, 1, −3, 3, 1, −3, −3}, {3, 3, −1, 1, −1, −1, 3, −1, −3, 3, −1, 3, −3, 3, 1, 3, −3, −3}, {3, −3, −1, 3, −1, 3, −1, −3, −1, −1, −1, −1, −1, −3, 3, 1, −3, −3}, {3, −1, −1, −1, −3, 3, −3, −1, 1, −3, −1, 3, 1, −3, 3, 3, −3, −3}, {3, 1, 3, 3, 1, −3, 3, −3, 1, 3, 1, −1, −3, −1, 1, 1, −3, −3}, {−1, 3, 1, −3, −3, −1, 3, −3, 3, 1, −1, −1, 3, −3, 3, −3, −3, −3}, {−1, 3, −1, 1, −1, 1, 1, −3, 3, 1, −1, 1, 1, 3, −1, −1, −3, −3}, {−3, 1, 1, −3, 3, 3, −3, −1, −3, −1, 3, 1, −3, −1, −1, −3, −3, −3}, {3, 3, −3, 3, 1, 3, 3, −3, −1, 3, −1, 1, 3, 3, 1, −1, −3, −3}, {−1, 3, 1, 3, 3, −1, −3, −1, 3, 1, 3, −1, −1, −3, −3, −1, −3, −3}, {−1, 3, 3, −3, 1, −3, 1, −3, −3, 3, −1, −1, −1, −1, −1, 1, −3, −3}, {1, −3, 1, −1, −3, −1, −3, −1, 1, 1, 1, −1, −1, −3, 1, 1, −3, −3}, {3, 1, −3, 3, −3, −3, 1, 1, −3, −3, 1, 1, −1, 1, −3, −1, −3, −3}, {1, 1, 3, −1, −1, −1, 1, −3, −1, 3, 1, −3, 3, 3, 3, −1, −3, −3}, {1, −3, −1, −3, 1, −3, −3, 3, −3, −1, 1, 3, 3, 3, 3, 1, −3, −3}, {1, −3, 1, −1, −3, 1, −3, −1, 3, 3, −3, −1, 3, 3, 3, −3, −3, −3}, {1, 3, 3, −1, −3, 1, 1, 3, 1, 3, 1, 3, 1, 3, −1, −1, −3, −3}, {−1, 3, 1, 3, −3, −1, −3, 1, −1, −3, −3, 1, 1, −3, −1, −3, −3, −3}, {3, 3, −3, −1, −3, 3, −1, −1, 3, −1, 1, −3, 1, −1, −1, −1, −3, −3}, {−3, 3, −1, −1, −1, 1, 1, 3, −1, 3, −1, 1, 3, −1, −1, −1, −3, −3}, {1, −3, −1, −1, 3, −1, −1, −1, −1, −3, −3, 1, −1, 1, 3, 1, −3, −3}, {3, −3, 3, −3, −1, 3, 1, −3, 3, 1, 3, −3, 3, 1, −1, −1, −3, −3}, {−3, 3, −1, 1, −3, −1, −1, 3, −1, 1, −1, −1, −1, −1, 3, 3, −3, −3}, {1, 3, −3, −1, 3, −1, 3, −1, −3, −1, −1, 3, 1, −1, −3, −3, −3, −3}, {−1, −3, −3, 3, −1, 3, −1, 3, 3, −1, 3, 3, −1, 1, 3, 3, −3, −3}, {1, −3, 1, −3, −3, 1, −3, 1, 1, 1, 1, 1, −3, −3, 1, 1, −3, −3}, {−1, 1, −1, −1, 1, −3, −1, −3, 1, −1, 1, 3, −3, 3, 1, 1, −3, −3}, {−3, −1, 1, −3, 1, −3, 3, −3, 3, 3, 3, 1, −1, −3, 3, 3, −3, −3}, {1, −1, 3, −1, 3, 1, 3, 3, 3, −1, −1, −1, 1, −3, −1, 1, −3, −3}, {−1, 3, 1, −1, 1, 1, −3, 1, 3, 1, 3, −1, −1, 1, 1, 1, −3, −3}, {−3, 1, −3, −1, 3, −1, −1, 1, 3, −1, −1, 1, 1, 1, −1, −3, −3, −3}, {−1, −1, 1, 1, 1, 3, −1, 3, 1, −3, 1, 1, −3, −1, 1, −1, −3, −3}, {3, 1, 3, −1, 1, −3, 3, −3, −1, −3, −3, −1, 1, −1, −3, 3, −3, −3}, {1, 3, −3, −3, 1, −3, 1, −3, 1, 1, −3, 1, 1, 1, 1, −1, −3, −3}, {1, −1, −3, −1, −3, 3, −3, 1, −3, 3, 3, −1, 1, 3, 3, 3, −3, −3}, {−1, 1, 3, −3, 1, −3, 1, −1, 1, 1, −3, 3, 1, −1, −3, −3,

–3, –3}, {1, 1, –1, –1, –1, –3, 1, 3, –1, –3, 1, 1, –3, 1, 3, 3, –3, –3}, {3, –1, 3, 1, 3, 1, 1, –3, –1, 1, 3, 1, 1, –1, 3, 3, –3, –3}, {1, –1, 3, 3, 3, 3, –1, 3, 1, 1, –3, 1, 1, 3, –1, 1, –3, –3}, {–1, –3, –3, 3, –1, 3, –1, 3, 1, –1, 3, 3, –1, 1, 3, –3, –3, –3}, {–3, –1, 3, 1, –3, 3, 3, –1, 3, 1, 3, 3, 3, 3, –1, –1, –3, –3}, {–1, 3, –1, 3, –1, –3, –3, –1, –1, 3, 3, –3, 3, 3, –1, –1, –3, –3}, {1, 1, 3, 3, –3, 3, 1, –3, –1, 3, 1, –3, –1, 1, –1, –1, –3, –3}, {–1, 3, –1, 3, 3, 1, –3, –1, –1, 3, 3, –1, –1, –3, –3, –1, –3, –3}, {–3, 3, –3, 1, –3, 1, –1, –3, 3, 1, 1, –3, –1, 1, 3, –3, –3, –3}, {3, –1, 1, 3, –3, 1, 3, 1, –3, 3, 1, –1, 1, 1, 1, –3, –3, –3}, {3, 1, –3, 1, –3, –3, –3, 1, –3, –3, 1, –3, –1, 1, 1, 1, –3, –3}, {1, 1, –1, –1, –3, –1, 1, –3, 3, –1, 1, –3, 3, 1, 3, 3, –3, –3}, {–1, 3, –1, –1, 3, –1, –3, –1, 1, 3, 3, –3, 3, 3, 1, –1, –3, –3}, {–3, 3, –1, –3, 1, –3, –1, –3, –1, 1, –1, 1, 3, –3, –1, –1, –3, –3}, {–1, –1, –3, –1, 1, –1, –1, –3, 3, –1, 3, 1, –1, –1, 1, 3, –3, –3}, {–1, –1, 1, 3, –3, –3, 3, 1, –3, 1, –1, –3, –3, 3, –3, –1, –3, –3}, {3, –1, 1, 3, –1, –1, 1, –1, 1, 1, 3, 1, –3, 1, 1, –1, –3, –3}, {3, 3, –3, –1, –3, 3, –3, 1, –3, 3, 1, –3, 1, 1, –1, 1, –3, –3}, {1, 1, 1, –3, –3, 1, 1, –3, 1, 1, –3, 1, –3, 1, –3, –3, –3, –3}, {–1, 1, –3, –1, 1, 1, –1, –3, 3, 1, –3, 1, –1, 1, –3, –3, –3, –3}, {–1, 1, –3, –1, 3, –1, –3, –1, –3, 3, 3, 1, –1, 3, 3, –3, –3, –3}, {3, –1, 3, –3, 3, 3, –1, –1, 3, –3, –1, –1, 1, –1, –3, 3, –3, –3}, {1, –1, 3, 1, –1, 3, –3, –3, –3, –3, –1, 3, –3, 3, –1, 1, –3, –3}, {3, 1, –1, 1, –3, 1, –3, –3, –3, 1, 1, –3, 3, –3, –3, 3, –3, –3}, {3, 3, –1, 3, 1, 1, 1, –3, 1, –1, –1, 3, 3, 3, 1, 3, –3, –3}, {–1, –3, –1, –3, 3, –1, 1, –3, –1, 1, –1, –3, –1, 1, 3, 3, –3, –3}, {1, 3, –3, –1, –3, –3, 1, –1, –3, 1, –3, 1, –3, –1, –1, –1, –3, –3}, {–3, 1, –3, 1, –3, –3, 1, 1, –3, –3, 1, 1, 1, 1, –3, –3, –3, –3}, {3, 1, 1, –3, –1, 3, –3, 3, –1, –3, –1, –3, –1, –1, 3, 3, –3, –3}, {3, –1, 1, –1, 3, –3, 1, 1, –1, 1, 1, –1, 1, 1, –3, 3, –3, –3}, {–3, 1, 1, –3, 3, –1, 1, –1, –3, –1, 3, –3, 3, 3, –3, –3, –3, –3}, {1, –3, 1, –3, –3, –1, 1, –1, –1, 1, 3, 1, –1, –1, 1, –1, –3, –3}, {1, –3, –3, –1, 1, –3, 1, –3, 3, –3, 3, 3, –3, 3, –1, –1, –3, –3}, {–3, 1, 1, –1, 1, 3, 1, 1, –3, 3, –1, 3, –1, –1, –1, 3, –3, –3}, {1, 1, 3, 3, –3, 1, –3, –3, 1, –1, 3, –3, 1, –1, –1, –1, –3, –3}, {–3, 1, –1, 3, 3, 1, 3, –1, –3, –1, –3, –3, –3, –3, –1, 1, –3, –3}, {1, –3, 1, –1, 3, –3, –3, 3, 3, –3, 3, –3, –1, 3, 1, 1, –3, –3}, {1, 3, –1, –1, –1, –1, 3, –1, 1, 1, –3, 1, 1, –1, 3, 1, –3, –3}, {1, –3, 3, 3, –1, 3, 3, 3, 3, –3, –3, 1, 3, 1, –1, 1, –3, –3}, {–3, –1, 3, –3, 1, –3, 1, 1, 1, –3, 1, –1, 3, 1, 1, 1, –3, –3}, {–1, 3, 1, 3, –3, 1, –3, –3, 3, 1, –1, 1, –3, –3, –1, –3, –3, –3}, {–1, 1, –1, 3, 1, 1, –3, 3, –1, 1, 3, –3, 1, –1, –1, –1, –3, –3}, {1, 1, 3, 3, 3, –3, 1, –1, 3, –3, 1, 1, –3, 1, –1, –1, –3, –3}, {3, –3, –3, –1, 3, –1, 3, –1, –1, 3, –1, –1, 3, 1, –1, –1, –3, –3}, {–1, 3, 1, –3, –3, 1, –1, 1, –3, –3, 1, 3, –1, –3, –3, –3, –3, –3}, {1, –1, –3, 3, –1, 3, –1, 3, –3, 3, 3, –1, 1, 3, –3, –3, –3, –3}, {1, –3, 1, –3, 3, –1, 1, –1, –1, –3, –1, 1, –1, –1, 1, 1, –3, –3}, {–1, 1, –1, 3, –3, –1, –3, 3, –1, 3, 3, –3, 3, 3, 3, –1, –3, –3}, {–1, 3, 1, 3, –1, –3, 1, 1, 3, 1, 1, 3, 1, 1, –3, –1, –3, –3}, {3, –1, –1, 3, –1, –3, 1, 1, –1, 1, –1, –1, –1, 3, 1, 3, –3, –3}, {3, –1, 1, –1, –3, 3, –3, 1, 3, –3, –3, 1, 1, –3, 3, –3, –3, –3}, {1, –1, 3, 3, 1, –3, –3, –1, –3, –1, –3, 3, –3, –1, 1, –3, –3, –3}, {–1, 3, –3, 3, –1, –1, 3, –3, 3, 1, –1, 1, 1, –3, –3, 3, –3, –3}, {3, 1, –3, 3, 1, 1, 3, –3, –1, 1, –3, 1, 3, 1, –3, –3, –3, –3}, {3, –1, 1, –3, 3, 3, 1, 1, –1, 1, –1, 3, 1, –3, 3, 3, –3, –3}, {1, –1, –3, 3, –3, –3, 1, 3, –3, 1, –3, 1, –3, 3, 3, 3, –3, –3}, {–3, –1, –3, 1, –3, 1, 3, –3, –1, 1, 1, –3, 3, 1, –1, –3, –3, –3}, {–1, 3, 1, 3, –1, –3, 1, 1, –3, –3, 1, 3, 3, 1, –3, –3, –3, –3}, {3, –1, 1, –1, –3, 1, –3, –3, –1, 1, 3, 1, –3, –3, 3, –3, –3, –3}, {3, –1, 3, 3, –1, 3, –3, 3, 1, –1, –1, –3, –1, –1, 1, 3, –3, –3}, {–3, –1, 3, –3, 3, –3, 3, 3, 1, –1, –3, 1, –3, 3, 1, 3, –3, –3}, {–3, 3, –1, –3, –1, –3, –1, –1, 1, 3, –3, 1, –3, –1, 1, –1, –3, –3}, {–1, –1, –3, 3, –3, –3, –3, 1, 1, 3, –1, 3, 3, 3, –3, 1, –3, –3}, {3, –1, –3, 3, –1, –1, –1, –3, –1, 3, –3, 3, –3, 1, 1, 3, –3, –3}, {–1, 3, 3, –1, 3, –3, 1, 1, 3, 1, 3, 3, 3, –1, 1, –1, –3, –3}, {–1, 1, 3, 3, –1, –1, 3, –1, 3, 3, 1, –1, –3, –1, –3, –1, –3, –3}, {3, –1, 1, –3, 3, 3, 1, 1, 3, 3, –3, –1, 1, –1, –3, 1, –3, –3}, {–1, 1, 3, –1, 1, 3, 1, –3, 1, –1, 3, 1, 1, –1, –3, –3, –3, –3}, {3, –3, –3, –3, 1, –3, 3, 1, –3, 1, –3, –1, 3, 3, –1, –1, –3, –3}, {–3, 1, 1, 3, –1, 3, –1, –3, 3, 1, –1, 1, –3, –3, –3, –1, –3, –3}, {–1, 3, 1, –1, –3, 1, –1, 1, –3, –1, 1, 3, 1, 1, 1, –3, –3, –3}, {3, 3, –3, –1, –3, –3, –3, 1, 1, –1, 3, –1, –1, –1, –3, 1, –3, –3}, {–3, 1, 1, 3, 1, –1, 1, 1, –3, –1, 3, –1, 3, 3, 3, –1, –3, –3}, {–1, 1, –3, 1, –3, –3, –3, 1, –3, –3, 1, –3, 3, 1, 1, 1, –3, –3}, {–1, 1, –1, 1, 3, 1, 3, –1, –3, 3, 1, 1, –3, –1, –1, 3, –3, –3}, {–3, –1, 3, –3, 1, –3, 3, –3, 3, 1, 3, 1, –1, –3, 3, 3, –3, –3}, {–1, 3, 1, –1, 3, 3, 1, 3, 1, 1, –1, 1, –3, 1, 1, 3, –3, –3}, {3, –1, 1, –1, 3, –3, 1, 1, –3, –3, 1, –1, –1, 1, –3, –3, –3, –3}, {–3, 1, 1, –3, –3, 3, –1, –3, 1, –3, –1, 1, –1, 1, –1, –3, –3, –3}, {3, –1, 1, –1, –1, 3, –3, 3, –1, 1, –1, 3, 3, –3, –3, 3, –3, –3}, {3, –1, 3, –1, –1, 1, –3, 3, 3, –1, –1, 3, 3, –3, –3, 3, –3, –3}, {–1, 1, –1, 3, 1, –3, –1, –3, 3, –3, –3, 3, 1, 3, –3, –1, –3, –3}, {1, –1, –3, –3, 3, –3, 1, –3, 3, –1, 3, 3, –1, 1, 3, 3, –3, –3}, {1, –1, –3, –3, 1, –3, 1, –3, 1, 1, –3, 1, 1, 1, 1, 3, –3, –3}, {1, 3, –1, –1, 3, 3, –1, 3, –1, 1, –1, –3, 3, –3, 3, –3, –3, –3}, {–1, 3, –3, –1, 3, 3, 3, –3, 3, –1, –3, –1, –3, 1, 1, –1, –3, –3}, {1, 1, 1, –3, 1, –3, 1, –3, –3, 1, –3, –3, 1, 1, –3, –3, –3, –3}, {1, 3, –1, –3, –1, 1, –3, –3, –1, –3, 3, –1, 3, 3, 3, 1, –3, –3}, {–3, 1, 1, –3, –3, 1, 1, –3, 1, –3, 1, 1, 1, 1, –3, –3, –3, –3}, {3, 1, 3, –1, 3, –3, 1, –1, –3, –1, –3, 3, –1, –1, 1, 3, –3, –3}, {1, 3, –1, 1, 3, –1, –3, –3, –3, –3, 3, –1, –3, –1, 3, 1, –3, –3}, {1, 3, 3, 1, 3, 3, 1, 3, –1, 3, –1, –3, –3, 1, 1, 1, –3, –3}, {1, 3, 1, 3, –1, 3, 3, 3, 3, –1, –3, 1, 1, –1, –1, 1, –3, –3}, {–1, 1, –3, 1, 3, –3, –1, –3, 3, –3, 3, 1, –1, –3, 3, –3, –3, –3}, {3, 1, –1, –1, 3, 3, –1, 3, –1, –1, 1, 3, –3, 3, –3, 3, –3, –3}, {1, 3, –1, 1, –1, 1, –3, –3, 1, 1, –1, –1, 3, 1, –3, 3, –3, –3}, {3, 3, 1, –1, –3, –3, –1, 1, –3, 1, 3, –3, –3, –1, –3, 3, –3, –3}, {1, –1, 1, –1, 3, –1, –1, –1, –1, 3, –3, 1, 1, 3, 3, 1, –3, –3}, {3, –1, 1, –3, –3, 3, –1, –3, –1, 1, 3, 3, –1, –3, –1, –3, –3, –3}, {–3, 1, 1, –3, –1, 3, 1, 3, –3, 3, –1, –3, –1, –1, –3, –3, –3, –3}, {–3, 1, –3, 3, –1, 3, 3, 1, –1, 3, 3, 1, 1, 1, 3, –3, –3, –3}, {–1, –3, –3, 3, 1, 3, –1, 3, –3, –1, 1, –3, 3, –1, –3, 3, –3, –3}, {–1, 3, –1, –3, –1, –1, 3, 3, –1, –3, 3, 3, 1, 3, –3, –1, –3, –3}, {1, –3, 1, 3, –1, –3, –3, –1, –1, –3, –1, –3, 3, –1, 1, 1, –3, –3}, {–1, –1, –3, 3, –3, –1, –3, 1, –3, –1, 1, –3, 1, 1, 3, 1, –3, –3}, {3, 1, –3, 1, –1, –3, 3, –3, –1, –3, –1, 1, 3, –3, –1, –3, –3, –3}, {1, –1, 1, –1, –3, 1, –3, –1, 1, –1, 1, 3, 1, –1, 1, 3, –3, –3}, {1, –1, –3, 3, –1, 3, 1, –3, –1, 3, –3, –1, 3, 3, 3, –3, –3, –3}, {–1, 1, –3, –1, 1, –3, 1, –1, 1, 1, –1, –3, 1, 1, 1, –3, –3, –3}, {–1, 3, 1, –3, –1, –1, 1, 1, –1, –1, –3, 3, 1, 3, –3, 1, –3, –3}, {3, 1, 3, –1, 1, 1, –3, –1, 3, 1, –1, –3, 1, 3, 3, 3, –3, –3}, {–3, 3, 1, –3, 1, –3, –1, –3, –1, –1, –1, 1, 3, –3, –1, –1, –3, –3}, {3, –1, –1, –3, 1, –3, 1, –3, –3, –1, 3, 3, 3, 3, 3, 1, –3, –3}, {1, –1, 3, 3, –1, –1, 3, –1, 3, 1, 3, –3, –1, –3, –1, –3, –3, –3}, {–1, 1, –3, –1, –3, –3, 1, 1, –3, –3, 1, 1, 3, 1, –3, 3, –3, –3}, {–1, 1, 3, 1, –3, 1, –3, –3, –3, 1, 1, –3, –1, –3, –3, –1, –3, –3}, {–1, 3, 3, 3, –3, –1, –3, 3, 1, –3, 3, –1, 1, –3, –1, –1, –3, –3}, {3, 1, 3, –1, –3, 3, –3, –1, 3, –1, –1, –3, –1, –1, –1, 3, –3, –3}, {1, 3, –1, –1, 1, –3, –3, 3, –3, 3, –3, –1, –3, 3, 1, –3, –3, –3}, {1, 3, –3, –3, –1, –3, 1, –3, –1, 3, –1, –1, 3, 1, –1, –1, –3, –3}, {1, –3, 1, –3, –3, 3, 1, 3, 3, 1, –1, 1, 3, 3, 1, 3, –3, –3}, {1, 1, 1, 1, –3, –3, 1, 1, –3, 1, 1, –3, 1, –3, 1, –3, –3, –3}, {3, 1, –1, 3, 1, –1, 1, –3, 1, 3, –1, 1, 1, 3, –3, –3, –3, –3}, {–3, 1, –3, 1, –3, 1, 1, –3, 1, 1, –3, –3, –3, –3, 1, 1, –3, –3}, {–3, 1, 3, –1, –1, 1, –1, 3, –3, 3, –3, –3, –3, –3, 3, 1, –3, –3}, {1, –1, –1, 1, –1, –1, 1, –1, 3, –1, 3, –3, –3, 1, 1, 1, –3, –3}, {1, 3, –3, –1, 3, –1, 1, –3, 3, –1, –3, 3, –1, –1, –1, –3, –3, –3}, {–3, –1, 3, 3, 3, 1, 1, –1, 3, –1, 3, 1, –1, 3, 3, 3, –3, –3}, {–3, 3, –1, –3, 1, –3, 1, 1, 1, –3, 1, 3, –1, 1, 1, 1, –3, –3}, {1, –1, –1, 3, –3, 1, 1, –1, 1, –1, 1, –1, 1, –1, 3, 3, –3, –3}, {–3, –3, 1, 1, –3, –3, –3, –3, 1, 1, –3, 1, 1, –3, 1, –3, 1, –3}, {1, –3, 1,

–3, –1, 3, 1, 3, 3, –3, 3, 1, 3, 3, 1, 1, –3, –3}, {1, –3, 3, –3, 1, –3, –3, –1, –3, 3, 1, –1, –1, –1, –1, 1, –3, –3}, {3, –3, 1, 3, 1, 3, –3, –1, –1, 3, 1, –1, 1, –3, 3, –1, –3, –3}, {3, 1, –1, –3, 1, –3, 1, 3, 1, 1, –3, –1, 1, 3, –3, –3, –3, –3}, {3, –3, –3, –1, 3, –1, 3, –1, 1, 3, –1, –1, 3, 1, –1, –3, –3, –3}, {–3, 1, 1, –3, –1, –1, –3, 3, –3, 3, –1, 1, –3, 3, 3, –3, –3, –3}, {1, 1, 1, 1, –3, 1, –3, 1, –3, –3, 1, –3, –3, 1, 1, –3, –3, –3}, {3, –1, 3, –3, 3, –1, –1, –3, –1, 1, 3, –1, –1, –1, –3, 3, –3, –3}, {–3, 1, –1, –3, –1, 3, 1, –1, 1, 3, –1, –3, –1, 1, –3, –3, –3, –3}, {3, –1, 1, 3, 1, 1, –3, 1, –1, 1, –1, 3, 3, 1, 1, 1, –3, –3}, {–3, 1, 1, –3, –3, –1, 3, –3, 1, –3, 3, 1, 3, 1, 3, –3, –3, –3}, {3, 1, 3, 1, –1, 1, –1, 3, –3, –1, 1, 1, –3, 3, 3, –1, –3, –3}, {–1, 3, 1, –3, –1, –1, 1, 1, 3, 1, 3, –1, 1, –3, –1, –1, –3, –3}, {1, –3, 1, 3, –3, 3, –3, 3, 1, 1, 1, 3, 3, –3, 1, 1, –3, –3}, {–1, –1, 3, –1, 1, 1, 1, –3, 1, 3, 3, –1, –1, –1, 1, –1, –3, –3}, {1, 3, –3, 3, –3, –1, –3, 1, –3, –1, –1, 3, 1, –1, –1, –1, –3, –3}, {–1, –3, 1, –1, 1, –1, –3, 3, 3, –1, 1, 3, 1, –3, –1, 3, –3, –3}, {3, –3, –3, –1, 1, –1, 3, –1, –3, 3, 1, –3, –1, 3, –3, –1, –3, –3}, {3, –1, –3, –1, 3, 3, –1, –3, –1, 1, 3, 1, 1, –3, –3, –1, –3, –3}, {–1, 3, –1, –3, –1, 3, 3, –3, 3, 1, –1, 3, 3, 3, –3, –1, –3, –3}, and {–1, 1, –1, 3, –1, –3, 1, 3, –3, 3, –3, –1, 3, 3, 1, –1, –3, –3}.

The sequence in the sequence set 1B includes some or all of the following 388 sequences, and PAPRs of sequences $\{f_n\}$ corresponding to the sequences and equivalent sequences of the sequences are all greater than 2.6 dB but less than 2.7 dB:

{1, –1, 1, –3, 3, –3, 3, 1, –3, –3, –1, –1, –1, 3, –3, –1, –3, –3}, {1, 3, 1, –3, 3, 1, 3, –1, 3, 3, 1, 1, 1, –1, 1, 3, –3, –3}, {1, –3, 3, –1, 1, –1, –3, –3, 1, 3, –3, 1, –3, –3, 3, –3, –3, –3}, {3, –1, –3, –3, 1, –3, 3, 3, 1, 1, –3, –1, 3, 3, –3, 3, –3, –3}, {3, 1, –3, 1, –3, –1, 1, 3, –1, 3, 3, –3, –3, –1, –1, –3, –3, –3}, {–1, 1, 1, –3, 1, –1, 1, 3, –1, 1, –1, –1, –1, 3, 3, 1, –3, –3}, {–1, –1, –3, 1, 3, 1, –3, 1, 3, –1, –1, 3, 1, –3, –3, –1, –3, –3}, {1, 3, –1, 1, –3, 3, –3, 3, 1, –3, –3, –1, –1, –3, 3, 3, –3, –3}, {–1, 3, –1, –1, –3, 1, –3, –1, –1, 3, –3, 1, 1, 1, 1, 3, –3, –3}, {–3, 1, –3, 3, 1, –1, 3, –3, 1, 3, –3, –3, –1, –1, –1, –3, –3, –3}, {3, 1, 3, 1, –3, 3, 1, 3, 3, 3, –1, –1, 1, 3, –1, 1, –3, –3}, {1, 3, –3, 3, –1, 3, –3, 3, –1, –3, 3, –1, 1, 1, –1, –3, –3, –3}, {3, 1, –1, 3, –1, 1, 1, –3, –1, 3, –3, –3, 3, 1, 3, –3, –3, –3}, {–1, –3, 1, –1, 3, –1, 1, 1, 1, –1, 1, –3, –1, 3, 1, 1, –3, –3}, {3, –1, 1, –3, –3, 1, –3, 1, –1, 1, –1, –1, –1, –1, 3, 3, –3, –3}, {–1, –3, 1, –1, 3, –1, 1, 1, 3, –3, –1, –3, –1, 1, –1, –1, –3, –3}, {–1, 1, –3, 1, –3, 3, 1, –1, 3, –1, –1, –3, –3, 3, 3, –3, –3, –3}, {–1, 1, –3, 1, 3, 3, 3, 1, –1, –3, 3, –1, –3, –1, –1, 3, –3, –3}, {–3, 1, –1, 3, 1, –1, 1, 3, 3, –3, 1, –3, –1, 1, –1, –1, –3, –3}, {3, 3, –3, 3, 3, –3, 3, –1, –1, 3, –3, 1, –3, 1, –1, 1, –3, –3}, {–3, –1, 3, –3, 3, 3, 1, –3, 1, 1, 1, –3, 3, 1, 3, 3, –3, –3}, {3, –1, –3, 1, –1, –3, –1, 1, 3, –1, 1, –1, 1, 1, 1, –1, –3, –3}, {3, 1, –1, 1, 1, –1, –1, 3, –3, 1, 3, –1, –3, 1, 3, 3, –3, –3}, {3, –1, 3, –3, 1, 3, –3, 3, 1, 3, 1, –1, 1, 3, 3, –3, –3, –3}, {3, 1, –3, 3, –3, 3, –3, 3, –3, 1, 3, –3, 1, 1, 1, 1, –3, –3}, {3, –3, 1, –3, 1, 3, 1, –1, 3, 1, –3, 3, 3, –3, –1, –1, –3, –3}, {3, –3, 1, 3, –1, 3, 1, 1, –1, –3, 3, –3, 3, 1, 3, 3, –3, –3}, {–3, –1, 1, –3, –1, 1, 1, 1, –3, 3, –1, –3, 1, –1, –1, –3, –3, –3}, {3, –1, –3, –3, 3, 1, –3, 3, –1, –1, 1, 3, –3, 1, –3, –3, –3, –3}, {3, –1, 3, –1, 3, 1, –1, 1, 3, –1, –1, –3, 3, 3, 3, 3, –3, –3}, {1, 3, 1, 3, –3, –1, –3, 1, –3, 3, –1, –1, 3, 3, –1, –1, –3, –3}, {3, –1, 3, 1, –3, 3, 3, –3, –3, 1, –1, –1, –3, –1, 1, –3, –3, –3}, {–1, –1, –3, 3, 3, –1, 3, –3, 1, 3, 3, –1, 3, 1, –3, 3, –3, –3}, {–3, 1, 3, –1, 1, 3, 1, –1, –1, –3, 1, –3, 3, 1, 3, 3, –3, –3}, {–1, –1, 1, 1, –3, 3, –3, –1, 3, –3, –1, –3, 3, –3, 1, –1, –3, –3}, {–3, 3, 3, 1, 3, 1, –3, 1, 1, –3, –1, 3, 1, 1, 3, 3, –3, –3}, {–1, 1, –3, 1, 1, 3, –3, 3, –1, –3, 3, –1, –1, –1, –1, –3, –3, –3}, {–3, 1, –3, –3, –1, 3, –3, –3, –3, –1, 3, 1, 3, 3, 1, –1, –3, –3}, {1, –1, 3, –3, –1, –1, 3, –3, 1, –3, 3, 3, 3, 1, –3, –3, –3, –3}, {1, 3, –3, 3, –1, –3, –3, 1, –1, –1, 1, –3, 1, –1, –1, –1, –3, –3}, {3, 3, 1, 1, –3, –1, –3, 3, –1, –3, 3, –3, –1, –3, 1, 3, –3, –3}, {3, –1, –1, 1, 3, 1, –3, 3, –3, –1, 3, –3, 1, –1, –1, –3, –3, –3}, {1, 3, 3, –3, 3, –1, 3, 3, –1, 3, 3, 1, 3, 1, 1, –1, –3, –3}, {1, 1, 3, –3, –3, 3, –1, 1, –1, –3, –1, 3, –1, –3, –3, 1, –3, –3}, {1, –1, 3, 3, –3, –3, –1, 1, –3, –1, 3, –1, 1, –1, –3, –1, –3, –3}, {–1, –1, –3, –1, –1, 3, 1, –3, –3, 1, 3, –1, 3, 1, 3, –1, –3, –3}, {3, 1, –3, 1, –1, 3, 3, –1, –3, –1, 1, –1, 1, 3, –1, –1, –3, –3}, {–1, 1, 1, 3, 3, –3, 3, 1, –3, 1, 3, –1, 3, 1, –1, –1, –3, –3}, {3, –1, 1, –1, 1, 3, –3, –3, 1, –3, –3, –3, 1, –1, –3, –1, –3, –3}, {1, –3, –1, 3, –1, –3, 3, 3, –3, –1, –1, –3, –1, –1, 1, –1, –3, –3}, {1, –3, 3, –1, –3, –1, 1, 1, 1, 3, –1, 1, 3, 1, –1, –1, –3, –3}, {–3, 3, 1, 3, 3, –3, –1, –1, 3, 1, –1, 3, –3, 1, –3, –1, –3, –3}, {3, –1, 3, 3, –3, 1, –3, 3, 3, –1, –3, 1, 1, 1, 1, –1, –3, –3}, {–1, –3, 3, 3, –3, 3, –1, 1, 3, 1, –3, 1, 3, 3, –1, 3, –3, –3}, {–1, 1, –3, 3, –1, 1, –1, –3, 3, 1, –1, 1, 1, –3, –3, –3, –3, –3}, {3, –3, –3, –1, –1, 3, –1, –3, –1, 1, –1, –3, 1, 3, –1, –1, –3, –3}, {–1, 3, –3, –3, 1, –3, –1, –1, 1, 1, –3, 3, –1, –1, –3, –1, –3, –3}, {1, 3, 3, 1, 3, 3, –1, –3, 1, –3, 1, –3, –1, 1, 1, –1, –3, –3}, {–1, 3, 3, –1, –1, 1, –3, 1, –3, –1, –3, 3, 3, 3, 3, 3, –3, –3}, {1, –1, –1, 1, –1, –1, 3, –3, 1, –3, 1, –3, 3, 1, 1, 3, –3, –3}, {–3, 1, –3, –1, –3, 1, 1, 3, –3, –1, 3, 1, –1, –3, –3, –3, –3, –3}, {1, 3, –1, 1, –3, 1, –1, 3, –1, –3, 1, 1, 3, 3, 1, –1, –3, –3}, {1, 3, 3, 1, –1, 1, 1, –3, –1, 3, –1, 1, 3, 3, 3, 1, –3, –3}, {–1, 3, –3, –3, –1, 1, –3, –1, 3, 3, 1, –1, –3, 1, –3, –3, –3, –3}, {–3, 1, 3, 1, –1, –1, 1, –1, –3, 1, –1, –1, 1, 3, 1, 3, –3, –3}, {–3, 3, –1, 1, 3, 1, –3, –1, 1, 1, –3, 1, 3, 3, –1, –3, –3, –3}, {1, 3, –3, 1, –3, –3, –3, –1, 3, 1, –3, 3, –3, 1, –1, –3, –3, –3}, {3, 1, 1, –1, –1, –3, –1, 1, –3, 1, –1, 3, –1, 1, 3, 3, –3, –3}, {–3, 1, 3, –3, –1, 3, –1, –3, 3, 1, –1, –1, –1, –3, 3, –3, –3, –3}, {3, –1, 3, 1, –3, 3, 3, –3, –3, –1, 1, –1, –1, –3, –1, 1, –3, –3}, {–1, 3, –1, 1, –3, –1, –1, –3, –3, 3, 1, 3, 3, –3, 3, 1, –3, –3}, {3, 1, 1, 1, –3, –3, –1, 3, –3, –3, –1, –3, –1, 1, –3, 1, –3, –3}, {1, 3, –3, 1, 3, –3, –1, –3, 1, –3, 3, –1, –1, –1, 1, –1, –3, –3}, {1, –3, 3, 1, 3, 1, –1, 3, –3, –3, –1, 1, –1, 3, –3, –1, –3, –3}, {1, –3, –1, –3, –1, 3, 1, 3, 3, –3, 3, –1, –3, 3, –1, –1, –3, –3}, {–3, 1, 3, –1, –1, 1, 3, 3, –3, 3, –1, –3, –1, –1, –3, –1, –3, –3}, {–3, –1, 1, –1, 3, –3, 3, –1, –3, 3, –1, 3, 3, –1, –1, –3, –3, –3}, {–1, 3, 3, –3, 1, 1, –3, –3, 3, –1, 1, –3, 1, –3, –3, –3, –3, –3}, {1, –1, 3, 3, –3, 1, –3, 3, 3, –3, –3, 1, 3, –1, 1, –1, –3, –3}, {1, 3, –1, 3, –3, 1, –1, –3, –3, 3, 1, 3, 3, –1, –3, 3, –3, –3}, {–1, 3, 3, –1, –1, 1, –3, 3, 1, –3, 1, 3, –1, –3, –3, –3, –3, –3}, {–3, 1, –3, 1, 3, –3, 3, –1, –1, –1, –1, –1, –3, –3, 1, 1, –3, –3}, {–3, 3, –1, –3, –3, –3, 3, –1, 1, –3, –1, 3, –1, –1, 1, 3, –3, –3}, {–3, 1, –1, –3, 3, –1, 3, –3, –1, 1, 3, 3, 3, –3, –1, –3, –3, –3}, {–3, –1, 3, –3, –3, –3, –1, 3, 1, –3, 3, –1, 3, 3, 1, –1, –3, –3}, {–3, 1, –3, –1, 1, 3, –1, –3, 1, –1, –3, –3, 3, 3, 3, –3, –3, –3}, {1, –3, 1, 3, –1, 3, 1, –3, 3, 1, 1, –1, –1, 1, 3, –3, –3, –3}, {–1, 1, 1, –3, 1, –1, 1, 1, –3, 1, 3, –1, 3, 1, 1, –1, –3, –3}, {–1, 3, –1, –1, –3, 3, –3, 1, 3, 3, –1, –3, 1, 3, 3, –3, –3, –3}, {–1, 3, 1, 3, 1, –3, –3, 3, 3, –1, 1, –3, –1, –1, –1, 3, –3, –3}, {–1, 1, 3, –3, 3, 3, –3, –1, –1, –3, 3, –1, –3, –1, 3, –1, –3, –3}, {–1, 3, 3, 1, –1, 1, –3, –1, –3, 3, –1, –3, 1, 3, 3, –3, –3, –3}, {3, –3, 1, 3, 3, 1, –3, 1, 3, 1, –1, –1, 3, 1, 3, 3, –3, –3}, {1, –1, 3, 3, –1, 3, –1, 1, 1, –1, 1, 3, 1, –1, 1, –3, –3, –3}, {–1, 3, 1, 1, –3, 3, –3, –3, 3, –1, 1, –1, –3, –1, –1, 1, –3, –3}, {–1, –3, –3, 3, –1, 1, 3, –1, 1, 3, –3, –3, –1, –3, 1, –3, –3, –3}, {1, –3, –1, 3, –3, 3, 1, 1, 1, –1, 3, 1, –1, 1, 3, 3, –3, –3}, {3, –3, –1, 3, –3, 3, –3, 3, 1, –3, 1, –1, 3, 3, 1, –3, –3, –3}, {1, 3, 1, –3, 3, –1, 3, –3, 3, –3, –1, 3, 3, 3, 1, 1, –3, –3}, {1, –3, 1, –1, 3, –1, 1, –3, –1, 1, 1, 3, 3, 1, –1, –3, –3, –3}, {3, –1, 1, –3, 1, –3, 3, 1, –3, –3, –1, 1, –1, –3, –3, –3, –3, –3}, {1, 1, –3, 1, 1, –1, 3, –1, 1, –1, –3, –1, 3, 1, 1, 3, –3, –3}, {–3, 1, 3, –3, –3, –3, –1, –3, 3, –3, –1, 3, 1, 3, 1, –1, –3, –3}, {–1, –3, 1, –1, 3, –1, –3, –3, 3, 3, 3, 1, 3, –3, 1, 3, –3, –3}, {–3, 3, –1, 1, 1, –1, 3, 3, –1, –3,

−3, 3, −3, −3, −1, 3, −3, −3}, {3, 1, 3, 3, −1, −3, 1, 3, −3, 1, 1, −1, −3, 3, −3, −1, −3, −3}, {−1, −3, 1, −1, 3, 1, 1, 3, −1, 1, −1, 1, 3, 3, −1, −1, −3, −3}, {−3, −3, 1, 3, −1, 1, −1, 3, 1, −3, 3, −1, −3, −3, 3, 3, −3, −3}, {−1, 1, −3, 1, −3, −1, −1, 1, −1, 3, 1, −1, 3, 1, −1, −1, −3, −3}, {3, 1, −1, 3, 1, −3, −1, 1, 3, −1, 1, −1, 1, 1, 1, −3, −3, −3}, {3, −1, −1, −3, 1, −1, 1, 3, 1, 1, 3, −1, −3, −1, −1, 3, −3, −3}, {3, −1, 3, 3, −3, −1, −3, 1, −1, −1, 3, −3, 1, −1, −1, −3, −3, −3}, {−3, −1, 3, −3, −3, −1, 3, −1, 3, −1, −1, 1, −1, 3, 1, −1, −3, −3}, {3, −3, 1, −3, 1, −1, 3, 3, −3, 3, 1, −1, −3, −3, −1, −1, −3, −3}, {−3, 1, −3, −1, −3, 1, 1, 1, 3, −3, −3, 1, −1, −3, −1, −1, −3, −3}, {−1, 1, 1, 3, −1, 3, −3, −3, −1, −3, 1, −3, −3, 1, −1, −1, −3, −3}, {1, −3, 1, −3, 3, −3, 1, 3, −3, −1, −1, −1, −1, −3, 3, 1, −3, −3}, {1, −3, −1, 1, −1, 1, 3, −1, −3, −3, 3, 1, 3, −1, −3, 3, −3, −3}, {3, −3, −3, 1, −1, −3, 1, −1, −1, −1, −3, −1, 3, −1, 1, −3, −3, −3}, {−3, 3, −3, 3, 3, −3, 1, 3, −1, −1, −3, 3, −1, 1, 3, 3, −3, −3}, {−3, 1, −3, 3, −1, −3, −1, 1, 3, 3, 1, −1, −3, −3, −1, −1, −3, −3}, {3, 1, −1, 1, −3, 1, −3, 1, 1, −3, 1, 1, 1, 1, 3, −3, −3}, {−1, 3, −1, −3, −3, 1, 3, −1, −1, −1, −3, −1, −1, 3, 3, 3, −3, −3}, {−1, 1, 3, −1, −1, 3, 1, 3, 1, −1, −1, 1, −1, 3, −3, 3, −3, −3}, {1, −3, 3, 1, −1, 3, −3, 3, 3, −3, 1, −3, −1, −1, 1, −3, −3, −3}, {1, −1, −3, 1, 1, 3, −3, −3, −3, −3, −3, 3, −3, 1, −3, 1, −3, −3}, {1, −3, 3, −3, 1, −1, 1, 1, 3, 3, 1, 1, 1, −3, −3, 1, −3, −3}, {−1, 1, 3, 1, 1, 3, 3, −1, −3, 1, −1, 3, −3, 1, −1, −1, −3, −3}, {−1, 1, 3, 1, 3, 1, 1, −3, 1, −3, 3, −1, −3, −3, 1, 1, −3, −3}, {−1, −3, −1, 1, 3, 1, −1, 1, 3, −3, 1, −1, −1, −1, 3, −1, −3, −3}, {3, −1, −3, 3, −1, 3, −3, 3, −3, −3, −1, 1, 3, 1, −1, −1, −3, −3}, {1, −1, −1, 3, 3, −3, 1, 1, −1, 3, −1, −1, 3, −3, 3, −3, −3, −3}, {−3, 1, 1, 3, −3, −1, 3, −1, 3, 1, −1, −3, −3, 3, −3, −3, −3, −3}, {−3, 3, 1, 3, −3, −3, 1, −1, 3, −1, 3, −3, 1, −3, −1, −1, −3, −3}, {1, −1, 1, 3, −3, 1, −3, −3, 1, −1, 3, −3, 1, −1, 1, −1, −3, −3}, {3, 3, −3, 1, −1, 1, −3, 1, −1, 3, 3, −1, 1, −3, −3, 3, −3, −3}, {−3, −1, −3, −1, −1, −3, 1, −1, 3, 3, −3, −1, 3, 1, −1, −1, −3, −3}, {1, 3, −1, −1, −3, 1, −3, −1, −1, −3, −3, 1, −1, 3, 1, 3, −3, −3}, {1, 3, −1, 1, −1, −3, −3, 3, −3, −3, −1, −3, −1, −1, 3, 1, −3, −3}, {3, 1, −3, 1, 1, −1, −3, −1, 3, −3, −1, 3, 3, 3, 3, −3, −3, −3}, {3, 1, 3, −1, 1, −1, −1, 3, 3, 1, 1, −3, 3, −1, 3, 3, −3, −3}, {−1, −3, −3, 3, 3, −1, 3, −3, 3, 1, 3, −3, 1, −1, 3, 3, −3, −3}, {−3, 1, 1, 1, −3, −3, 1, −3, −1, 3, 1, −3, 3, −3, −3, 3, −3, −3}, {3, 1, 1, 1, 3, −3, 3, 1, 3, −3, 1, −1, −1, 1, −3, 1, −3, −3}, {3, 1, −1, 3, 3, −1, 1, −1, 1, 3, 3, 1, 3, −1, −3, −1, −3, −3}, {−1, −1, 1, −1, 3, 1, −3, 1, 1, 3, −1, 1, −3, 1, 1, −1, −3, −3}, {3, −1, 1, −3, 3, 1, 1, −3, −3, 1, 1, 3, 1, −3, −3, −3, −3, −3}, {3, 1, 1, −3, 1, 3, 1, −1, 3, 1, 3, 3, 3, −1, −1, 1, −3, −3}, {1, 3, 1, 3, 1, 3, −1, −3, 1, −1, −3, 3, −3, 1, 1, −3, −3, −3}, {3, 3, −3, 3, 3, −1, 1, −3, −3, 1, −1, 3, −1, 1, −1, 3, −3, −3}, {3, 1, 1, −1, 3, −1, −3, −3, 3, −3, 1, −3, −3, 1, 3, 3, −3, −3}, {3, −3, 3, 1, −1, 1, 3, 1, −1, −3, 1, 3, 3, 3, −1, 3, −3, −3}, {−3, −3, 1, −1, 3, 1, 3, −1, 1, −3, −1, 3, −3, −3, −1, −1, −3, −3}, {−1, 1, −3, −1, −3, −1, −3, −1, −3, 1, −1, −3, 1, 1, 1, 1, −3, −3}, {−1, 3, −3, 1, −3, −3, 1, 3, 1, −3, 1, 1, 3, 3, −1, −3, −3, −3}, {−1, 1, −1, 3, −1, 3, −1, −1, 3, 1, 1, −3, 1, 1, −3, −3, −3, −3}, {1, −3, 1, 3, −1, −3, 1, 1, −3, −1, −3, 3, 1, 3, −3, −3, −3, −3}, {1, −3, 1, −3, −1, −3, 1, −1, −3, 3, 3, 3, 3, −3, −1, 1, −3, −3}, {−3, 1, −3, −1, 3, −1, −1, 1, −1, −1, −1, −3, −3, 1, 1, 3, −3, −3}, {1, 3, −3, −1, −3, −1, −3, 3, −3, 1, −1, 1, −1, −3, 3, 1, −3, −3}, {−1, −3, 1, 1, 3, 1, −3, −1, −3, 1, 3, −1, −1, −3, −3, −1, −3, −3}, {1, 3, −1, 3, −3, −1, 1, 3, 1, −1, 1, −1, −3, 3, 1, −3, −3, −3}, {1, 3, −3, 3, −3, −1, 3, 3, −1, −3, 1, −3, 1, −1, −1, −3, −3, −3}, {1, 3, −1, −1, 3, −1, 3, 1, 1, 3, 1, −1, 1, 3, 1, −3, −3, −3}, {−1, 3, −1, 3, 3, 3, 1, −1, −3, 1, 1, 3, 3, −3, −1, 3, −3, −3}, {−3, 1, −1, −3, −3, −3, 3, −3, −1, −3, 3, −1, 1, −1, 1, 3, −3, −3}, {−3, 1, −3, 3, −3, 1, 1, 1, −1, −3, −3, 1, 3, −3, 3, 3, −3, −3}, {−1, −3, 1, 3, −1, −3, 1, 1, −1, −1, 1, −1, 1, 1, −1, 3, −3, −3}, {3, −1, 3, −1, 3, 3, 3, 3, 1, 1, 3, −1, −1, 3, 3, 1, −3, −3}, {−3, 1, −1, 3, 3, −3, −1, 3, −1, 1, 3, 1, 3, 1, −1, −1, −3, −3}, {−3, −3, −1, −1, −3, −3, 3, −1, −3, 1, −1, 3, 1, 3, −1, 1, −3, −3}, {−1, −3, −3, 1, 3, −3, 1, 3, 3, 3, −3, 3, −1, 3, 1, −3, −3, −3}, {1, 3, 3, −1, 3, 3, 3, 3, −3, 3, −1, 3, 1, 1, −1, 1, −3, −3}, {1, 3, −1, −1, −3, −3, 3, 1, −3, 3, −1, 3, 1, 3, −3, 3, −3, −3}, {−3, 3, −1, −3, −3, 3, −1, 3, −1, 3, 3, 1, 3, −1, 1, 3, −3, −3}, {−1, 1, −1, −1, 3, −3, 1, −1, −3, 1, 1, 3, −3, −1, −3, 3, −3, −3}, {−1, 1, −1, 3, −3, −1, −1, −1, −3, 3, 3, 1, 3, 3, −1, 3, −3, −3}, {1, −3, 3, −3, 3, 3, −3, 3, −1, 1, −3, −1, −1, −3, 1, 1, −3, −3}, {1, −3, 3, −1, 3, −1, −3, −3, 1, −3, −3, 3, 1, 1, 3, −3, −3, −3}, {−3, −1, 3, 1, −1, 1, −3, 3, 1, 1, −3, 1, −1, −1, 3, −3, −3, −3}, {−3, −1, 3, 3, 3, 1, 3, −1, −1, 3, 1, 3, −3, −3, 3, −1, −3, −3}, {1, 3, −1, −3, 3, 3, −1, −3, 1, −3, −1, −1, −1, 1, −3, −3, −3, −3}, {−3, 1, 1, −1, −3, 3, −1, 3, −1, 1, 3, −3, −3, −1, −3, −3, −3, −3}, {1, −3, 3, −3, 3, −3, 1, 3, 1, 1, −3, 3, 3, −1, −1, 3, −3, −3}, {1, −3, 3, 1, −1, 1, −1, −1, 1, 3, 1, −1, 1, −3, 1, 3, −3, −3}, {−3, 1, 1, 1, −3, −3, 1, −3, 3, −1, 1, −3, −1, −3, −3, −1, −3, −3}, {1, −1, −3, −1, −3, 3, −1, −1, 3, −3, 1, −3, 1, 3, 3, −3, −3, −3}, {1, 1, −1, −3, −3, −1, 3, 1, 3, −3, 3, −1, 3, −3, −3, 1, −3, −3}, {−3, −1, −1, −3, 3, −3, −1, −1, −3, 1, −3, 1, 1, 1, −3, 1, −3, −3}, {3, 1, 3, −3, −1, 1, −3, −3, 3, 1, −1, −3, 1, −3, 3, −3, −3, −3}, {1, 3, 1, −3, −1, −3, −1, 1, −3, −3, 3, 3, 3, −1, −3, 3, −3, −3}, {3, −3, 1, −3, 1, 3, −1, −1, 1, −3, 3, 1, −3, −3, −3, 3, −3, −3}, {−1, −1, −3, 3, −1, 1, −1, −3, −1, 1, −3, −1, 1, −1, 3, 3, −3, −3}, {−1, 3, −3, −1, 3, −1, −3, −1, −3, −3, 3, 1, −1, 1, 3, 3, −3, −3}, {−1, 1, 1, 3, −3, 3, −1, 3, 1, −1, −3, −1, 3, −3, −1, −3, −3, −3}, {−1, −3, 1, −3, 1, −1, 1, 3, −1, 1, −3, −1, −1, −3, 3, 3, −3, −3}, {1, −3, −1, 1, −3, −3, 1, −1, 3, −1, −3, −1, 3, 3, 3, −3, −3, −3}, {−3, 1, −3, 1, −1, −3, −1, 3, 3, 3, 3, 3, −3, −3, 1, 1, −3, −3}, {1, −3, −1, −3, −1, −3, 1, −1, 1, 1, −3, −1, −1, 3, 3, −1, −3, −3}, {−3, −1, −1, 1, 1, −3, 3, −3, 1, −3, −3, 3, 1, −3, −1, −1, −3, −3}, {3, −1, −3, −1, −3, 3, 3, −1, 3, 3, 3, −1, 1, 3, −3, 3, −3, −3}, {−1, 3, −1, 3, −3, 1, −1, 3, 1, −1, −3, −3, 3, 3, −3, −3, −3, −3}, {1, 1, −1, 3, 3, 1, 3, −3, 1, −3, 1, −1, −3, −1, −1, 3, −3, −3}, {−3, 3, −1, 3, −3, 1, −3, −3, 3, 1, 1, −1, −1, 1, 3, 3, −3, −3}, {3, 1, −1, 1, −1, 1, 1, −3, 1, −3, −1, 3, −3, −3, 1, 1, −3, −3}, {−3, 3, 3, −1, −3, 3, −3, 1, −3, −1, −1, −3, −1, −1, 1, 3, −3, −3}, {3, −1, −1, −1, −3, −3, 1, 3, −1, 1, −3, 3, −1, −3, 3, 3, −3, −3}, {1, −1, 3, −1, −3, 3, 1, −1, 1, 3, 1, 3, −3, −1, 1, −3, −3, −3}, {3, 3, −3, −1, 3, 1, 3, −3, 3, 1, −3, 3, 1, 3, −1, −1, −3, −3}, {−1, −1, 1, 3, −1, 3, −3, 1, −1, −3, 1, −3, 3, −1, −1, −3, −3, −3}, {1, −1, 3, 1, −3, −1, −3, −1, 1, −3, −3, 3, 3, −3, −1, −1, −3, −3}, {3, 1, 1, −3, −3, −3, 1, 3, −3, 1, 3, −1, 3, 1, −3, 3, −3, −3}, {3, −1, −3, 1, −3, −3, 1, −1, 1, −3, 1, 1, −1, −1, 3, −3, −3, −3}, {−1, −3, 3, −1, −3, −1, −3, −1, 1, −3, 1, 3, −1, −1, 1, −3, −3, −3}, {1, −1, 3, −1, −3, 1, 3, −3, −3, −1, 1, −1, −1, 3, −3, −1, −3, −3}, {1, −3, −1, 1, 3, −1, −3, −1, −1, −3, 1, −3, 3, 3, 1, −3, −3, −3}, {3, −3, 1, −1, 3, −3, −3, −3, 1, −1, 1, −1, −1, 3, −3, −1, −3, −3}, {1, −3, 3, −3, 3, −1, 1, −1, −1, −3, −1, 3, −3, −1, 3, 3, −3, −3}, {−3, 1, 3, 3, −1, −1, 3, 1, 1, −3, 3, −3, −3, −1, −3, −1, −3, −3}, {3, 1, −3, 1, −1, −1, −1, 1, 3, −3, −1, 3, −3, 3, 3, −1, −3, −3}, {3, 1, 1, 1, −3, −1, 3, −3, 3, −1, −3, −3, −1, 1, −3, 3, −3, −3}, {−3, 1, −3, 3, 1, −3, −1, 1, −3, −3, −3, 1, 3, 3, 3, 3, −3, −3}, {1, −3, −1, −3, 1, 3, 1, 1, −1, −1, 1, 1, 1, −3, −3, 1, −3, −3}, {−1, 3, −3, 1, −3, 1, −3, 3, 1, 3, 3, 3, 3, −3, 1, 1, −3, −3}, {1, −1, −3, 3, −3, 3, −3, −1, −3, 1, 3, 1, 3, −3, −1, 1, −3, −3}, {−1, −1, −1, −3, −3, 1, −1, 3, −1, −3, 3, −1, 1, −3, 1, 3, −3, −3}, {1, −1, −3, 3, −3, 1, −3, 1, −1, −1, −1, −1, −3, −1, 1, 3, −3, −3}, {3, 3, 1, −1, 3, −1, −3, 1, 3, −3, 1, −3, −1, 3, 3, −3, −3, −3}, {−1, 3, −1, −3, 1, −1, −3, −1, 1, −1, 1, 3, 1, −1, −1, −3, −3, −3}, {1, −3, −3, 1, 1, −3, −1, 3, −1, 3, −1, −1, 1, −1, −3, −3, −3, −3}, {−3, −3, −1, 1, 1, 1, −1, 3, −1, −3, 1, −3, −1, −3, −3, 1, −3, −3}, {1, −3, −3, 1, 1, −3, 3, −1, 3, −1, 3, 3, 1, 3, −3, −3, −3, −3}, {3, 1, −3, −1, 3, 1, 3, −3, −1, 1, 3, 1, 1, −3, −3, −3, −3, −3}, {1, −1, −3, 1, −1, −3, 3, −3, 1, −3, −1, 3, 3, 3, 1, 3, −3, −3}, {3, 1, −3, 1, −3, 3, 3, 1, 3, −1, 1, 3, −1, 1, 3,

3, −3, −3}, {−3, 1, −1, −3, −1, 3, −3, 3, −1, 1, 3, −1, −3, 3, 3, 3, −3, −3}, {1, −1, −3, −1, 3, −1, −3, −1, 3, −3, −1, 3, 1, 1, 3, −3, −3, −3}, {−3, 3, −1, −3, −1, −1, 1, −3, 1, 1, 1, −3, −1, 1, −1, −1, −3, −3}, {−1, 3, 1, 3, 1, −1, −3, −3, 1, −3, −3, −3, 1, 3, −3, 3, −3, −3}, {−3, 3, 3, −3, −1, −3, 3, 3, −3, 1, −3, 1, 1, 1, −3, 1, −3, −3}, {−3, −1, 3, 1, 1, 3, −1, −1, 3, −3, −3, −1, −3, −3, 3, −1, −3, −3}, {−1, 3, −1, 1, −3, −1, −1, −3, −3, 1, 3, 3, −3, 3, 1, −3, −3, −3}, {1, 1, −3, 1, 1, 3, −1, 3, 1, 3, −3, 3, −1, 1, 1, −1, −3, −3}, {3, 1, 1, −1, −3, −1, 3, −1, 1, 3, −3, 3, −1, −3, 3, −3, −3, −3}, {−3, −1, −1, 3, −3, −3, −1, −3, 1, −1, −1, 3, 1, 1, −3, −1, −3, −3}, {1, 3, 1, −1, −3, 1, 3, 3, 1, −3, 1, 1, 1, −3, 1, 3, −3, −3}, {1, −1, −3, 3, 1, 3, 1, 1, −3, 1, −3, 1, −3, −3, −1, 3, −3, −3}, {−3, 1, −1, 1, 3, 3, 1, 3, −3, 1, 3, 3, 1, −1, 1, −1, −3, −3}, {−3, −3, 1, −3, −3, −1, −3, 1, −3, −1, 3, −1, 1, 1, 1, −1, −3, −3}, {1, −1, 3, 1, 3, −3, −3, −1, −3, −3, 3, −3, 3, 3, −1, 1, −3, −3}, {−1, 1, −3, 1, 3, −1, −1, 3, −3, 3, 1, 3, 1, −1, 3, 3, −3, −3}, {1, −1, 1, 3, −3, 1, −1, −1, 1, −3, 1, 1, 1, −3, 1, −1, −3, −3}, {−3, 1, −3, 3, −1, 3, 3, 1, 3, 3, 3, −3, −3, 1, 1, −1, −3, −3}, {3, 1, 3, −1, 3, −1, 3, 3, −1, 1, 1, −3, 1, 1, −3, −3, −3, −3}, {−1, 3, 3, −3, 1, 3, 1, −1, 1, 1, −1, 3, −3, 3, 3, −1, −3, −3}, {3, 1, −1, 1, −3, −3, −3, 1, −3, −3, 3, −1, 1, 3, −3, 3, −3, −3}, {1, −1, −3, −3, 3, −1, −3, 1, −1, 1, 3, −1, 3, −1, 1, 3, −3, −3}, {−1, 1, 1, 1, −3, −3, 3, −1, −3, −3, 3, −3, 3, 1, −3, 1, −3, −3}, {1, −1, −3, 1, −3, −3, −3, 3, −1, 1, −3, −1, −3, 1, 3, −3, −3, −3}, {1, −3, −1, 3, 1, −3, −1, 1, 3, −1, −3, 3, 1, 3, 3, −3, −3, −3}, {1, −1, −3, 1, 1, 1, 3, 3, −1, 3, −1, 1, 3, −1, −1, −1, −3, −3}, {3, 1, −1, 3, −1, −3, −3, −1, 3, −1, 1, −3, −3, −1, 1, 1, −3, −3, −3}, {1, −3, −1, 3, −1, 3, −3, −3, 1, −3, −3, −1, 1, 1, −1, −3, −3, −3}, {−3, −3, 3, 3, −3, −3, −1, 3, −3, 1, 3, −1, 1, −1, 3, 1, −3, −3}, {−1, 1, 3, −1, 3, 1, 1, −3, 3, −1, −3, −3, −1, 1, 1, −1, −3, −3, −3}, {3, 1, −3, 3, 1, −3, −1, 1, 1, −1, 3, −3, 3, −1, 1, −3, −3, −3}, {−3, 3, 3, 1, 1, −3, 1, 1, −3, 1, −3, 3, −1, 1, 3, 3, −3, −3}, {1, −1, 3, 1, −3, 1, 3, −1, 3, −3, 1, 1, −1, −1, 1, 3, −3, −3}, {1, −1, 3, 1, −3, −1, −1, 1, −3, −1, 3, −3, 3, 3, 1, −3, −3, −3}, {−3, −1, −1, 1, −1, 1, −3, 1, 1, −3, 3, −1, 1, 1, −1, −1, −3, −3}, {1, 3, −3, −3, −1, 3, −3, 1, 3, 1, −1, 3, −1, 3, 1, −1, −3, −3}, {−3, 1, 3, −3, 3, −1, −3, −1, 3, 1, −1, 3, −3, −1, −1, −1, −3, −3}, {3, 3, 1, 3, −1, 1, −3, 1, 1, −1, 3, 1, −3, 1, 1, 3, −3, −3}, {−1, 3, 1, −3, 1, −3, −1, 1, −3, −3, 3, 1, 3, −3, −3, −3, −3, −3}, {3, −3, −3, −1, 3, 1, −1, 3, 1, −1, −3, −3, 3, −3, 1, −3, −3, −3}, {3, −1, 3, −1, 3, 3, 1, 3, −1, −1, 3, 3, −1, −3, 3, 3, −3, −3}, {−1, 1, 1, 1, −1, −3, −1, 1, −1, −3, 1, 3, 3, 1, −3, 1, −3, −3}, {−1, −3, 1, −1, −1, 1, −3, 1, −1, 1, 3, 3, −1, 1, −1, −1, −3, −3}, {−3, −1, −1, 1, 1, −3, 1, 1, −3, 1, −3, −1, 3, 1, −1, −1, −3, −3}, {3, −1, 1, 1, −3, −1, −3, −3, −1, 3, 1, 3, −3, 3, 3, 1, −3, −3}, {1, 3, 3, −1, −1, −3, 1, 1, 3, −1, 3, 3, −1, −3, −1, −3, −3, −3}, {1, 3, −3, −1, 1, −1, 1, 1, −3, 1, −3, 1, −3, −3, 3, −1, −3, −3}, {3, 1, 1, 1, 1, −3, 3, 1, −3, 3, −3, −1, −1, 3, −1, 1, −3, −3}, {1, −3, 1, −1, 3, −3, 1, 1, −3, 3, −3, −1, 1, −1, −3, −3, −3, −3}, {−3, 1, −3, 1, −1, −3, −1, 1, 3, 1, 1, −3, −3, −1, −1, −3, −3, −3}, {3, 3, 3, −3, −3, 1, 3, −1, 3, −3, −1, 3, 1, −3, 1, −1, −3, −3}, {−1, 1, −3, −1, 1, −3, 3, 1, 1, 3, −1, −3, −1, 3, 1, −3, −3, −3}, {1, 1, 3, −1, −1, 1, −1, −3, 1, −3, 1, 3, −3, 3, 3, −1, −3, −3}, {−3, 1, −1, −1, 3, 3, −1, 1, 1, −3, −1, −3, −3, 3, −3, 3, −3, −3}, {−3, −3, 3, 1, 1, 1, 3, −1, 3, −3, 1, −3, 3, −3, −3, 1, −3, −3}, {−1, 1, 3, 1, −3, −3, −3, 1, −3, −3, −1, 3, 1, −1, −3, −1, −3, −3}, {−3, 3, 3, −1, −3, −3, 3, −3, 1, 3, 3, −1, 1, 1, −3, 3, −3, −3}, {1, 3, −3, −1, −3, 1, −3, 1, 3, 3, 3, 3, −3, 3, 1, −1, −3, −3}, {−3, 1, 3, −1, −1, −3, 3, −1, 3, 1, −1, 1, −1, 1, 3, 3, −3, −3}, {3, 1, −1, −3, −1, −1, −3, 3, 3, −3, −1, 3, −3, 3, −1, 3, −3, −3}, {−1, 3, −1, 3, −1, 1, 3, 1, −1, 3, 3, −3, −1, −1, −1, −1, −3, −3}, {1, −3, 1, 3, 1, −1, 3, −1, −3, 3, 1, −1, −1, −1, 1, 3, −3, −3}, {−1, 1, 1, −3, −3, −3, 1, −1, −3, 1, −1, 3, −1, 1, −3, −1, −3, −3}, {1, −1, 1, −3, −1, 1, −1, 3, −1, −1, 1, 1, 1, 3, 1, −1, −3, −3}, {1, −3, 1, −3, 1, 3, −3, −1, −1, −3, 3, 1, −3, −3, −1, −3, −3, −3}, {−1, −3, 1, 3, −1, −3, −3, −3, 1, 3, 1, 3, 3, −1, −3, 3, −3, −3}, {−1, 3, 3, 3, −3, −3, 1, −1, 3, 1, −3, −1, 3, −3, −1, −1, −3, −3}, {−1, 3, −3, −1, 3, −1, 3, 3, −3, −3, 1, 3, 3, 3, 1, −3, −3, −3}, {1, 3, −3, 1, 1, 1, −1, −1, 3, −1, 3, 1, −1, 3, 3, 3, −3, −3}, {3, 1, 1, −3, 1, 3, 1, 1, −3, 1, −1, 3, −1, 1, 1, 3, −3, −3}, {−1, 3, −3, 1, 3, −3, 3, 1, −1, 3, 1, 3, 1, 1, 1, 3, −3, −3}, {1, −3, 1, −3, 1, −1, −3, 3, 3, −3, −1, 1, −3, −3, 3, −3, −3, −3}, {−1, 3, −1, 3, −1, −1, −1, −1, 1, 1, −1, 3, 3, −1, −1, 1, −3, −3}, {3, −1, 3, −1, −3, 1, 3, −1, 1, 3, −3, −3, −1, −1, −3, −3, −3, −3}, {3, −3, 1, 3, −1, 1, 1, −1, 3, 1, 3, 1, −1, −1, 3, 3, −3, −3}, {3, −3, 1, 3, −1, 3, −3, −3, −1, −1, −1, 1, −1, −3, 1, −1, −3, −3}, {3, −1, −1, −3, 1, 1, −3, −3, −1, 3, 1, −3, 1, −3, −3, −3, −3, −3}, {1, −1, 3, 1, −3, 1, 3, −3, −3, −1, 1, −3, 1, 1, −1, −1, −3, −3}, {−1, 1, 3, 1, −3, 1, −3, 1, 1, −3, 1, 1, 1, 1, 1, −1, −3, −3}, {−1, 1, 3, −1, 3, −3, −3, 3, −1, 3, 1, −3, −3, 3, 1, −3, −3, −3}, {3, −3, 1, −1, 3, −3, 1, 1, 3, 3, 1, 3, 1, 1, 3, −1, −3, −3}, {3, −3, −1, −1, −3, −1, 3, 1, −1, 1, −3, 1, −1, −1, 3, −1, −3, −3}, {3, −1, −3, 1, −3, 1, −3, −1, 1, −1, −1, −1, −1, −3, 1, 1, −3, −3}, {−3, 1, −3, −1, 3, −3, 3, 1, −1, −1, 1, 3, −3, −3, 3, 3, −3, −3}, {1, −1, 1, −3, −1, 3, −1, −3, −1, −3, 3, −1, −1, −1, 1, 1, −3, −3}, {−1, −3, 1, −3, 1, 3, −1, −1, −3, −1, 1, 3, −3, −3, 3, 3, −3, −3}, {1, 3, −1, 1, −3, 3, 3, 1, −3, 3, −1, −3, −1, −1, 1, −3, −3, −3}, {−1, 3, −3, 3, −3, −1, −1, 3, −1, −1, −1, 3, 1, −1, −3, −1, −3, −3}, {1, −3, −1, 1, 3, 1, 3, 3, 1, −1, 1, 3, 1, −3, 1, −1, −3, −3}, {−1, −3, 1, −3, 1, −1, 3, 3, 1, −3, −1, 1, −3, −3, −3, −1, −3, −3}, {1, −3, 1, −1, 1, 3, −1, 3, −3, −1, 1, 3, 3, 3, 1, −1, −3, −3}, {1, −3, 3, 1, −3, −3, 1, 3, −1, 3, −3, 3, −1, −1, −1, −3, −3, −3}, {−1, 1, −1, −3, 3, 1, −3, −3, −1, 1, 3, −3, 1, −3, −1, −3, −3, −3}, {−3, 1, −3, −3, 3, −1, −3, −3, −3, 3, −1, 1, −1, −1, 1, 3, −3, −3}, {1, 3, −1, 1, −3, 1, −1, −3, −3, 3, 1, −3, 1, 1, 3, 3, −3, −3}, {−3, 1, −3, 1, 3, −3, 3, 1, −1, 1, 1, −3, −3, 3, 3, −3, −3, −3}, {1, −1, −1, 3, −1, −1, −1, −1, −3, −1, 3, −1, 1, 1, 3, 1, −3, −3}, {−1, 1, 3, −1, 1, −3, 3, 1, −1, 3, 1, 3, 1, 1, 1, −3, −3, −3}, {1, −1, −1, 1, 3, 1, 1, −3, 3, −1, 3, 1, −1, −1, −1, 1, −3, −3}, {−3, 1, 1, −3, −3, 3, −1, 1, 1, 3, 3, 1, 3, −1, −3, −1, −3, −3}, {−3, 3, −1, −1, −1, 1, −1, 3, 3, −1, 1, −1, −3, −3, −1, 3, −3, −3}, {−3, −1, 1, −1, −1, −3, 3, 3, −1, 1, 3, −1, −3, 1, −3, 3, −3, −3}, {3, 3, −1, 1, −1, 3, −1, 3, −3, 1, 1, −3, 3, −3, −3, 3, −3, −3}, {1, −1, 1, −1, 1, −1, 3, −3, 1, 3, −3, −1, −3, 1, 1, −3, −3, −3}, {3, 1, −3, 1, −3, 1, 1, −1, −3, 3, 3, −3, −1, 1, −3, −3, −3, −3}, {−1, 1, −3, 1, −3, 1, 1, 3, −3, −1, −1, −3, 3, 1, −3, −3, −3, −3}, {−1, 1, 1, 1, −3, 3, −1, −3, −1, 3, −3, −3, 3, 1, −3, −1, −3, −3}, {3, −1, 1, −3, 3, 1, 1, −1, −1, 1, 1, 3, 3, −1, −3, 1, −3, −3}, {−3, 3, 1, −3, 3, 1, 1, 1, −3, −1, 3, −3, 1, 3, 3, −3, −3, −3}, {−1, −3, 3, −1, −3, 1, 3, −1, 1, −3, −1, −3, 3, 3, 3, −3, −3, −3}, {−1, 1, −1, 3, 1, 3, 3, −1, −1, 1, 1, −3, −1, 3, −1, −1, −3, −3}, {1, −1, −1, −3, −1, 3, −1, −1, 3, −1, −1, 1, −1, 1, 1, 3, −3, −3}, {3, −1, 3, −1, −1, −1, 1, 3, −3, 1, 1, −1, −1, −3, 3, −1, −3, −3}, {−3, 3, 1, 3, −1, −3, −1, 3, −3, −1, 3, −1, −1, 3, 3, −3, −3, −3}, {−1, 1, −1, 1, −3, −1, 1, −1, −1, −1, 3, 3, 1, −1, 3, 1, −3, −3}, {−3, 1, −3, 3, −3, 1, 1, −1, −3, 3, −1, 1, 3, −3, −3, −3, −3, −3}, {1, −1, −3, −1, 3, −3, −3, 1, 3, 3, 1, −3, 1, 3, 3, 3, −3, −3}, {−3, −1, 1, −1, −3, −3, 1, 3, −1, 3, −1, −3, 1, −3, 3, 3, −3, −3}, {3, −1, −1, 3, 3, 1, −3, −1, 1, −3, 1, −1, 3, −3, −3, −3, −3, −3}, {−1, 3, 1, −3, −1, 1, 1, 3, 3, 1, 1, −1, −1, 3, −3, 1, −3, −3}, {3, −1, 3, −3, −3, 1, −1, 3, 3, 3, −3, 3, 3, −1, −1, −1, −3, −3}, {−3, −1, −1, 3, −3, −1, −3, 1, −3, 3, 3, −3, 3, 3, 1, −1, −3, −3}, {−3, −3, 1, −3, −3, 3, −3, 1, −3, 3, −1, 3, 1, 1, 1, 3, −3, −3}, {1, 3, −3, 1, 1, −1, −3, −3, −3, −3, −3, −1, −3, 1, −3, 1, −3, −3}, {−1, 3, 1, −3, −3, 1, −3, 1, 3, 1, 3, 3, 3, 3, −1, −1, −3, −3}, {1, −3, 3, −1, 3, −3, −1, −1, −3, 3, 3, −3, 3, 3, 1, 3, −3, −3}, {3, −1, 1, −1, 1, −3, −3, −1, −1, 3, 1, −3, 3, 3, 3, −1, −3, −3}, {1, −3, 3, −1, 1, −3, 3, 1, −1, 3, −3, −1, 1, −1, −1, −3, −3, −3}, {3, −1, −1, 3, 3, 1, −3, 1, −3, 3, −3, −1, −1, −1, −1, −1, −3, −3}, {1, −3, −1, −3, −1, −1, −3, −1, 3, 1, −3, 3, 3, −3, 1, 1, −3, −3}, {3, 3, −3, −1, −1, 3, −1, −3, 1, −1, −1, 3, −1, 1, −3, −1,

−3, −3}, {−1, −1, 3, 1, 3, −1, 3, −1, −3, 1, 1, −3, −1, −3, −3, −1, −3, −3}, {−1, 3, 1, −3, −1, 1, 1, −3, −3, 1, 1, −1, 1, −3, −3, −3, −3, −3}, {1, 3, 1, −1, −3, 1, −3, −3, 1, 3, −1, −3, 1, 3, 1, 3, −3, −3}, {3, 1, 3, −1, −3, 3, 3, 3, −3, −1, −1, 1, −1, −1, 3, −1, −3, −3}, {−1, 1, 1, 1, 1, −3, −1, 1, −3, −1, −3, 3, 3, −1, 3, 1, −3, −3}, {1, −3, 3, −1, −3, 3, −3, 3, −3, −1, −1, −1, 1, 3, −1, −1, −3, −3}, {3, −3, 1, 3, −1, 3, 1, 1, 1, 3, 1, −3, 3, −1, 1, 1, −3, −3}, {1, −3, −1, 3, −3, −1, −3, −1, −3, 3, 3, 3, 1, −1, 3, 3, −3, −3}, {−3, 1, −3, −1, 1, −3, 3, 1, −3, −3, −3, 1, −1, −1, −1, −1, −3, −3}, {−1, −1, −3, −1, −1, −3, −1, 3, 3, −1, −3, 1, −3, 1, 3, 1, −3, −3}, {−3, 1, −1, 3, 3, 1, −1, −1, −3, −1, 3, −3, 3, 3, −3, 3, −3, −3}, {3, −3, −1, 3, −3, 1, −1, 3, 1, −3, 3, −3, −1, −1, −1, −3, −3, −3}, {−1, 3, −1, 3, −1, −3, −3, −1, −1, −1, −3, 3, 3, −3, 1, 1, −3, −3}, {1, −1, 1, −1, −3, 3, −3, 1, −3, −1, 3, 3, −1, −1, 3, 3, −3, −3}, {3, −1, −3, 3, −1, 3, −1, −1, −3, −3, 1, −1, −1, −1, 1, −3, −3, −3}, {−3, 1, 1, −3, −3, −1, 3, 1, 1, −1, −1, 1, −1, 3, −3, 3, −3, −3}, {−3, 3, 3, 1, 1, −3, −1, −3, 1, −3, −3, −1, 1, −3, 3, 3, −3, −3}, {1, −3, −1, 3, 1, 3, −3, −3, 1, −1, −3, 1, −3, −3, −1, −3, −3, −3}, {3, −1, 3, −1, 3, −3, −3, 3, 3, 3, −3, −1, −1, −3, 1, 1, −3, −3}, {3, −3, 1, 1, −1, 1, −3, 3, −3, 1, −1, 3, 3, −3, −3, 3, −3, −3}, {−3, −1, 3, −1, −3, 1, −3, −3, −1, 1, 1, 3, 3, 1, −1, −1, −3, −3}, and {−1, 3, −1, 3, −1, −1, 1, −1, 3, 3, −1, −1, 3, −3, −1, −1, −3, −3}.

A length of the sequence in the second sequence set is 24, PAPRs of $\{f_n\}$ corresponding to the sequence in the second sequence set and the equivalent sequence of the sequence are all less than 2.8 dB, and the sequence in the second sequence set includes at least one of the following: a sequence in a sequence set 2A, a sequence in a sequence set 2B, and a sequence in a sequence set 2C. A PAPR of a sequence $\{f_n\}$ determined by using the sequence in the sequence set 2C is less than 2.45 dB.

The sequence in the sequence set 2A includes some or all of the following 195 sequences:

{−1, −1, −3, −3, 3, 3, −3, 1, 3, −3, 1, 1, −3, 3, 1, 1, −3, 3, −1, 3, 1, 3, 3, −3, −3}, {−3, 3, 1, 3, −1, 1, −3, 1, −3, 1, −1, −3, −1, −3, −3, −3, −3, −1, −1, −1, 1, 1, −3, −3}, {3, −1, −3, 1, −1, −3, 1, 3, 1, 3, −3, −3, −3, −3, 1, 3, −1, −1, −1, −3, −1, −1, −3, −3}, {1, 1, 1, 1, −1, 3, 1, 3, −1, −1, −3, 1, −3, 1, 1, 3, −3, 1, −1, −3, 1, 3, −3, −3}, {−1, −3, −1, 3, −1, 3, −3, −3, 3, 3, 1, 3, 3, −1, −3, −3, −1, 3, −3, −3, 1, 1, −3, −3}, {1, 3, −3, 3, 3, −3, −3, −1, −1, 3, −3, 1, −1, 3, −1, 3, 1, −1, −1, 1, −1, −1, −3, −3}, {1, 3, −1, 3, 1, 1, 1, −1, 3, −3, 1, 1, −3, 3, −1, −3, 1, 1, −1, 1, 1, 3, −3, −3}, {−3, −3, −1, 3, −3, −1, 1, −1, −3, 1, −1, 3, 1, 3, 1, 3, −1, −3, −1, 1, 1, −1, −3, −3}, {1, −3, 1, 3, −3, 3, 1, −1, −3, −3, −3, 1, −1, −3, 1, −3, −1, −1, 1, −3, −3, −3, −3, −3}, {−1, 1, 3, −3, −1, −1, −3, 1, −3, 1, −1, 3, 1, 3, −1, −3, −3, 3, −3, 3, 3, −1, −3, −3}, {−1, 3, −1, 1, −3, 1, −1, −1, −3, 3, −3, −3, 1, 3, 3, −1, −1, 3, 3, 3, 3, −3, −3, −3}, {−3, 3, −1, 1, −1, −3, −3, −3, 3, −3, −3, −3, 1, −1, −1, 3, −1, −1, 3, −1, 1, 3, −3, −3}, {−1, 3, 1, −3, −1, 3, 1, −3, −1, −1, −3, 1, −1, 1, 3, −3, 3, −3, −1, 1, −1, −1, −3, −3}, {1, 1, −3, −3, −3, 3, −1, −1, 3, 1, 1, −3, 1, −3, −1, 3, −3, −3, −1, −3, −1, −3, −3, −3}, {−1, 1, 3, −1, 3, −3, −1, 3, 3, −3, −3, −3, 3, −3, 3, −1, 1, −1, −3, 3, 1, −3, −3, −3}, {−1, 3, 3, 1, 1, −1, −1, 1, −3, 1, −3, −1, 3, 1, −3, −3, 1, 1, 3, 3, −3, 3, −3, −3}, {3, −1, 3, −3, 1, −1, 3, −1, 1, 1, −1, 3, 1, 1, 3, −3, −3, −1, 1, 1, −1, −1, −3, −3}, {−3, −1, 1, −3, −3, −1, −1, −3, −3, −3, 1, −3, 1, 3, 1, −1, −1, −3, 1, 1, 3, 1, −3, −3}, {−3, 1, −1, −3, 1, −1, 1, −3, 1, −3, 3, 1, 1, −1, −1, −3, −1, −1, −3, −1, 1, 3, −3, −3}, {1, −1, −3, −3, 3, 1, −3, 1, 3, −1, −1, 1, 3, −3, −3, 1, −3, 3, 3, −3, 3, −3, −3, −3}, {−1, 3, −3, −3, −3, −3, 3, −1, 3, 3, −1, −3, 1, −3, −1, 1, 1, −3, 3, 3, 1, 1, −3, −3}, {3, −3, 3, 1, −3, −3, 3, −3, −3, 3, 3, −1, 3, −1, 3, −1, −1, −3, −1, 1, 1, 3, −3, −3}, {−1, −1, −3, −3, −1, −3, 3, −3, 3, −1, −1, −3, −3, 1, 1, −3, 1, −1, 1, 3, 1, 3, −3, −3}, {−3, 1, −1, −3, 3, −1, −3, −1, 3, 3, 3, 3, −3, 1, 1, −3, −1, 3, 3, 3, −3, −1, −3, −3}, {3, 1, 3, 1, 3, 3, 1, −3, 1, −3, 3, 3, 3, −3, −1, −1, 3, 1, 1, −3, 1, 1, −3, −3}, {1, −1, −3, 1, −3, 1, −3, −3, 1, −1, 3, −3, 1, 3, 3, −3, 3, 3, 1, 1, 3, −3, −3, −3}, {−1, −1, 3, −1, 3, −3, −1, 3, −1, 3, 1, −3, −1, −1, −1, −3, −1, −1, 3, 3, 1, −1, −3, −3}, {3, −3, −3, −1, 1, −1, 3, −1, 1, 1, −3, 1, 1, −3, 1, 1, −1, 3, 1, 1, −1, −1, −3, −3}, {1, 1, 1, 3, 3, −3, 1, −3, 1, −3, 3, −3, 1, 1, −3, −1, −1, 3, −1, −3, 3, 1, −3, −3}, {1, −1, −1, −3, 1, −1, −3, 1, 3, −1, −3, −1, 3, −3, 1, 1, 3, −1, 1, 1, 1, 3, −3, −3}, {3, −1, −3, 1, −3, 1, 1, −3, 1, −3, −3, 3, 1, −1, 1, 3, 3, −3, −1, −3, −3, −3, −3, −3}, {−3, −3, −1, 1, 1, −3, 3, −3, −3, 1, 3, −1, −1, 3, 3, 1, −3, 1, −3, −1, −3, −1, −3, −3}, {−1, 3, −1, −1, −1, −1, 1, −1, 1, 3, −1, −1, −3, −3, 3, 1, −3, 3, 3, −1, 1, 1, −3, −3}, {−3, 1, −1, 1, −1, −1, −3, −1, −3, −1, 3, 1, −1, −3, −1, 1, −1, 1, 3, −3, 1, 3, −3, −3}, {3, 1, −3, −3, 1, −1, 3, −1, −3, 3, −3, −1, −1, −3, −1, 1, 3, −1, 1, −1, 1, −3, −3, −3}, {1, −1, 1, −1, 1, −3, −1, −1, −3, 1, 3, −3, −3, 1, −1, 3, −1, −1, 3, 3, 3, 1, −3, −3}, {1, −1, 3, 1, −3, 1, −1, −1, 1, 3, −3, −1, 1, −1, −1, 1, 1, 1, −3, 1, 3, −1, −3, −3}, {1, −1, −3, 3, 1, 3, 1, −1, 3, −1, 3, −3, −3, 1, −3, −1, −3, −1, −1, −1, 3, −3, −3, −3}, {−1, −3, 3, −1, −1, −3, −1, 1, 3, −1, −1, 1, 3, −1, 3, −1, 3, −1, −1, 1, −1, −3, −3, −3}, {3, −1, 3, −1, 3, −3, −1, 3, 3, −1, −1, −1, −3, 3, −1, −1, −1, 1, 1, −3, −3, −3, −3, −3}, {−3, −3, 1, −3, −1, 3, −1, 3, 1, −3, 1, −1, −3, −1, −1, 3, −3, −1, −1, 1, 1, −1, −3, −3}, {1, −3, 3, −3, 1, −3, 1, 3, 1, −1, −3, 1, 3, 3, 3, 3, −1, 3, 3, −1, 1, 1, −3, −3}, {3, −1, 3, −1, −3, −1, −1, −1, −3, −3, 3, 3, −1, −3, 1, 1, −3, 3, 3, −1, 1, 3, −3, −3}, {1, −3, −3, −1, 3, −1, 1, 3, 1, −1, 1, −1, −3, 3, 3, 1, −1, 1, 1, −1, 1, 1, 1, −3, −3}, {−3, −1, −3, 3, 1, 1, −3, −3, −1, 3, −3, 1, −1, 1, 3, −1, 3, −1, −3, 3, −3, −3, −3, −3}, {−3, 1, −3, −1, −1, 3, −1, 1, −1, 1, 3, 3, −3, −1, 3, 1, −1, 3, 1, −1, −1, −1, −3, −3}, {3, 3, 3, −1, −1, 1, 3, −1, −1, −1, −3, 1, −1, −3, −1, −3, −1, 3, 1, 1, −3, 1, −3, −3}, {3, −3, 3, −1, −1, 1, 1, 3, 1, 1, −1, 3, −1, 3, −1, −3, 3, 1, 1, −3, −1, 1, −3, −3}, {3, −1, −1, −3, −3, 1, −1, 1, −1, −3, 1, −3, 3, −3, 1, 1, 1, 3, 1, −3, −1, 1, −3, −3}, {3, −1, −3, 1, 1, −3, −3, 1, 3, −1, 3, −1, 3, −3, −3, 1, −1, −1, −1, −3, −3, −3, −3, −3}, {−3, 3, −1, −3, 1, 1, −3, 1, −3, −1, −1, 1, −1, −1, −1, 3, 1, 1, −1, −1, 3, −3, −3, −3}, {3, 1, −1, −3, 3, −1, 3, 3, −1, −1, 1, −3, 3, −3, 3, −1, 1, 3, −3, 3, −3, −3, −3, −3}, {−1, 3, 1, −1, −3, 3, −3, −1, 3, −1, 1, −3, −3, −3, 3, −1, 1, −1, −3, −1, −1, 1, −3, −3}, {1, −3, 1, −3, −3, 1, −1, 3, −3, −1, 1, 3, 1, −3, −3, −3, 1, −1, −1, −3, −3, −3, −3, −3}, {1, −3, 1, 3, −3, −3, 1, −1, 1, −1, 1, 3, −3, 3, 1, 1, −1, −3, −3, −1, −1, −3, −3, −3}, {−3, −1, −1, 1, −3, −1, −1, 1, −3, 1, 1, −3, 1, 3, −1, −1, −3, 1, 1, 1, −1, −3, −3, −3}, {1, −3, 3, −1, 3, −3, −3, 1, −1, −3, −3, 1, −3, 1, 1, −1, −1, −1, −1, 1, 3, −3, −3, −3}, {−1, −1, 1, 1, 1, −1, −1, 3, −3, 1, −1, −1, 3, −1, 3, 1, 3, −1, 1, −1, −3, 1, −3, −3}, {−1, −3, 1, −1, 3, 3, −1, 1, −1, −1, −1, −1, −3, −3, 1, 1, −1, −3, 1, 3, 1, 3, −3, −3}, {3, 3, 3, 3, −1, −3, 3, −1, 3, −3, 3, 3, −3, 1, −1, 1, −1, 1, −3, −1, 1, 1, −3, −3}, {1, −3, 1, 3, −1, −1, −1, −3, 3, 3, −3, −1, −1, 3, −1, −3, 1, 1, −3, −3, 3, −3, −3, −3}, {3, 1, −1, −3, 1, −1, 1, −1, 3, −1, 3, −1, 1, 3, −1, 1, 3, 3, −3, −1, −1, −1, −3, −3}, {−1, −3, −1, −3, −1, 3, 3, 3, 1, 3, −3, −3, −3, 1, 1, −3, −3, −3, 1, −1, −3, 1, −3, −3}, {−3, 1, −1, 1, 3, −3, −1, 3, 1, 1, 3, −3, 1, −1, −3, −1, 3, 3, −1, −3, −3, −3, −1, −3, −3}, {3, 3, 1, −3, −1, −1, 1, −1, 3, −1, 3, −3, 3, −3, −3, 3, −1, −3, 3, −3, −1, 1, −3, −3}, {1, 3, −1, 3, −1, 1, −1, 3, 1, −3, −1, 1, 3, −1, 1, 1, −1, −3, 3, 3, 3, 3, −3, −3}, {1, −3, 3, −1, −3, 1, −3, −3, −3, −1, −1, 3, −3, 1, −3, −1, 3, 1, 1, −1, −3, −3, −3, −3}, {−1, 1, 1, 3, −3, −1, −1, −3, 3, −1, 1, −3, −3, 3, 3, −3, 3, 3, −1, 3, −1, −3, −3, −3}, {−1, −3, 1, 3, −3, −1, 1, −3, 3, −1, −3, 3, 3, 1, −1, −1, 3, −1, 3, −3, −3, −3, −3, −3}, {−1, 1, 3, −1, −1, 3, −3, −1, −3, −1, 3, −1, 3, 1, −3, 3, −3, 3, 1, −1, −3, −3, −3, −3}, {−3, −1, 3, −1, −3, 1, −3, −1, −1, 1, 1, −3, 1, −1, −1, 3, −1, 1, 1, −1, −3, −3, −3, −3}, {1, 3, 3, −3, −1, 3, 1, −3, −1, 1, −3, −1, 3, 3, −1, 3, −3, 3, 1, −1, −3, −3, −3, −3}, {1, 1, 1, 1, −3, −3, −1, −3, 3, −1,

3, −3, 3, 1, −3, −1, 3, −3, 3, −3, 1, 3, −3, −3}, {−1, 3, −1, −3, 1, −1, 1, −3, 1, 3, −3, −3, −3, 3, −1, −1, 3, 3, −1, −1, −1, −1, −3, −3}, {−1, 3, 3, 1, −1, −1, 3, −1, 3, −1, 3, 1, −1, 1, 1, −1, 1, 1, −1, 1, 3, −3, −3, −3}, {1, −3, −1, 3, −1, 3, 1, −1, −3, −1, −3, 3, −3, 3, −1, −1, −1, 1, −1, −1, 1, 3, −3, −3}, {−1, 1, −3, −3, −3, 1, 1, 1, 1, 3, 1, 3, −1, 3, −1, −3, 3, −1, −3, 3, −1, 1, −3, −3}, {−1, 3, −1, −1, 3, −1, −1, 3, −1, −1, −1, 3, 3, −1, 1, −1, 1, −1, 1, 1, 1, −3, −3, −3}, {3, −1, −1, 3, −1, 3, 3, 1, −1, 3, −1, 3, −1, 3, 3, 1, 1, 1, 3, 1, 1, 3, −3, −3}, {1, 3, −1, −3, 1, −1, −3, −3, −1, 3, −3, 1, 3, 3, −1, −1, −3, 3, 3, 3, −3, −3, −3, −3}, {−1, −1, −3, 1, 3, 1, 3, −3, −3, −3, −3, 3, 3, −3, 3, 1, −3, 1, −3, −3, −1, 1, −3, −3}, {3, −3, 1, 1, 1, 3, −1, −1, −3, 1, 3, 1, −1, −3, 3, 1, −3, 1, 3, 3, −3, 3, −3, −3}, {−1, −1, −3, −1, −3, 1, 1, −1, 1, −3, 1, −1, 1, 3, 3, −1, −1, −1, 1, −3, −3, 1, −3, −3}, {−1, 1, −3, 1, −3, 1, 3, −3, −1, 3, 3, −1, −3, 3, −1, −1, −3, −1, −1, 1, −1, −3, −3, −3}, {3, −3, 1, −1, 1, 3, 1, −3, 1, −3, 1, 1, −3, 1, 1, −1, 1, 1, 3, 3, 1, 1, −3, −3}, {−3, 1, −3, 1, 1, 3, −3, −1, −3, 1, 1, 3, 1, −1, 1, 3, 1, −1, −3, 3, −3, −1, −3, −3}, {−1, 3, −1, −1, −3, 3, −3, −3, 3, 3, 1, −1, 1, −3, 3, 1, 3, −1, 1, 3, 3, 3, −3, −3}, {1, 3, −3, 1, −3, 1, −3, −1, 1, 3, −3, −1, −3, −1, −3, 3, −3, −3, 3, 1, −1, −3, −3, −3}, {−1, 1, −1, 3, −3, 3, −1, 1, −1, −1, 3, 1, −1, 3, 1, −1, 1, 3, −3, −1, −3, −3, −3, −3}, {−1, 3, −3, 1, 1, −3, 1, −1, −3, 3, 3, 1, −1, 1, −1, 1, −1, −1, −1, 1, 3, 3, −3, −3}, {1, −1, 3, −1, −3, −3, 1, −3, 3, −3, 1, 1, 3, 1, −3, −1, 3, 3, 1, 3, −3, −3, −3, −3}, {−3, −1, 3, 1, 3, −1, 3, 3, −3, 3, 1, −1, −3, −1, −3, −1, −1, 3, 1, −1, −3, −1, −1, −3, −3}, {3, 3, −1, −1, −3, 3, 1, −3, 1, −3, −3, −1, −1, 3, 1, −1, 1, −3, −1, −3, −3, −3, −3, −3}, {1, 3, −3, −1, −1, −3, 1, 1, −3, 1, 3, −3, 3, −3, 3, −1, −3, 1, −3, −1, −1, −1, −3, −3}, {1, −1, −1, 3, 1, −1, −3, 3, −3, 3, 1, 3, −1, 1, −1, 3, −3, −3, 1, 3, 3, −3, −3, −3}, {−1, −3, 3, 1, 1, 3, −1, −3, 1, −3, −1, 1, 3, 1, −3, −1, 3, −3, −3, −3, −3, −1, −3, −3}, {−1, 1, 3, −3, 1, 1, −1, −1, −1, −1, 1, 1, −3, 3, 1, −1, −3, −3, 1, −3, 1, −3, 1, −3}, {3, 3, 1, −1, −1, −3, −3, −1, −1, 1, 3, 1, −3, 1, −3, 1, −3, −3, 1, −3, −3, 1, −3, −3}, {1, −1, −3, 1, −1, −3, −3, 3, −1, 3, −3, 3, −3, −1, −1, −3, −3, −1, 1, 1, −1, 3, −3, −3}, {−3, 3, −1, −1, 3, −3, −1, 3, −3, −1, −3, 1, −3, 1, −1, 1, −1, −1, −3, 3, 3, −3, −3, −3}, {−3, 3, 3, 1, −3, −3, −3, −3, 3, −3, −3, 1, 1, 3, 3, −1, 3, −1, −1, 1, −3, 1, −3, −3}, {−1, 3, −1, 3, −3, 1, −1, 3, 3, −3, −3, −3, −3, 1, −1, −3, −1, 1, 1, −1, −1, −1, −3, −3}, {−3, −1, 3, 1, −1, 3, −3, 3, 1, −1, 3, 3, −1, −3, −3, −1, 3, 3, 3, −1, 3, −3, −3, −3}, {3, −1, 1, −3, 1, 1, 1, −1, 3, −1, −3, 3, −3, 3, 3, −1, −3, −3, −3, −1, 1, 3, −3, −3}, {−3, −1, 3, −3, 3, 1, 3, −1, −1, −1, −3, 1, −1, −3, 1, 3, −1, −3, −3, 1, 3, 3, −3, −3}, {1, −3, −1, 1, −1, −3, 1, −1, −3, 1, −3, −1, −1, 3, 3, 3, −3, 3, 3, 1, 1, −3, −3, −3}, {1, 3, −1, 3, 3, 3, −1, 3, −3, −3, −1, −3, 1, −1, 3, 1, 1, −3, −1, −1, −1, 1, −3, −3}, {3, −3, 1, −3, −1, 3, −1, −3, 3, 3, −1, −3, −1, −1, 1, −1, 1, −1, −3, −1, −1, 3, −3, −3}, {3, 3, 1, 1, 3, 3, −3, −3, 3, 3, −3, −1, 1, 3, 1, 1, −3, −3, 1, −3, 1, −3, 1, −3}, {1, 1, −1, 3, −1, 1, −1, −3, −1, −3, 1, 1, 3, −1, −1, 3, −1, 1, 3, 3, −3, −1, −3, −3}, {−1, 3, −1, 3, −1, 1, 1, 1, −3, −3, 3, 3, −1, −3, 1, 1, −3, −1, 1, −1, −1, 1, −3, −3}, {3, −1, 3, −3, −1, −3, −1, −3, −1, 1, 1, −3, 1, 1, 1, −1, 3, −1, −1, 1, 1, −1, −3, −3}, {1, 1, 3, −3, −3, 1, 1, −1, −3, 1, −3, 1, −1, 3, −3, −1, 3, −3, 1, −3, −3, 3, −3, −3}, {−3, 1, −3, −3, 1, −1, 3, 1, 3, −3, 3, 3, 3, −1, 3, 3, 3, 1, −1, 1, −3, −3, −3, −3}, {3, −3, 1, 3, 1, 3, −1, 1, 3, −3, −3, 1, −3, 1, −1, −3, −3, 1, −1, 3, 3, 3, −3, −3}, {1, −1, −3, 3, −3, −3, 1, −1, −1, 3, −3, 1, 3, −1, 3, 1, −3, −1, −3, 3, −3, −3, −3, −3}, {1, −1, 3, −1, 3, 1, 1, −1, −1, 3, −1, 3, −3, −1, −3, −3, −1, 1, −1, −1, 1, 1, −3, −3}, {−3, 1, 3, 1, −1, −3, −1, 3, 1, 3, 1, −3, −3, 1, −1, −3, 1, 3, −3, −3, −3, 3, −3, −3}, {−1, 1, −3, 1, −1, 1, 3, −3, 3, 1, −3, −1, −1, 3, 1, 1, −3, −3, −1, −3, −3, 3, −3, −3}, {1, −3, −1, 3, 1, −3, 1, −1, −1, −3, −3, 3, −1, −3, 3, 1, 3, −1, 1, 3, 3, 3, −3, −3}, {3, −1, 3, −1, −3, −1, 3, 3, 1, −1, 1, 1, −1, −3, 3, −1, −1, 3, −3, 3, 3, −3, −3, −3}, {−1, −3, 1, −1, 1, −1, 3, −3, 1, −1, 3, 3, −1, −3, 1, 3, −3, 1,

3, −1, −1, −3, −3, −3}, {3, −1, 3, −3, 3, −3, 3, −1, −3, 3, −1, 3, −1, −1, −3, −3, 1, 1, 3, 3, −1, −1, −3, −3}, {3, −1, −3, 1, 1, 3, −3, −1, −1, 3, −1, 1, −1, −3, −3, 3, 3, 3, −3, 3, −3, −1, −3, −3}, {1, −1, 1, −3, 1, −3, 3, 1, −1, −3, −3, −3, 3, −3, −3, 1, −3, −1, −1, −1, 1, 3, −3, −3}, {1, 3, 1, −1, 1, −1, −1, −3, −1, −3, 1, −1, −1, 1, 3, −3, 1, 1, −1, 3, 3, 1, −3, −3}, {1, 3, −3, −1, 3, −3, −3, −3, −3, 3, −1, −3, 3, 1, −3, −1, −3, −1, 3, 1, 3, 1, −3, −3}, {−1, 1, −1, 3, −1, 3, −1, −3, 3, 1, 3, −3, 3, −3, −1, −3, −3, 3, 3, −1, 1, 3, −3, −3}, {1, 3, 1, 1, −3, −1, −1, −1, 3, −1, 1, 3, 3, −1, 3, 1, −3, −3, −3, 3, 1, −3, −3, −3}, {3, 1, −3, 3, −1, 1, −1, 1, 3, −1, 3, 3, 1, 3, 3, −1, −1, −3, −3, −1, 1, −1, −3, −3}, {−1, 3, −3, 1, −3, 1, −3, 3, 1, −3, −1, 1, 3, −3, −1, −1, −3, 3, 3, 3, 3, 3, −3, −3}, {−1, −1, 3, 3, −1, 1, −1, 3, 1, −1, 1, −1, −1, −3, −1, 3, −3, 1, 1, 3, 3, 3, −3, −3}, {3, −3, 1, 1, 1, 1, −3, 1, −3, 1, 3, −3, 1, 1, 3, −1, −3, 3, 1, −1, −3, 3, −3, −3}, {−3, −1, 1, 1, −3, −3, 3, −1, 3, −3, 1, −1, 3, 1, −3, 1, −3, −3, 3, 3, −3, −3, −3, −3}, {−1, 3, −1, 3, −1, 3, −3, −3, −3, −1, 1, −3, 3, 1, −3, 3, 3, −3, 1, 1, −1, −1, −3, −3}, {3, 1, −3, −3, 1, −1, −1, −1, −3, −1, 1, −3, 1, −3, 1, −3, −3, −1, 1, 1, −3, −1, −3, −3}, {1, −3, 3, 1, 1, −3, −3, −1, 1, 1, 3, 1, 3, 1, −1, 1, 3, −1, 3, −3, −1, −3, −3, −3}, {−3, 3, −3, 3, −3, 3, −3, 1, 1, −3, −1, −3, 3, 1, 3, −3, −1, 1, 1, 3, 3, 1, −3, −3}, {−1, −1, −3, 3, 3, −1, 1, −1, 1, −1, −3, 1, −1, −1, 3, −1, −1, 1, 3, −3, 3, −3, −3, −3}, {−3, −1, −1, 3, −3, −1, 1, 3, 1, −3, 3, −1, 3, −3, 1, −3, −1, −3, 3, 1, −3, −3, −3, −3}, {1, 3, 3, −3, −3, −3, −1, 1, −3, −1, 3, −1, 1, −1, −3, −3, 1, −1, 3, −1, −1, −1, −3, −3}, {−3, 3, −1, −3, −3, −1, −1, 1, 3, 3, −1, 3, −1, 3, −1, 1, 3, −3, 1, 1, −1, −1, −3, −3}, {3, −1, −3, 3, −1, −3, −1, 3, 1, −3, −3, −1, 1, −1, 1, −3, 1, 1, 1, −1, −1, −3, −3, −3}, {−3, −1, 1, 1, −3, −3, −1, 3, 1, 3, 1, −3, −1, −3, −1, −1, 1, −1, −1, 3, −1, −1, −3, −3}, {1, −1, −1, 3, −1, 3, 1, 1, −3, 1, 3, 3, −1, 1, −3, −3, −1, −1, −1, 3, 3, −3, −3, −3}, {1, −1, −3, −3, 1, 1, −3, 3, −1, 3, −3, 3, 3, 3, 1, 3, −1, 1, 3, 1, 3, 3, −3, −3}, {−1, −3, 3, −3, 3, 1, 3, −1, −1, −3, 3, −1, −1, −1, 3, −1, 3, −3, −1, 3, 3, 3, −3, −3}, {−3, 3, 3, 1, 1, 3, −3, 1, −1, 1, 1, 3, 1, −3, 3, −3, −3, 3, −1, −3, −1, 1, −3, −3}, {3, 3, −3, 3, 1, −1, −3, −1, −1, −1, −3, −1, 3, −1, 1, −3, −3, −1, −3, 1, −1, 1, −3, −3}, {−3, −1, 1, −1, −1, 3, 3, 3, −1, 1, −1, −1, 3, −1, −3, 1, −3, 3, −3, −3, 3, 3, −3, −3}, {1, −1, 3, 1, 1, 3, 1, 3, 1, −1, −1, −1, 3, −3, 1, 1, 3, −1, −1, 1, 3, 1, −3, −3}, {−1, 1, 1, −1, 1, 1, 3, −1, 1, −1, −1, −3, −3, −1, 3, 3, 1, −1, −3, 1, 3, 1, −3, −3}, {−3, 3, −3, 3, −1, 3, −1, −3, 3, 3, −1, 3, 3, 1, −1, 1, 3, −3, 1, 1, 3, 3, −3, −3}, {3, −1, −3, −1, 3, 1, −3, −1, −1, 3, 3, −1, 1, −3, −3, 1, −1, −1, 1, −1, −3, −3, −3, −3}, {1, 3, −3, 1, −3, 3, −1, −1, 1, 3, 1, 3, −1, 3, 3, 3, 3, 1, −1, −1, −3, 3, −3, −3}, {1, −3, −3, −3, 1, −3, −1, −1, 3, −1, 3, −3, −1, 3, 1, −3, 3, 1, 1, 1, 1, 1, −3, −3}, {−3, −1, 1, 3, 1, 1, −3, −3, 3, −3, 1, −1, −3, 1, −3, 1, −3, −1, −3, −1, −3, −3, −3, −3}, {3, 1, 1, −3, −1, 3, 1, −3, −3, −1, −3, 3, −3, −3, −3, 1, −3, 1, 1, 3, −3, 3, −3, −3}, {−3, 3, −3, 3, −3, −3, −3, −3, 1, 3, −1, 3, −1, 1, 1, −3, −3, 1, −3, −3, 1, 1, −3, −3}, {−1, −1, −1, 1, −3, −1, 1, −1, −1, −1, 3, −3, 3, −1, 3, 1, −1, 1, −1, 3, 3, −1, −3, −3}, {−1, −3, 1, −3, 3, −3, −3, −3, 3, −3, −3, −1, 1, 1, −3, −3, 1, 3, −1, 1, 3, −1, −3, −3}, {−3, −1, 3, 3, 3, −1, 1, −3, −1, 3, 1, −1, 3, 3, 1, −3, −3, −3, −3, −1, −3, 3, −3, −3}, {−3, −1, 3, −1, −1, −1, 1, 3, 3, 1, 3, −1, −1, −3, −1, −3, 3, −3, −3, −3, 3, 1, −3, −3}, {−3, 1, 3, −3, 3, −3, 3, −3, 3, −3, −1, −1, 1, 1, −3, −3, 3, −1, 3, 1, −1, 1, −3, −3}, {3, 1, 1, −1, −3, −1, 1, −3, 3, −1, 3, −1, −3, 3, 1, 3, −3, 1, 3, 3, 3, −3, −3, −3}, {1, −3, 3, −1, 1, 3, 3, 1, −1, 1, 1, −1, 3, −3, 3, 1, −1, −1, 3, −3, 3, 3, −3, −3}, {3, 3, −3, 3, −3, 3, −1, 3, −1, 1, −1, −1, −3, 3, 3, −1, −1, −3, 1, −3, −3, 1, −3, −3}, {−3, 1, −1, 3, −1, 3, 1, 1, −3, −3, 1, −3, −1, 3, −3, −3, −3, 1, −1, −1, −3, −3, −3, −3}, {−1, 3, 1, −1, −3, −1, 3, 1, 3, −3, −1, −3, 1, −3, −1, 3, 3, −3, 1, −3, −3, −3, −3, −3}, {1, −1, −3, 1, 3, −3, −1, 3, −3, 3, 1, −3, 3, −1, −1, −1, 3, −3, 3, −3, 3, −3, −3, −3}, {−1, 1, 3, 3, −1, 1, −3, 1, 3, −1, 3, 3, 1, −3, 3, −1, −3, 1, −1, −1, −1, −3,

−3, −3}, {3, 1, −1, 3, −1, −1, 1, −3, −1, 3, 3, −3, −1, −3, 1, 3, −3, 3, −3, 1, −3, −3, −3, −3}, {3, 1, −1, 3, −1, −1, 3, −1, 3, −1, 3, 1, 3, −1, 1, 3, −3, −1, −1, 1, 1, −1, −3, −3}, {−3, −3, −1, −1, −3, −1, 1, −3, 1, −3, −3, 3, 3, −1, −3, 3, 3, −3, 1, −1, 1, −1, −3, −3}, {3, 3, 3, −3, −3, 1, −1, −3, 1, −3, −3, −1, 1, −3, −1, 1, −1, 3, −3, 1, −1, −1, −3, −3}, {−3, 1, 3, 1, −3, −1, 3, 1, −3, −3, 3, 3, −3, 3, −1, −3, 3, −1, 1, 1, −1, 1, −3, −3}, {1, −1, 1, −1, −1, −3, 1, 3, 1, −1, 3, 1, 3, −1, 1, −3, −3, 1, −1, −1, 1, 3, −3, −3}, {1, 1, 1, 3, −3, 3, 3, 3, 3, −1, −1, 3, 1, 3, −1, 3, −1, −1, 1, −3, −3, 1, −3, −3}, {−1, 1, −3, 1, −3, −1, −3, −1, 3, 3, −3, −1, −1, 1, −1, 3, 1, −1, 3, 3, −1, −1, −3, −3}, {−3, −1, 1, −3, −3, 3, 1, 1, −1, 3, 1, 3, −3, −3, −1, −3, 1, −3, 3, −3, −3, 3, −3, −3}, {−1, 3, −3, 3, −1, 1, −3, −3, 3, −1, 1, 3, 3, 1, 3, 3, 1, −1, 3, −1, −3, 3, −3, −3}, {−3, 1, −3, 1, −3, 3, −3, −1, −1, 1, 3, −1, 1, −3, −1, 1, −3, 3, 1, −1, −3, −3, −3, −3}, {−1, 3, −1, −3, 1, −3, 3, 3, −3, −1, 1, −1, −1, −3, −3, −3, −1, 1, −3, −3, 3, 1, −3, −3}, {1, 3, 3, 3, 3, 3, −1, 1, −3, 1, −3, 1, −1, −3, −1, −3, 3, 1, −3, −3, 1, 1, −3, −3}, {1, 1, −1, −1, −3, 3, −3, −3, −3, 1, −3, 3, −3, −3, −1, 3, 1, −3, 1, 3, −3, 1, −3, −3}, {−3, −1, 1, −3, 1, −1, 3, 1, −3, 1, 3, 1, −3, −3, 3, 1, −3, −1, 1, −1, −1, −3, −3, −3}, {−3, −3, 3, −3, −3, −3, −3, 1, −3, −1, 1, 1, −1, −3, 1, 3, −3, −3, 1, −1, 1, 1, −3, −3}, {3, −3, −3, 3, −3, 3, −3, 1, −1, −3, 1, −1, −3, −3, 1, −3, −1, −3, 3, 1, 1, 3, −3, −3}, {1, 3, −1, −1, 3, −1, 3, 1, −3, −3, −1, 1, −3, 3, 1, 1, −3, 3, −3, −1, −3, −3, −3, −3}, {−3, 3, −3, −3, −1, −3, 1, −1, −1, 1, 3, −3, 1, 1, 1, −3, 1, −3, −1, 1, 1, −1, −3, −3}, {−3, −1, 3, −1, 1, −1, 1, 1, 3, −1, −3, 3, 1, 1, −3, −3, −1, −1, 3, −1, −1, −3, −3, −3}, {1, −1, −1, −3, −1, 3, −3, −1, −1, 3, −3, −1, 3, 1, 3, 1, −3, 1, −1, 3, 3, 3, −3, −3}, {−1, −1, −3, −3, −3, −1, −1, −3, 1, 3, 1, 3, −3, 3, −1, 3, −3, 3, 1, −3, 1, 1, −3, −3}, {−1, 3, 1, 3, 1, −1, −3, −1, −3, −3, 1, 3, −3, 1, 3, −3, −3, −1, −3, −3, 3, −1, −3, −3}, and {−3, 3, 1, −1, 1, −1, −3, −1, 3, −3, −3, −1, 1, 3, −3, 3, 3, −1, 3, −3, 3, −3, −3, −3}.

The sequence in the sequence set 2B includes some or all of the following 88 sequences whose PAPRs are less than 2.6 dB:

{−1, −3, 1, −1, 3, −1, 3, −1, 1, 3, 1, 1, −1, −1, −1, −1, −1, 1, 3, −3, 1, 1, −3, −3}, {−1, −3, 3, 1, 1, −3, 1, −3, −3, 1, −3, −1, −1, 3, −3, 3, 3, 3, −3, 1, 3, 3, −3, −3}, {1, 3, −3, −1, 3, −1, −3, 1, −3, −1, 1, 1, 3, 3, −1, −3, 3, 1, −1, −1, −3, −3, −3, −3}, {−1, 3, −1, 1, −3, 1, 1, −3, 3, 1, 1, 3, 3, −3, 1, −1, 3, 1, 1, 1, −1, −3, −3, −3}, {1, −1, −3, 1, 1, −3, −3, 3, 3, −3, 3, −1, 3, −1, −1, −3, −3, −3, −1, 1, −1, 3, −3, −3}, {3, −1, 1, −3, 3, −1, 1, −1, 3, 3, 1, 1, −3, −1, −1, −3, 3, −3, 3, 3, −3, 3, −3, −3}, {1, −1, −1, −1, 3, 3, 3, −3, −3, 1, −3, 1, −3, −3, 1, −3, −3, 1, −3, −3, −3, 1, −3, −3}, {3, −3, 3, 3, 3, 3, 3, −3, −1, 1, −3, −3, 3, 1, 3, −1, −3, 1, −1, 3, 1, 1, −3, −3}, {−1, −3, 3, −1, 3, 1, 3, −1, 1, −3, −1, −3, −1, 1, 3, −3, −1, −3, 3, 3, 3, −3, −3, −3}, {−1, 1, −3, −1, 3, 3, 1, 1, −1, 3, −1, 1, −1, −3, −1, 1, 1, −3, 3, −1, −3, 3, −3, −3}, {3, −1, 3, −1, 1, −3, 1, 1, −3, −3, 3, −3, −1, −1, −1, −1, −1, −3, −3, −1, 1, 1, −3, −3}, {−1, −1, 1, 1, −1, −1, 1, 3, −3, −3, 3, −1, −1, 3, −3, 3, 3, −1, 1, −3, 1, −3, 1, −3}, {−1, −3, 3, 1, −1, −1, 3, −1, 3, 3, −3, 1, −3, 1, −1, 1, 3, −3, −3, −1, −3, −3, −3, −3}, {−1, −3, 1, −1, −3, 1, −1, 3, −3, 1, −1, 1, −3, −1, 1, 3, −1, 1, 1, 1, 1, −3, −3, −3}, {3, −1, 1, −1, 3, −3, 1, −1, 1, −1, −3, 1, −3, 3, 1, 1, 3, −3, −1, −3, −3, −1, −3, −3}, {3, −1, 1, 3, −1, 1, −3, 3, −1, 3, 1, 1, −1, 3, 1, 1, 1, −1, −1, 1, 1, 3, −3, −3}, {1, −1, 1, −3, 3, 1, 3, −1, −3, 3, −1, −3, 3, 1, −3, −1, −1, −1, −3, −1, 3, −3, −3, −3}, {−1, 3, 1, −1, 1, 3, 3, 3, −1, −3, 1, 3, −3, 1, −3, −1, 1, 1, −1, −3, −1, −3, −3, −3}, {3, −3, 1, −3, −1, −3, 1, 1, −3, −1, 3, 3, −1, −1, −1, −3, −3, −1, −1, −3, −3, −3, −3}, {3, −3, −1, 1, −1, 1, −3, −1, 3, 1, 3, 1, −3, 1, −1, −3, −1, −1, −3, −3, 1, −1, −3, −3}, {1, −1, 1, −1, −3, 1, −3, 1, 3, −1, 3, 3, −1, −1, 3, −3, −1, −1, 3, 3, 3, −3, −3, −3}, {1, 3, 1, −3, 3, 1, −3, 3, −1, 1, −1, 1, 3, 3, 1, 3, −1, 1, 1, 3, −1, −1, −3, −3}, {3, 1, −3, −1, 1, −3, 3, 1, 1, −1, −3, −3, −1, −1, 3, 3, 3, 3, −3, 3, −3, 3, −3, −3}, {3, −1, −1, 3, −3, 1, −3, 1, −3, 3, 3, −1, 1, 1, −3, −3, 3, 1, 3, 3, 3, 3, −3, −3}, {−3, 3, 1, 1, −3, 1, −1, 1, −1, 3, −1, −1, 1, −3, −1, 1, −3, 1, 1, 1, 3, −3, −3, −3}, {1, −1, −1, 1, 1, −1, −1, −1, 3, 3, 1, 1, 3, −3, −3, −1, −3, 1, 1, −3, 1, −3, 1, −3}, {−1, 3, 1, −3, 1, −1, −3, 1, 1, −1, −3, −1, 1, −3, −1, 1, 1, 1, 3, −3, −1, −3, −3, −3}, {−3, 3, −3, 3, −1, 1, 1, 3, −1, 1, 3, −3, 3, 1, 3, 3, 1, −3, −1, 3, 3, 1, −3, −3}, {3, −1, 1, −1, 3, −3, 1, 1, 3, −1, −3, 3, 1, −3, 3, −1, −1, −1, −1, 1, −3, −3, −3, −3}, {3, −3, −1, 1, 1, 3, −3, −1, −3, −3, 1, −1, 3, 1, 1, −1, −3, −3, 3, −1, −3, −1, −3, −3}, {1, 1, −1, 1, −1, 1, −3, 1, −1, −3, 3, 1, 1, −3, −1, 3, 3, −1, 1, 1, 1, 3, −3, −3}, {3, −3, 1, −3, 1, 1, −1, 1, 1, 3, 3, −3, −3, 1, 1, −3, −1, −3, −3, −3, 1, −1, −3, −3}, {1, −3, 1, −3, 3, −1, 1, −1, 1, 3, 1, 3, −3, −1, −3, 3, 1, −1, −3, −1, −1, −3, −3, −3}, {−1, −3, −3, 3, 3, 1, −3, 1, 1, 1, −3, 1, −3, 3, −1, 1, 3, −3, 1, 3, 3, 3, −3, −3}, {3, 1, −1, −1, −3, 1, −3, 1, −3, −1, 3, −3, −1, 3, 3, −3, 1, 1, 3, 3, −3, −3, −3, −3}, {−1, 1, −3, −3, −1, 1, 1, 3, 1, −3, −1, 3, −3, 1, 3, 1, −1, −3, 3, −1, −3, −1, −3, −3}, {3, −1, 3, 3, 1, −1, −1, 3, −1, −1, 3, −1, −3, 1, −1, 1, −1, −1, −1, 1, 1, 3, −3, −3}, {−1, 1, 3, −3, 1, 1, −3, 1, −1, −3, 1, −1, −1, −3, 3, 1, 3, −1, 3, −1, 3, −3, −3, −3}, {1, −1, −3, 3, 3, 1, 3, −1, −1, 3, −3, −1, −1, 3, −1, −3, −1, −1, −1, 1, −3, 3, −3, −3}, {3, −1, 1, −3, 1, 3, −1, −3, 1, −1, −3, −1, −1, 1, 3, 3, −3, 3, 3, 3, 1, 1, −3, −3}, {−3, 1, 3, −1, 3, 3, −3, −1, −3, 3, −3, −3, 3, −3, 3, −1, −3, 3, 1, 1, 1, 1, −3, −3}, {1, −3, −3, 3, −3, −1, −3, −1, 1, −3, −3, −3, 3, −3, 1, 1, 1, −3, 3, −1, 3, 1, −3, −3}, {3, −3, 1, −3, 1, 1, 3, 1, −3, 1, −3, −3, −1, 1, 3, −1, −3, 3, 1, −1, −3, −3, −3, −3}, {1, −3, 1, −1, 3, −1, −1, 3, −3, −1, 3, 1, 3, −3, 3, 3, −3, −3, 3, 1, 1, −3, −3, −3}, {1, −3, −1, 3, 1, −3, −1, 3, −1, −3, 3, −1, 3, 1, 1, 3, −3, −3, −3, −1, −1, −3, −3, −3}, {3, 1, −3, 3, −1, 3, 1, 3, −3, 3, −3, −1, 1, 1, −3, 3, 3, 1, 3, −3, −1, −1, −3, −3}, {−1, 3, −3, −1, −3, 1, 3, −3, 1, −1, −3, 3, 3, 1, −1, 3, −1, 1, 1, 3, 1, 3, −3, −3}, {1, −3, 3, −1, −3, −1, 3, 3, 1, −1, 1, 1, 3, −3, −1, −3, −3, −3, −1, 3, −3, −1, −3, −3}, {−1, 3, −1, 3, −1, −1, −3, −1, −3, 1, 3, 3, −1, 1, −1, −1, 3, 3, −1, −3, 3, 3, −3, −3}, {3, 1, 3, 1, 3, 1, −3, 1, 3, −1, 3, −3, −1, 3, −3, −3, 1, 1, −1, −1, 3, 3, −3, −3}, {−1, 3, −1, 3, −1, −1, −3, 3, −1, 1, 3, −1, −1, −1, 1, 1, −1, 1, −1, 1, 1, −3, −3, −3}, {−3, −1, 1, −3, −3, 1, 1, −3, 3, −1, −1, −3, 1, 3, 1, −1, −3, −1, −3, 1, −3, −3, −3, −3}, {3, −1, 1, −1, −1, 3, −3, 3, −1, 3, −3, 3, 1, −3, −3, 3, −1, −3, −3, −1, −1, 3, −3, −3}, {1, −1, 1, 1, 3, 1, 3, −3, −1, 3, −1, −3, −1, −3, −3, −3, 3, 3, −1, −3, 1, 1, −3, −3}, {3, −3, 1, 1, 1, −3, 3, −1, 1, 3, 1, −1, 3, −3, 1, 1, 1, 1, −3, 3, −3, −3, −3, −3}, {−1, −1, 1, 3, −3, 3, 1, 3, −1, 1, −1, 3, −1, −3, 3, −1, 1, −3, −3, 3, −3, −1, −3, −3}, {−1, 3, −3, 1, −3, 3, 3, 3, −3, 1, 1, −1, −1, 3, 3, 3, 1, −3, 3, −1, 3, 3, −3, −3}, {−3, −3, −1, 3, 3, −3, −1, 1, −1, 1, 1, 1, −3, 1, −3, −3, 1, −3, −1, 3, 1, −1, −3, −3}, {3, −3, 3, −3, −3, 1, −1, 1, −1, −1, −3, −3, 1, −3, −1, −3, 3, 3, −1, −3, 1, 3, −3, −3}, {1, −3, 3, −3, 3, −1, −1, −3, −1, 1, 3, 3, −1, −1, 3, 3, −1, −1, −3, −1, −3, −3, −3, −3}, {3, −3, 3, −1, 3, −1, −1, −3, −3, −1, 3, −3, 1, −3, −3, 3, 1, −1, −3, 1, 3, 3, −3, −3}, {−3, 1, −3, 1, −3, −3, 1, −3, 1, −3, −3, −3, −3, −3, 1, −3, −3, 1, 1, −3, 1, 1, −3, −3}, {−1, −1, −3, 3, −3, 3, 1, −3, 1, 3, −1, 3, −3, −1, −3, −3, −1, −1, −3, −1, 1, 1, −3, −3}, {−3, −1, 1, 3, −1, 3, 3, −3, −1, −3, 1, 3, −3, 3, −1, 3, 3, 3, 3, 1, −1, −3, −3, −3}, {1, 1, 1, 3, 3, 1, −3, 3, 1, −1, −1, −1, −3, −3, 1, 3, −3, −1, 1, −3, 1, −3, 1, −3}, {−3, 3, 1, −1, −3, 1, −3, 1, 1, −1, 1, −3, −1, −3, −1, 3, 3, −3, 1, 3, 3, −3, −3, −3}, {−1, 3, −3, 3, 3, 1, 1, −3, −1, −1, 1, −3, 3, −1, 3, −3, −3, 3, 1, −3, 3, 3, −3, −3}, {1, −3, 3, 1, −3, 1, 3, −1, −3, 3, −1, 1, −3, −3, −3, 1, 3, −1, 1, 1, 3, −3, −3, −3}, {−3, 1, −1, 1, −3, −3, −1, −3, 1, −1, −3, −3, −1, −3, 3, 1, 1, 1, 3, −3, 1, −3, −3, −3}, {−3, 1, −3, 1, −1, 1, −3, −1, 3, −3, −1, −3, 3, 1, −1, 1, 3, −3, −3, 3, 3, 3, −3, −3}, {1, −3, −3, 1, −1, −1, 3, −1, 3, 3, 3, 3, −1, −3, 1, −3, −1, −3, −3, −3, 1, 3, −3, −3}, {−1, 1, 3, 1, −1, 1, 1, −1, −3, −1, −1, 1, −3, 1, 3, −1, −1, 3, 1, 3, 1, −3, −3, −3}, {−3, 3, 1, 1, 1, −3, −3, 1,

−3, 3, −1, 1, −1, 3, −1, 1, −3, −1, 1, −3, 3, −3, −3, −3}, {3, −3, −3, −1, 3, 3, −3, −1, 3, 1, 1, 1, 3, −1, 3, −3, −1, 3, −1, 3, 1, −1, −3, −3}, {−3, 1, −1, 3, 1, −3, 1, 3, −3, −3, −1, 3, −3, 1, 1, −3, −3, 3, −1, −1, −3, −3, −3, −3}, {3, −1, 3, −1, 1, −3, 3, 1, 3, 3, −1, 1, −1, −1, 1, 1, 3, −3, −3, 3, 3, 1, −3, −3}, {3, −3, 1, −1, 1, −1, 1, −1, 1, −3, −1, 1, −3, 1, −1, −3, 1, −1, 3, 3, 1, 1, −3, −3}, {−3, −1, 1, 3, −3, 1, −3, −1, 3, 1, 1, −3, 3, −3, 3, −1, −3, 1, −1, −1, −1, −1, −3, −3}, {−1, 3, 3, −1, 3, −3, 1, −1, 3, 1, −3, −1, −3, 3, 3, −1, −1, −1, 3, −3, −3, −3, −3, −3}, {−3, −3, −1, 3, −3, −1, 1, −1, −3, 1, −1, 3, 1, 3, 1, 3, −1, −3, −1, 1, 1, −1, −3, −3}, {−3, 3, 1, 3, −1, 1, −3, 1, −3, 1, −1, −3, −1, −3, −3, −3, −3, −1, −1, −1, 1, 1, −3, −3}, {−1, −3, −1, 3, −1, 3, −3, −3, 3, 3, 1, 3, 3, −1, −3, −3, −1, 3, −3, −3, 1, 1, −3, −3}, {−1, −1, −3, −3, 3, −3, 1, 3, −3, 1, 1, −3, 3, 1, 1, −3, 3, −1, 3, 1, 3, 3, −3, −3}, {1, −3, 1, 3, −3, 3, 1, −1, −3, −3, −3, 1, −1, −3, 1, −3, −1, −1, 1, −3, −3, −3, −3, −3}, {1, 1, 1, 1, −1, 3, 1, 3, −1, −1, −3, 1, −3, 1, 1, 3, −3, 1, −1, −3, 1, 3, −3, −3}, {1, 3, −3, 3, 3, −3, −3, −1, −1, 3, −3, 1, −1, 3, −1, 3, 1, −1, −1, 1, −1, −1, −3, −3}, {1, 3, −1, 3, 1, 1, 1, −1, 3, −3, 1, 1, −3, 3, −1, −3, 1, 1, −1, 1, 1, 3, −3, −3}, and {3, −1, −3, 1, −1, −3, 1, 3, 1, 3, −3, −3, −3, −3, 1, 3, −1, −1, −1, −3, −1, −1, −3, −3}.

The sequence in the sequence set 2C includes some or all of the following sequences:

{−1, 3, −1, 3, −1, 3, 3, −1, −1, 3, −1, −1, −1, −1, 3, 3, 3, −1, −1, 3, 3, 3, 3, 3}, {3, 3, −1, −1, −1, 3, 3, −1, −1, 3, 3, −1, 3, 3, −1, 3, −1, 3, −1, 3, 3, 3, 3, 3}, {−3, −3, −3, −3, −3, 1, 1, −3, −3, −3, −3, −3, 1, −3, 1, 1, −3, 1, 1, −3, 1, −3, 1, −3}, {−3, 1, −3, 1, −3, 1, 1, −3, 1, 1, −3, 1, −3, −3, −3, −3, −3, 1, 1, −3, −3, −3, −3, −3}, {1, 1, 1, −3, −3, 1, −3, −3, −3, 1, 1, −3, 1, 1, −3, 1, −3, −3, −3, 1, −3, 1, −3, −3}, {1, −3, 1, −3, 1, −3, 3, 3, −3, 1, −1, −1, 3, −3, −3, 3, −1, −1, 3, 3, 1, 1, 3, 3}, {3, 3, −3, −3, 3, 3, −1, −1, 3, 1, 1, 3, −1, −1, −3, 1, 3, 3, 1, −3, 1, −3, 1, −3}, {−1, 3, −1, 3, −1, 3, −3, −3, 3, −1, 1, 1, −3, 3, 3, −3, 1, 1, −3, −3, −1, −1, −3, −3}, {−3, −3, 3, 3, −3, −3, 1, 1, −3, −1, −1, −3, 1, 1, 3, −1, −3, −3, −1, 3, −1, 3, −1, 3}, {1, −3, 1, −3, 1, −1, 3, 3, −1, 3, 3, −1, −3, −3, 1, 1, 1, −3, −3, 3, 3, 3, 3, 3}, {−1, 3, −1, 3, −1, 1, −3, −3, 1, −3, −3, 1, 3, 3, −1, −1, −1, 3, 3, −3, −3, −3, −3, −3}, {1, −3, −1, −3, 1, −3, 1, 1, −3, −3, −3, 1, −1, −1, 3, −1, −1, 3, 3, 3, 3, 1, 3, 3}, {−1, 3, 1, 3, −1, 3, −1, −1, 3, 3, 3, −1, 1, 1, −3, 1, 1, −3, −3, −3, −3, −1, −3, −3}, {−3, 1, −3, −1, 1, −3, −1, 3, 1, −3, 1, 1, −1, −3, 1, 1, 1, −1, −1, 1, 1, 3, −3, −3}, {1, −3, 3, 1, −3, 3, −1, 1, −3, 1, 1, 3, −3, 1, 1, 1, 3, 3, 1, 1, −1, −3, −3, −3}, {3, −1, 3, 1, −1, 3, 1, −3, −1, 3, −1, −1, 1, 3, −1, −1, −1, 1, 1, −1, −1, −3, 3, 3}, {−1, 3, −3, −1, 3, −3, 1, −1, 3, −1, −1, −3, 3, −1, −1, −1, −3, −3, −1, −1, 1, 3, 3, 3}, {1, 1, −3, 1, 1, 3, −1, 3, −1, 3, −1, −3, −3, 1, −3, −3, −3, −3, 1, 1, 1, 1, −3, −3}, {−1, −1, 3, 3, 3, 3, −1, −1, −1, −1, 3, −1, −1, −3, 1, −3, 1, −3, 1, 3, 3, −1, 3, 3}, {1, 1, −3, −3, −3, −3, 1, 1, 1, 1, −3, 1, 1, 3, −1, 3, −1, 3, −1, −3, −3, 1, −3, −3}, {−1, −1, 3, −1, −1, −3, 1, −3, 1, −3, 1, 3, 3, −1, 3, 3, 3, 3, −1, −1, −1, −1, 3, 3}, {3, −3, 1, −3, −1, −3, −3, 3, 1, −3, 1, 1, 1, −1, 3, 1, −3, 3, 3, −3, −1, 1, 3, 3}, {−3, 3, −1, 3, 1, 3, 3, −3, −1, 3, −1, −1, −1, 1, −3, −1, 3, −3, −3, 3, 1, −1, −3, −3}, {−1, 3, 1, −3, −3, 1, 1, −1, 3, −3, 3, −1, −3, −3, 1, 3, 1, 1, 3, −3, 3, 3, 3, 3}, {1, −3, −1, 3, 3, −1, −1, 1, −3, 3, −3, 1, 3, 3, −1, −3, −1, −1, −3, 3, −3, −3, −3, −3}, {1, 3, 3, −3, −3, −1, −3, 1, 3, −1, 1, −3, −3, 3, 1, −3, 1, −1, −1, −3, −1, −1, −3, −3}, {−1, −3, −3, 3, 3, 1, 3, −1, −3, 1, −1, 3, 3, −3, −1, 3, −1, 1, 1, 3, 1, 1, 3, 3}, {1, 1, −1, 3, 3, 3, 1, −3, 3, −1, −3, −3, 1, 1, 3, −1, 1, −3, −1, −1, −1, 3, −3, −3}, {−1, −1, 1, −3, −3, −3, −1, 3, −3, 1, 3, 3, −1, −1, −3, 1, −1, 3, 1, 1, 1, −3, 3, 3}, {1, −3, −1, 3, −3, 1, −1, 3, −1, 3, 3, 3, 1, −3, 1, 1, 1, 1, −1, −1, 1, 1, 3, 3}, {−1, 3, 1, −3, 3, −1, 1, −3, 1, −3, −3, −3, −1, 3, −1, −1, −1, −1, 1, 1, −1, −1, −3, −3}, {3, −3, 3, −1, 1, −1, 3, −3, 3, 3, 1, 3, 3, 3, 3, −1, −3, 1, 1, −3, −1, 1, −3, −3}, {−3, 3, −3, 1, −1, 1, −3, 3, −3, −3, −1, −3, −3, −1, 3, −3, −3, −3, −3, 1, 3, −1, −1, 3, 1, −1, 3, 3}, {1, −3, −1, 3, 3, −1, 3, −3, −3, −1, −3, 1, −1, 3, 3, −1, −3, 1, 3, −3, −3, −3, 3, 3}, {−1, 3, 1, −3, −3, 1, −3, 3, 3, 1, 3, −1, 1, −3, −3, 1, 3, −1, −3, 3, 3, 3, 3, −3, −3}, {−1, −3, 3, 1, −3, −3, 1, 1, 3, −1, −1, 1, −3, 3, 3, −3, 1, −3, 1, 3, 3, 3, 3, 3, 3}, {1, 3, −3, −1, 1, −3, 3, 1, −1, 3, −3, −3, 3, −1, 1, −1, 3, −3, 3, −3, 3, 3, 3, 3}, {−1, −3, 3, 1, −1, 3, −3, −1, 1, −3, 3, 3, −3, 1, −1, 1, −3, 3, −3, 3, −3, −3, −3, −3}, {1, 3, −3, −1, 3, 3, −1, −1, −3, 1, 1, −1, 3, −3, −3, 3, −1, 3, −1, −3, −3, −3, −3, −3}, {−1, 3, −1, 3, −1, 3, −1, −1, 3, −1, −1, 3, −1, −1, 3, −1, −1, 3, 3, 3, −1, −1, 3, 3, 3, 3, 3}, {1, 3, −3, −3, −1, 3, 3, −1, 1, −1, −1, 1, −3, 3, 3, −3, 3, −3, 3, 3, 1, −3, 3, 3}, {−1, −3, 3, 3, 1, −3, −3, 1, −1, 1, 1, −1, 3, −3, −3, 3, −3, 3, −3, −3, −1, 3, −3, −3}, {−1, 1, −3, 3, −1, 1, −3, −3, 1, 1, 3, −1, −3, −3, −1, 3, 3, 1, 3, 1, 1, 3, 3, 3}, {1, −1, 3, −3, 1, −1, 3, 3, −1, −1, −3, 1, 3, 3, 1, −3, −3, −1, −3, −1, −1, −3, −3, −3}, {3, 1, −1, −3, 1, 3, −3, 1, 3, 3, 1, 1, −1, 1, −1, 3, −1, 1, 1, 3, 3, −3, −3}, {−3, −1, 1, 3, −1, −3, 3, −1, −3, −3, −1, −1, −1, 1, −1, 1, −3, 1, −1, −1, −3, −3, 3, 3}, {−3, −3, 3, 3, −3, −1, −3, −3, 3, −3, −1, 1, 3, 1, 3, 1, 3, −1, −1, −3, 1, −1, 3, 3}, {3, 3, −3, −3, 3, 1, 3, 3, −3, 3, 1, −1, −3, −1, −3, −1, −3, 1, 1, 3, −1, 1, −3, −3}, {−3, −3, 1, −1, 3, 1, 1, −3, −1, −3, −1, −3, −1, 1, 3, −3, 3, 3, 1, 3, −3, −3, 3, 3}, {3, 3, −1, 1, −3, −1, −1, 3, 1, 3, 1, 3, 1, −1, −3, 3, −3, −3, −1, −3, 3, 3, −3, −3}, {−1, −3, 3, −1, −3, 1, 1, −3, 1, 3, 1, −3, −3, −3, −3, −1, 3, 3, 3, 1, −3, −1, 3, 3}, {1, 3, −3, 1, 3, −1, −1, 3, −1, −3, −1, 3, 3, 3, 3, 1, −3, −3, −3, −1, 3, 1, −3, −3}, {3, −3, 3, −1, −3, −3, −1, 1, −1, 1, −3, 3, −3, −1, 1, −1, −1, 3, 1, −1, 1, −1, −1, −3, −3, −3}, {−3, 3, −3, 1, 3, 3, 1, −1, 1, −3, 3, −1, 1, 1, 3, −3, 1, −1, −1, 1, −1, 1, 1, 3, 3, 3}, {−1, −3, −3, −3, 3, 3, −3, 1, 1, −3, 3, −1, 1, −3, 3, −1, 3, −1, 1, 3, 3, 3, 1, −3, −3, −1, 3, −3, −3, −1, 3, −3, 3, −1, −3, −3, 3, 3}, {1, 3, −1, 1, 3, −1, 3, 1, −1, −3, −3, 3, −1, −3, −3, 3, −3, 3, −1, 1, 1, 3, −3, −3}, {1, 3, 3, 3, −3, −3, 3, −1, −1, 3, −3, 1, −1, 3, −3, 1, −3, 1, −1, −3, −3, −3, 3, 3}, {−3, 1, 3, −3, −1, 3, 3, −1, −3, 3, 1, −3, 1, 1, 1, −1, −3, −1, 3, 1, 3, −3, −3, −3}, {3, −1, −3, 3, 1, −3, −3, 1, 3, −3, −1, 3, −1, −1, −1, 1, 3, 1, −3, −1, −3, 3, 3, 3}, {−1, 3, −1, −3, 3, −3, −3, 3, −3, −1, 3, −1, −1, −1, 1, 3, −3, −3, 1, 1, −1, −3, 3, 3}, {1, −3, 1, 3, −3, 3, 3, −3, 3, 1, −3, 1, 1, 1, −1, −3, 3, 3, −1, −1, 1, 3, −3, −3}, {−3, 1, −3, 1, −1, 1, 1, −3, −3, −3, −3, 3, 1, 3, −3, −3, 3, 3, −1, −3, −3, 1, −3, −3}, {3, −1, 3, −1, 1, −1, −1, 3, 3, 3, 3, −3, −1, −3, 3, 3, −3, −3, 1, 3, 3, −1, 3, 3}, {3, 3, 3, 3, 3, 3, −3, −3, 1, 1, 1, −1, −3, 3, −1, 3, 3, −1, 1, −3, 1, −3, 1, −3}, {−1, −1, −1, −1, −1, −1, −3, −3, 1, 1, 1, 3, −3, −1, 3, −1, −1, 3, 1, −3, 1, −3, 1, −3}, {1, −1, 1, −1, 1, −3, 1, −3, 3, 1, −1, −3, −3, 3, 3, −1, 3, −3, −1, 1, 3, 3, −3, −3}, {1, 3, −1, 1, −3, 1, −3, 1, −1, −3, −1, −1, 1, 1, 1, 1, 1, −1, −3, 3, −1, −1, 3, 3}, {−1, −3, 1, −1, 3, −1, 3, −1, 1, 3, 1, 1, −1, −1, −1, −1, −1, 1, 3, −3, 1, 1, −3, −3}, {−1, 1, −1, 1, −1, 3, −1, 3, −3, −1, 1, 3, 3, −3, −3, 1, −3, 3, 1, −1, −3, −3, 3, 3}, {3, 1, 1, −1, −1, 3, −3, 1, −1, 3, 1, −1, −1, 1, −1, 3, −3, −1, −1, 1, 3, 1, 3, 3}, {−3, −1, 3, 3, −1, 3, −3, 1, −3, 3, 3, −1, 1, 1, 1, −1, −1, −3, 1, −1, 1, 1, 3, 3}, {−3, −1, −1, 1, 1, −3, 3, −1, 1, −3, −1, 1, 1, −1, 1, −3, 3, 1, 1, −1, −3, −1, −3, −3}, {3, 1, −3, −3, 1, −3, 3, −1, 3, −3, −3, 1, −1, −1, −1, 1, 1, 3, −1, 1, −1, −1, −3, −3}, {1, −1, 3, 1, −3, −1, 3, 1, −1, −1, 3, −3, 3, −1, 1, 3, 1, 3, −3, −1, −3, −3, −3, −3}, {−1, 1, −3, −1, 3, 1, −3, −1, 1, 1, −3, 3, −3, 1, −1, −3, −1, −3, 3, 1, 3, 3, 3, 3}, {1, 3, −3, −1, −1, 3, −1, 3, 3, −1, 3, 1, 1, −3, 3, −3, −3, −3, 3, −1, −3, −3, 3, 3}, {−1, −3, 3, 1, 1, −3, 1, −3, −3, 1, −3, −1, −1, 3, −3, 3, 3, 3, −3, 1, 3, 3, −3, −3}, {3, −1, −1, 1, −1, −1, −3, 1, 1, 3, 1, 1, −1, 3, 1, 3, −1, −1, −3, 1, −1, 1, −3, −3}, {−3, 1, 1, −1, 1, 1, 3, −1, −1, −3, −1, −1, 1, −3, −1, −3, 1, 1, 3, −1, 1, −1, 3, 3}, {3, 3, 3, 3, 3, 3, −1, −1, 3, 3, 3, 3, −1, −1, 3, −1, −1, 3, −1, 3, −1, 3, −1, 3}, {−1, 3, −1, 3, −1, −1, 3, −1, −1, 3, 3, −1, −1, −1, −1, 3, −1, −1, −1, 3, 3, 3, 3, 3}, {1, −1, 3, 1, 3, 1, −3, 3, 3, −1, −3, −1, −1, −1, 3, −3, −3, −3, 1, 3, −1, 1, −3, −3}, {−1, 1, −3, −1, −3, −1, 3, −3, −3, 1, 3, 1, 1, 1, −3, 3, 3, 3, −1, −3, 1, −1, 3, 3}, {−1, 1, −3, −1, 3, −3, −1, −3, 3, 3, −1, −3, 1, 3, 3, 1, −1, 1, −1, 3, 1, 3, 3, 3}, {1, −1, 3, 1, −3, 3, 1, 3, −3, −3, 1, 3, −1, −3, −3, −1, 1, −1, 1, −3, −1, −3, −3, −3}, {1, 3, −3, −3, 1, −1, 3, 3, −1, 3, −3, −3, 3, −1, −3, −1, 3, −1, −1, −1, −3, −3, 3, 3}, {−1, −3, 3, 3, −1, 1, −3, −3, 1, −3, 3, 3, −3, 1, 3, 1, −3, 1, 1, 1, 3, 3, −3, −3}, {3, −3, −1, 1, −1, −1, 3, 1, 3, 3, −1, −3, 1, −3, 1, −3, 1, −1, −1, −3, −1, −1, −3, −3}, {−3, 3, 1, −1, 1, 1, −3, −1, −3, −3, 1, 3, −1, 3, −1, 3, −1, 1, 1, 3, 1, 1, 3, 3}, {−3, 1, 3, −1, 3, 1, 3, −1, −1, −3, −3, 1, −3, 3, 1, −3, 3, 3, 3, 1, 3, 3, −3, −3}, {3, −1, −3, 1, −3, −1, −3, 1, 1, 3, 3, −1, 3, −3, −1, 3, −3, −3, −3, −1, −3, −3, 3, 3}, {−1, 3, −3, 1, 3, 1, −3, 1, −1, −1, −3, 3, 3, 3, −1, −3, 1, 1, 3, 1, 1, 1, 3, 3}, {1, −3, 3, −1, −3, −1, 3, −1, 1, 1, 3, −3, −3, −3, 1, 3, −1, −1, −3, −1, −1, −1, −3, −3}, {−3, 1, 3, −1, 1, −3, −1, −3, 1, −1, 3, 1, −1, −1, −3, −1, −1, −1, −3, −1, −1, 1, 3, 3}, {−1, 3, −3, −1, 3, −3, 3, −1, 3, −3, 3, −1, −3, 3, 3, 1, 1, −1, 1, 1, 3, 3, −3, −3}, {3, −1, −3, 1, −1, 3, 1, 3, −1, 1, −3, −1, 1, 1, 3, 1, 1, 1, 3, 1, 1, −1, −3, −3}, {1, −3, 3, 1, −3, 3, −3, 1, −3, 3, −3, 1, 3, −3, −3, −1, −1, 1, −1, −1, −3, −3, 3, 3}, {3, −1, −1, 3, 1, −3, −3, −1, −1, 3, −3, 1, −1, −3, −3, 3, 1, 3, −1, 3, −3, −3, −3, −3}, {3, −1, 3, −1, 1, 1, 1, 3, 1, −1, 3, 1, −1, −1, 1, 1, −3, −1, 3, 3, 1, 1, −3, −3}, {−1, 3, 3, −1, 1, −3, −3, 3, 3, −1, −3, 1, 3, −3, −3, −1, 1, −1, 3, −1, −3, −3, −3, −3}, {−3, 1, −3, 1, −1, −1, −1, −3, −1, 1, −3, −1, 1, 1, −1, −1, 3, 1, −3, −3, −1, −1, 3, 3}, {3, −3, −1, 1, −3, −1, 3, −1, 3, −1, −3, −1, −1, 1, 1, 1, −1, −3, 1, −1, −3, −3, −3, −3}, {−3, 3, 1, −1, 3, 1, −3, 1, −3, 1, 3, 1, 1, −1, −1, −1, 1, 3, −1, 1, 3, 3, 3, 3}, {1, 3, −3, −1, 3, −1, −3, 1, −3, −1, 1, 1, 3, 3, −1, −3, 3, 1, −1, −1, −3, −3, −3, −3}, {−1, −3, 3, 1, −3, 1, 3, −1, 3, 1, −1, −1, −3, −3, 1, 3, −3, −1, 1, 1, 3, 3, 3, 3}, {−1, 3, −1, 3, −3, 1, 3, −1, 1, 1, −3, 3, 3, −3, −3, 1, −1, 3, 3, 3, 1, 1, 3, 3}, {1, −3, 1, −3, 3, −1, −3, 1, −1, −1, 3, −3, −3, 3, 3, −1, 1, −3, −3, −3, −1, −1, −3, −3}, {3, −1, 3, −1, 3, −1, −3, 3, 1, 3, −1, −1, −3, −1, 1, 3, 3, −3, −3, 3, 3, −3, 3, 3}, {−3, 1, −3, 1, −3, 1, 3, −3, −1, −3, 1, 1, 3, 1, −1, −3, −3, 3, 3, −3, −3, 3, −3, −3}, {3, 3, −3, 3, 3, −3, −3, 3, 3, 1, −1, −3, −1, −1, 3, 1, 3, −3, −1, 3, −1, 3, −1, 3}, {−3, −3, 3, −3, −3, 3, 3, −3, −3, −1, 1, 3, 1, 1, −3, −1, −3, 3, 1, −3, 1, −3, 1, −3}, {3, 1, −3, −1, −1, 3, 1, 3, −1, 1, −3, 3, −1, 3, 3, 1, −1, −3, −3, −1, −3, −3, −3, −3}, {−3, −1, 3, 1, 1, −3, −1, −3, 1, −1, 3, −3, 1, −3, −3, −1, 1, 3, 3, 1, 3, 3, 3, 3}, {−3, −3, −1, 3, −3, 3, 3, −1, −1, 1, −3, −1, −1, −3, 1, −1, −1, 3, 3, −3, 3, −1, −3, −3}, {3, 3, 1, −3, 3, −3, −3, 1, 1, −1, 3, 1, 1, 3, −1, 1, 1, −3, −3, 3, −3, 1, 3, 3}, {1, 3, −1, −1, 1, −1, 3, 1, −1, 1, 1, −3, 1, 3, 1, 3, −1, −3, −3, −1, −1, −3, 3, 3}, {1, −1, 3, −1, −3, −3, 3, −1, 1, 1, −3, −3, −1, 1, −1, −1, 3, −1, 1, −3, −3, 3, −3, −3}, {−1, 1, −3, 1, 3, 3, −3, 1, −1, −1, 3, 3, 1, −1, 1, 1, −3, 1, −1, 3, 3, −3, 3, 3}, {−1, −3, 1, 1, −1, 1, −3, −1, 1, −1, −1, 3, −1, −3, −1, −3, 1, 3, 3, 1, 1, 3, −3, −3}, {3, 1, −3, 3, −3, 3, 1, −1, −1, 1, 1, 1, −3, −3, 1, 3, 3, 3, −1, 3, −3, 1, 3, 3}, {−3, −1, 3, −3, 3, −3, −1, 1, 1, −1, −1, −1, 3, 3, −1, −3, −3, −3, 1, −3, 3, −1, −3, −3}, {3, −3, −3, −3, 1, 1, −1, −1, 1, 3, −3, −1, 3, −1, 3, −1, −3, −3, −1, −3, 3, −1, −3, −3}, {−1, −3, −3, −3, 1, 1, 3, 3, 1, −1, −3, 3, −1, 3, −1, 3, −3, −3, 3, −3, −1, 3, −3, −3}, {3, 3, 3, −3, −3, 3, −1, 1, −3, 1, −3, 1, −1, −3, −1, −3, 3, 1, 3, −3, −1, 1, −3, −3}, {1, 1, −3, −1, 1, 3, −3, 3, 1, −1, 1, −1, −3, 1, −3, 1, −3, −1, 3, 1, 1, 3, 3, 3}, {−1, −1, −1, −3, −3, −1, 3, 1, −3, 1, −3, 1, 3, −3, 3, −3, −1, 1, −1, −3, 3, 1, −3, −3}, {−1, −1, 3, 1, −1, −3, 3, −3, −1, 1, −1, 1, 3, −1, 3, −1, 3, 1, −3, −1, −1, −3, −3, −3}, {3, −1, 3, 3, 3, 3, −1, 3, −1, 3, 3, 3, −1, 3, 3, −1, −1, 3, −1, −1, −1, −1, 3, 3}, {1, −3, −3, 1, −3, 1, 1, 1, −3, −3, 1, 1, 1, −3, 1, 1, 1, 1, 1, −3, 1, −3, −3, −3}, {−3, 1, −3, 3, 1, −3, 1, −1, −1, −3, −3, −1, 3, −3, 1, −1, −3, −3, 1, 1, 1, 3, 3, 3}, {−1, 3, −1, 1, −3, 1, 1, −3, 3, 1, 1, 3, 3, −3, 1, −1, 3, 1, 1, 1, −1, −3, −3, −3}, {3, −1, 3, −3, −1, 3, −1, 1, 1, 3, 3, 1, −3, 3, −1, 1, 3, 3, −1, −1, −1, −3, −3, −3}, {1, −3, 1, −1, 3, −1, −1, 3, −3, −1, −1, −3, −3, 3, −1, 1, −3, −1, −1, −1, 1, 3, 3, 3}, {3, −1, 1, −1, −3, −1, −3, −1, −3, −3, 1, −3, 3, −1, −1, 3, −3, 1, 1, 1, 3, 3, −3, −3}, {−3, 1, −1, 1, 3, 1, 3, 1, 3, 3, −1, 3, −3, 1, 1, −3, 3, −1, −1, −1, −3, −3, 3, 3}, {3, −1, 1, −3, −1, 3, −1, −1, −1, 3, −3, −3, −3, 3, −1, −1, −1, 3, −1, −3, 1, −1, 3, 3}, {−3, 1, −1, 3, 1, −3, 1, 1, 1, −3, 3, 3, 3, −3, 1, 1, 1, −3, 1, 3, −1, 1, −3, −3}, {−3, 3, −1, −1, 1, −1, −3, 1, 1, 3, −1, 3, −1, 1, 3, −3, 1, −1, −1, −1, 1, −1, −3, −3}, {3, −3, 1, 1, −1, 1, 3, −1, −1, −3, 1, −3, 1, −1, −3, 3, −1, 1, 1, 1, −1, 1, 3, 3}, {3, −1, 3, −3, 1, −3, 3, 1, −3, −3, −1, 3, 3, 3, 3, −1, −1, 1, 1, 1, −1, 3, 3, 3}, {3, −1, 3, 1, −3, 1, 3, −3, 1, 1, −1, 3, 3, 3, 3, −1, −1, −3, −3, −3, −1, 3, 3, 3}, {−3, −3, 1, 1, −3, −3, −3, −3, 3, 3, −3, 3, 3, −3, −3, −1, 1, −1, −1, 3, −1, 3, −1, 3}, {3, 3, −1, −1, 3, 3, 3, 3, −3, −3, 3, −3, −3, 3, 3, 1, −1, 1, 1, −3, 1, −3, 1, −3}, {−3, −1, 1, 1, 1, −3, 1, 3, 3, −3, 3, −1, 1, −3, 1, −1, −3, −1, −1, 3, −1, −1, −3, −3}, {3, 1, −1, −1, −1, 3, −1, −3, −3, 3, −3, 1, −1, 3, −1, 1, 3, 1, 1, −3, 1, 1, 3, 3}, {−1, −3, 1, −3, 1, −1, 3, 1, 3, −3, 1, −3, −3, −3, −1, 3, 3, 3, 3, 3, −1, −1, 3, 3}, {1, 3, −1, 3, −1, 1, −3, −1, −3, 3, −1, 3, 3, 3, 1, −3, −3, −3, −3, −3, 1, 1, −3, −3}, {1, 3, 3, −1, 1, 1, 3, 1, −3, 3, −1, −1, −1, −3, −3, 3, 1, 3, −1, 3, −3, 1, −3, −3}, {−1, −3, −3, 1, −1, −1, −3, −1, 3, −3, 1, 1, 1, 3, 3, −3, −1, −3, 1, −3, 3, −1, 3, 3}, {−3, 3, 1, −1, 3, 1, −3, −1, −3, 1, −3, −1, 1, 3, −1, 1, −3, −3, −3, −1, −1, −1, −3, −3}, {3, −3, −1, 1, −3, −1, 3, 1, 3, −1, 3, 1, −1, −3, 1, −1, 3, 3, 3, 1, 1, 1, 3, 3}, {3, −1, −3, 1, 3, 1, 1, −3, −3, −1, 1, 1, −3, 1, 3, −1, 3, 3, −1, −3, −3, −3, −3, −3}, {3, −1, 3, −1, 3, 1, 1, −3, −3, −3, −1, −1, −1, 3, −3, −1, 3, 3, −1, −3, −1, −1, −3, −3}, {−3, 1, −3, 1, −3, −1, −1, 3, 3, 3, 1, 1, 1, −3, 3, 1, −3, −3, 1, 3, 1, 1, 3, 3}, {−1, 3, −3, 1, −1, 1, 1, −3, −3, 3, 1, 1, −3, 1, −1, 3, −1, −1, 3, −3, −3, −3, −3, −3}, {1, −3, −3, 1, 1, 1, −3, 3, 1, −1, 3, −1, 1, −3, 1, −1, 1, −1, −1, −1, 3, 3, 3, 3}, {−1, 3, 3, −1, −1, −1, 3, −3, −1, 1, −3, 1, −1, 3, −1, 1, −1, 1, 1, 1, −3, −3, −3, −3}, {−3, 1, 1, −3, −3, 1, 1, −3, −3, 3, −1, 3, −1, −3, −3, −3, −1, 1, −1, 1, −3, −3, −3, −3}, {3, −1, −1, 3, 3, −1, −1, 3, 3, −3, 1, −3, 1, 3, 3, 3, 1, −1, 1, −1, 3, 3, 3, 3}, {3, 1, −3, −1, 1, −1, 3, −3, 1, −1, 3, −1, −3, 3, −3, 1, 1, −3, −3, 3, −3, −3, −3, −3}, {−3, −1, 3, 1, −1, 1, −3, 3, −1, 1, −3, 1, 3, −3, 3, −1, −1, 3, 3, −3, 3, 3, 3, 3}, {−3, 3, 1, 1, −1, −1, 3, −1, 1, −3, 1, −1, −1, 3, −1, −1, 1, −3, −1, −1, 1, 1, 3, 3}, {3, −3, −1, −1, 1, 1, −3, 1, −1, 3, −1, 1, 1, −3, 1, 1, −1, 3, 1, 1, −1, −1, −3, −3}, {−3, 3, 1, −1, 3, 1, −1, 1, 3, 3, 3, 1, 3, 1, 3, −1, −3, −1, 1, 3, −1, 3, −3, −3}, {3, 1, −3, −1, 1, −3, 1, −3, −3, −1, 3, 3, −1, −1, −3, 3, −1, 3, 3, 3, −3, −3, −3, −3}, {−3, −1, 3, 1, −1, 3, −1, 3, 3, 1, −3, −3, 1, 1, 3, −3, 1, −3, −3, −3, 3, 3, 3, 3}, {3, −3, −1, 1, −3, −1, 1, −1, −3, −3, −3, −1, −3, −1, −3, 1, 3, 1, −1, −3, 1, −3, 3, 3}, {−3, 3, −1, 1, −1, 3, 1, 3, 3, −3, 3, 1, 1, 1, 1, −3, 1, 1, −1, 3, −3, −1, 3, 3}, {3, −3, 1, −1, 1, −3, −1, −3, −3, 3, −3, −1, −1, −1, −1, 3, −1, −1, 1, −3, 3, 1, −3, −3}, and {−3, 1, 1, −3, −3, 1, 1, −3, 1, −3, 1, 1, −3, −3, −3, −3, 1, −3, 1, −3, −3, −3, −3, −3}.

The sequence in the third sequence set includes at least one of the following: a sequence in a sequence set 3A, a sequence in a sequence set 3B, and a sequence in a sequence set 3C. The sequence in the sequence set 3A includes some or all of the following sequences:

{−1, 1, 1, −3, −3, 3}, {−1, −3, −3, 1, 1, 3}, {−1, −3, 1, 3, 3, 1}, {1, 3, −1, −3, −3, −1}, {−1, −3, −1, 1, −1, 1}, {−1, 1, −1, 1, 3, 1}, {3, 3, −1, −1, −1, −1}, {−3, −3, −3, −3, 1, 1}, {−3, 1, 1, −3, −3, 1}, {−3, −3, −3, 1, 1, 1}, {−3, 1, −1, −3, 3, 3}, and {−3, −1, −1, −1, −1, −3}.

The sequence in the sequence set 3B includes some or all of the following sequences:

{1, 1, −3, 3, 1, 3}, {1, 1, −1, −3, 1, −3}, {1, 1, 1, −1, −3, 1}, {1, 1, 1, 3, −3, 1}, {1, 1, 3, −3, 1, −3}, {1, 1, −3, −1, −3, −1}, {1, 1, −1, 1, 1, −3}, {1, 1, 3, 3, −1, 3}, {1, 1, 1, −3, 3, −1}, {1, 1, −1, −1, 3, −1}, {1, 1, 1, −3, −1, 3}, {1, 1, 1, −3,

1, -1}, {1, 1, 1, -3, 1, 3}, {1, 1, -1, -3, -1, 1}, {1, 1, 3, -3, 3, 1}, {1, 1, -3, -3, 1, -3}, {1, 1, -3, 1, 3, 3}, {1, 1, 3, -1, 3, 3}, {1, 1, -1, 3, -1, -1}, {1, 1, -3, 1, -1, -1}, {1, 1, 3, -1, -3, 3}, {1, 1, 1, -1, 3, -3}, {1, 1, -1, 3, -3, -1}, {1, 1, 1, 3, -1, -3}, {1, 1, 3, -1, 1, -1}, {1, 1, -3, 3, -1, 1}, {1, 1, -3, -1, 3, 1}, {1, 1, -1, 3, 1, 3}, and {1, 1, -3, 1, 1, 1}.

The sequence in the sequence set 3C includes some or all of the following sequences:

{1, 1, -1, -1, -3, 1}, {1, 1, -1, -1, 1, -3}, {1, 1, -1, -3, -3, -1}, {1, 1, -1, 3, -1, -3}, {1, 1, -1, 3, -1, 3}, {1, 1, -1, 3, -3, 1}, {1, 1, -1, 3, 1, -3}, {1, 1, -1, 1, -3, 1}, {1, 1, -1, 1, 3, -3}, {1, 1, -1, 1, 3, 1}, {1, 1, -3, -1, -1, -1}, {1, 1, -3, -1, 3, -1}, {1, 1, -3, 3, -1, 3}, {1, 1, -3, 3, 3, 3}, {1, 1, -3, 1, 1, -1}, {1, 1, -3, 1, 1, 3}, {1, 1, 3, -1, -3, 1}, {1, 1, 3, -1, 3, -1}, {1, 1, 3, -1, 3, -3}, {1, 1, 3, -1, 1, -3}, {1, 1, 3, -3, -3, 3}, {1, 1, 3, 3, -3, 1}, {1, 1, 3, 3, 1, -3}, {1, 1, 3, 1, -1, -3}, {1, 1, 3, 1, -1, 1}, {1, 1, 3, 1, -3, 1}, {1, 1, 1, -1, -1, 3}, {1, 1, 1, -1, 3, 3}, {1, 1, 1, -1, 1, -3}, {1, 1, 1, 3, -1, -1}, {1, 1, 1, 3, 3, -1}, {1, 1, 1, 3, 1, -3}, {1, 1, 1, -1, 3}, {1, 1, 1, 1, -3, -1}, {1, 1, 1, 1, -3, 3}, and {1, 1, 1, 1, 3, -1}.

A PAPR of a sequence $\{f_n\}$ corresponding to the sequence in the set 3A is less than 4.2597 dB, and a cubic metric (CM) value of the sequence $\{f_n\}$ is less than 1.5140 dB. A PAPR of a sequence $\{f_n\}$ corresponding to the sequence in the set 3B is less than 4.7 dB, and a cubic metric (CM) value of the sequence $\{f_n\}$ is less than 2.4 dB.

An equivalent sequence of a sequence $\{s_n\}$ in each sequence set described above may be represented by $\{q_n\}$. An element $q_n$ in the equivalent sequence $\{q_n\}$ meets $q_n=s_n+u_n \pmod 8$. During specific implementation, optionally, a sequence $\{u_n\}$ including $u_n$ includes:

$u_n=f+g\cdot n \pmod 8$, where n=0, 1, . . . , or N−1, N is a sequence length, $f\in\{0,2,4,6\}$, and $g\in\{0,2,4,6\}$.

For example, when N is 24, $\{u_n\}$ is the following 16 sequences:

{0, 0, 0, 0, 0, 0, 0, 0, 0, 0, 0, 0, 0, 0, 0, 0, 0, 0, 0, 0, 0, 0, 0, 0}, {0, 2, 4, 6, 0, 2, 4, 6, 0, 2, 4, 6, 0, 2, 4, 6, 0, 2, 4, 6, 0, 2, 4, 6}, {0, 4, 0, 4, 0, 4, 0, 4, 0, 4, 0, 4, 0, 4, 0, 4, 0, 4, 0, 4, 0, 4, 0, 4}, {0, 6, 4, 2, 0, 6, 4, 2, 0, 6, 4, 2, 0, 6, 4, 2, 0, 6, 4, 2, 0, 6, 4, 2}, {2, 0, 6, 4, 2, 0, 6, 4, 2, 0, 6, 4, 2, 0, 6, 4, 2, 0, 6, 4, 2, 0, 6, 4}, {2, 2, 2, 2, 2, 2, 2, 2, 2, 2, 2, 2, 2, 2, 2, 2, 2, 2, 2, 2, 2, 2, 2, 2}, {2, 4, 6, 0, 2, 4, 6, 0, 2, 4, 6, 0, 2, 4, 6, 0, 2, 4, 6, 0, 2, 4, 6, 0}, {2, 6, 2, 6, 2, 6, 2, 6, 2, 6, 2, 6, 2, 6, 2, 6, 2, 6, 2, 6, 2, 6, 2, 6}, {4, 0, 4, 0, 4, 0, 4, 0, 4, 0, 4, 0, 4, 0, 4, 0, 4, 0, 4, 0, 4, 0, 4, 0}, {4, 2, 0, 6, 4, 2, 0, 6, 4, 2, 0, 6, 4, 2, 0, 6, 4, 2, 0, 6, 4, 2, 0, 6}, {4, 4, 4, 4, 4, 4, 4, 4, 4, 4, 4, 4, 4, 4, 4, 4, 4, 4, 4, 4, 4, 4, 4, 4}, {4, 6, 0, 2, 4, 6, 0, 2, 4, 6, 0, 2, 4, 6, 0, 2, 4, 6, 0, 2, 4, 6, 0, 2}, {6, 0, 2, 4, 6, 0, 2, 4, 6, 0, 2, 4, 6, 0, 2, 4, 6, 0, 2, 4, 6, 0, 2, 4}, {6, 2, 6, 2, 6, 2, 6, 2, 6, 2, 6, 2, 6, 2, 6, 2, 6, 2, 6, 2, 6, 2, 6, 2}, {6, 4, 2, 0, 6, 4, 2, 0, 6, 4, 2, 0, 6, 4, 2, 0, 6, 4, 2, 0, 6, 4, 2, 0}, and {6, 6, 6, 6, 6, 6, 6, 6, 6, 6, 6, 6, 6, 6, 6, 6, 6, 6, 6, 6, 6, 6, 6, 6}.

For example, a sequence {-3, 3, 1, -1, 1, -1, -3, -1, 3, -3, -3, -1, 1, 3, -3, 3, 3, -1, 3, -3, 3, -3, -3, -3} is equivalent to the following 16 sequences:

{1, 1, 1, 1, -3, -3, -3, 1, -1, 3, -3, 1, -3, 1, -3, -3, -1, -3, 3, -1, -1, 3, -3, -1}, {1, 3, -3, -1, -3, -1, 1, -1, -1, -3, 1, -1, -3, 3, 1, 3, -1, -1, -1, -3, -1, -3, 1, -3}, {1, -3, 1, -3, -3, 1, -3, -3, -1, -1, -3, -3, -3, -3, -3, 1, -1, 1, 3, 3, -1, -1, -3, 3}, {1, -1, -3, 3, -3, 3, 1, 3, -1, 1, 1, 3, -3, -1, 1, -1, -1, 3, -1, 1, -1, 1, 1, 1}, {3, 1, -1, -3, -1, -3, 3, -3, 1, 3, 3, -3, -1, 1, 3, 1, 1, -3, 1, 3, 1, 3, 3, 3}, {3, 3, 3, 3, -1, -1, -1, 3, 1, -3, -1, 3, -1, 3, -1, -1, 1, -1, -3, 1, 1, -3, -1, 1}, {3, -3, -1, 1, -1, 1, 3, 1, 1, -1, 3, 1, -1, -3, 3, -3, 1, 1, 1, -1, 1, -1, 3, -1}, {3, -1, 3, -1, -1, 3, -1, -1, 1, 1, -1, -1, -1, -1, -1, 3, 1, 3, -3, -3, 1, 1, -1, -3}, {-3, 1, -3, 1, 1, -3, 1, 1, 3, 3, 1, 1, 1, 1, 1, -3, 3, -3, -1, -1, 3, 3, 1, -1}, {-3, 3, 1, -1, 1, -1, -3, -1, 3, -3, -3, -1, 1, 3, -3, 3, 3, -1, 3, -3, 3, -3, -3, -3}, {-3, -3, -3, -3, 1, 1, 1, -3, 3, -1, 1, -3, 1, -3, 1, 1, 3, 1, -1, 3, 3, -1, 1, 3}, {-3, -1, 1, 3, 1, 3, -3, 3, 3, 1, -3, 3, 1, -1, -3, -1, 3, 3, 3, 1, 3, 1, -3, 1}, {-1, 1, 3, -3, 3, -3, -1, -3, -3, 3, -1, -3, 3, 1, -1, 1, -3, -3, -3, 3, -3, 3, -1, 3}, {-1, 3, -1, 3, 3, -1, 3, 3, -3, -3, 3, 3, 3, 3, 3, -1, -3, -1, 1, 1, -3, -3, 3, 1}, {-1, -3, 3, 1, 3, 1, -1, 1, -3, -1, -1, 1, 3, -3, -1, -3, -3, 1, -3, -1, -3, -1, -1, -1}, and {-1, -1, -1, -1, 3, 3, 3, -1, -3, 1, 3, -1, 3, -1, 3, 3, -3, 3, 1, -3, -3, 1, 3, -3}.

Herein, in the case that an equivalent sequence of $\{s_n\}$ is $\{q_n\}$, a difference between a sequence $\{u\cdot e^{\pi j s_n/4}\}$ and a sequence $\{u\cdot e^{\pi j q_n/4}\}$ is a constant, or a constant and a cyclic shift transformation. Therefore, a maximum value of an absolute value of a cyclic shift autocorrelation between the two sequences is 1.

Figure 2:
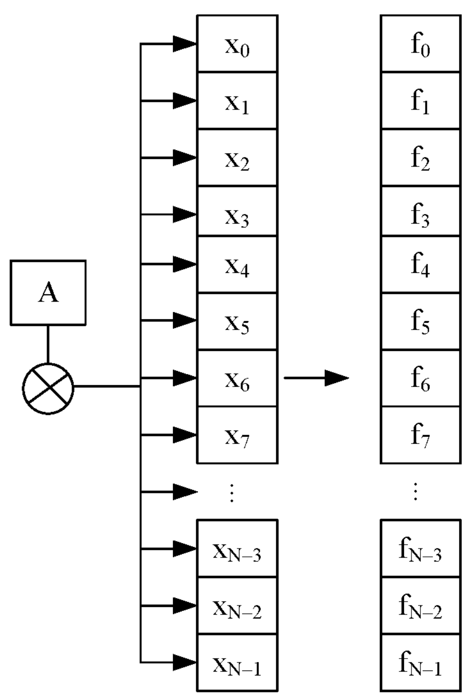
FIG. 2 is a schematic flowchart of determining a sequence $\{f_n\}$ by a terminal according to an embodiment of this application.

In a possible example, a process of determining the sequence $\{f_n\}$ consisting the N elements by the terminal after the terminal accesses the network may be shown in FIG. 2. A specific procedure is as follows:

The terminal determines the sequence $\{x_n\}$ and A. The value of n ranges from 0 to N−1, and A is a non-zero complex number. The sequence $\{x_n\}$ may be stored by the terminal, or may be configured by the network device for the terminal, or may be calculated by the terminal based on a predefined formula. For example, the sequence $\{x_n\}$ is obtained by using a disclosed element $x_n=u\cdot\exp(\pi\cdot j\cdot s_n/4)$ in $\{x_n\}$, and a sequence $\{f_n=A\cdot x_n\}$ is obtained by separately multiplying A by $x_n$. A value range of A is {1, −1, j, −j}.

S102. The terminal maps the sequence $\{f_n\}$ consisting the N elements to N subcarriers to generate a first signal, and sends the first signal to a network device.

Herein, S102 is mainly performed by the terminal by respectively mapping the N elements in the configured sequence $\{f_n\}$ to the N subcarriers to generate the first signal, and sending the first signal to the network device.

Figure 3:
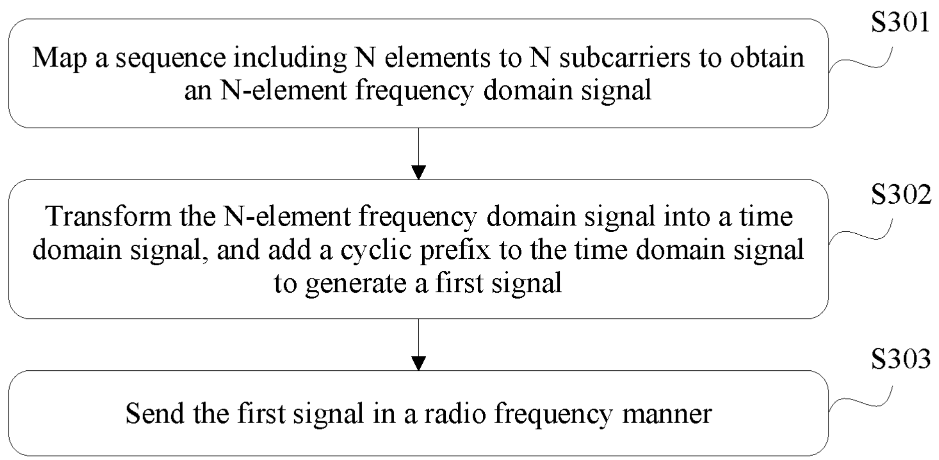
FIG. 3 is a schematic flowchart of generating and sending a first signal by a terminal according to an embodiment of this application.

Optionally, a specific process of mapping, by the terminal, the sequence $\{f_n\}$ consisting the N elements to the N subcarriers to generate the first signal, and sending the first signal to the network device is shown in FIG. 3, and includes the following steps.

S301. The terminal maps the sequence $\{f_n\}$ consisting the N elements to the N subcarriers to obtain an N-element frequency domain signal (namely, a frequency domain signal consisting of N elements).

Figure 4A:
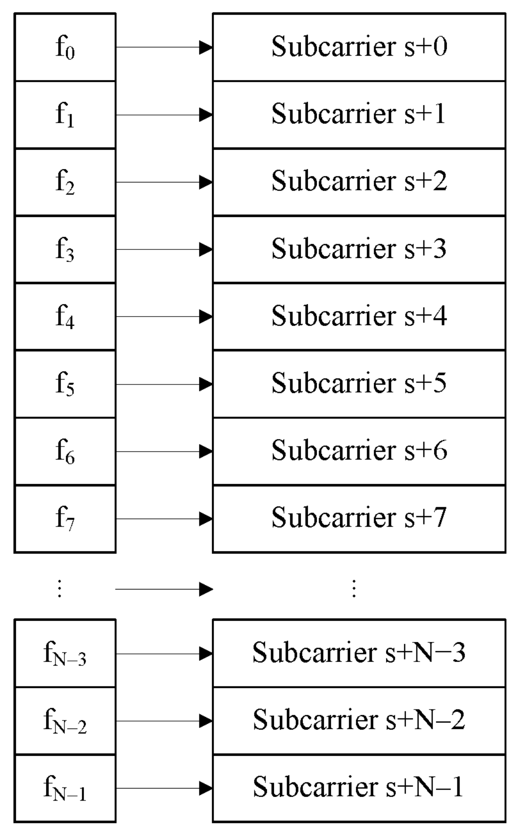
FIG. 4*a* and FIG. 4*b* are schematic diagrams of mapping a sequence $\{f_n\}$ consisting of N elements to N subcarriers according to an embodiment of this application.
Figure 4B:
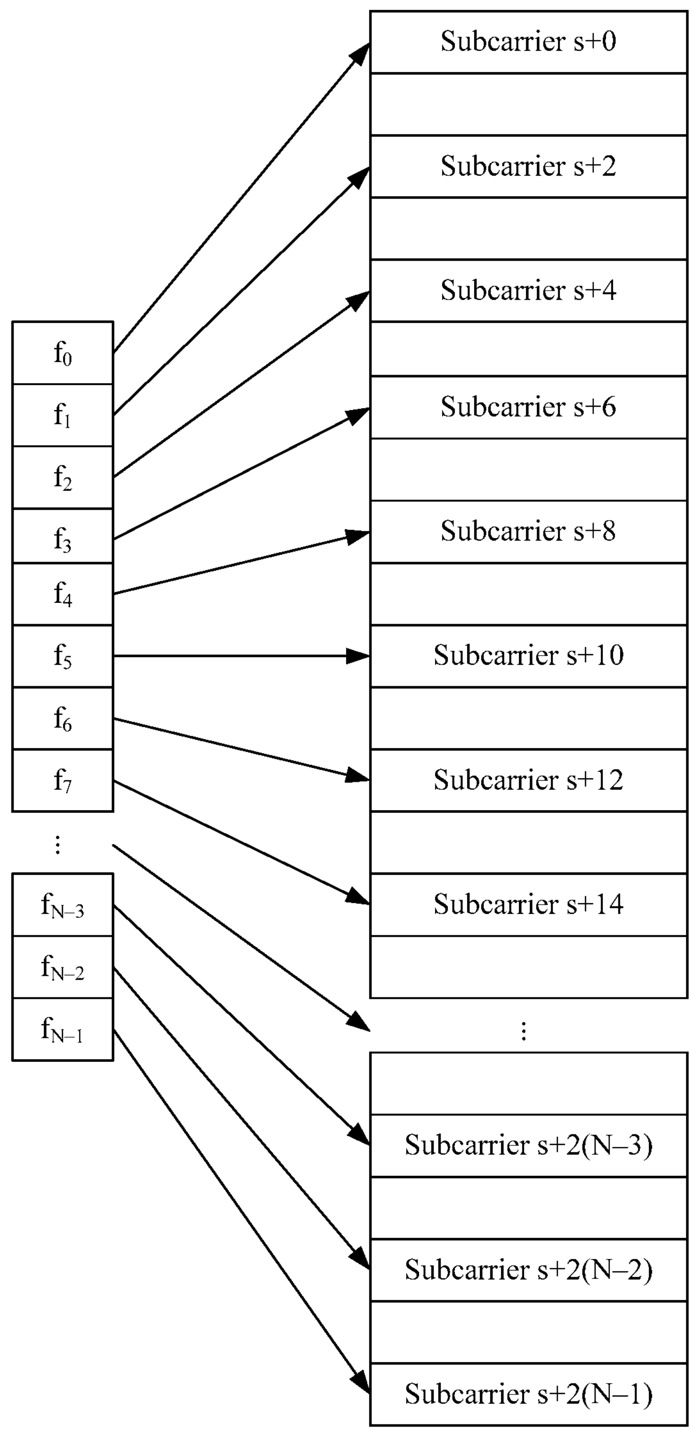

In FIG. 4a and FIG. 4b disclosed in the embodiments of this application, s indicates a subcarrier index that is in a communications system and that is of a first subcarrier in the N subcarriers to which the sequence $\{f_n\}$ is mapped.

Optionally, the terminal maps the sequence $\{f_n\}$ consisting the N elements to N consecutive subcarriers. As shown in FIG. 4a, optionally, elements $f_0$ to $f_{N-1}$ in the sequence $\{f_n\}$ are respectively mapped to N consecutive subcarriers, and the subcarriers are numbered s+0, s+1, . . . , and s+N−1.

In a possible example, the terminal successively maps the N elements in the sequence $\{f_n\}$ to the N subcarriers in descending order. One element in the sequence $\{f_n\}$ is mapped to one frequency domain subcarrier. The frequency domain subcarrier is a smallest unit of frequency domain resources, and is used to carry data information.

In a possible example, the terminal successively maps the N elements in the sequence $\{f_n\}$ to the N subcarriers in ascending order. Mapping one element in the sequence $\{f_n\}$ to one subcarrier means that the element is carried on the subcarrier. After the mapping, sending data by the terminal in a radio frequency manner is equivalent to sending the element on the subcarrier. In the communications system, different terminals may send data by using different subcarriers. Locations of the N subcarriers in a plurality of subcarriers in the communications system may be predefined or configured by the network device by using signaling.

Optionally, the N elements in the sequence $\{f_n\}$ may be respectively mapped to N equally spaced subcarriers. As shown in FIG. 4*b*, optionally, spacings between the N subcarriers are 1, and the N subcarriers are equally spaced in frequency domain. Spacings between subcarriers to which elements $f_0$ to $f_N$, in the sequence $\{f_n\}$ are mapped are one subcarrier. Specifically, the elements $f_0$ to $f_N$, in the sequence $\{f_n\}$ are respectively mapped to N equally spaced subcarriers, and the subcarriers are numbered s+0, s+2, . . . , and s+2(N−1).

In this embodiment of this application, a manner of respectively mapping the N elements in the sequence $\{f_n\}$ to the N subcarriers is not limited to the foregoing manner.

S302. Transform the N-element frequency domain signal into a time domain signal through inverse fast Fourier transformation (IFFT), and add a cyclic prefix to the time domain signal to generate the first signal.

S303. Send the first signal in a radio frequency manner.

Optionally, during execution of S302, the time domain signal obtained by the terminal by performing IFFT on the generated N-element frequency domain signal is an OFDM symbol. During execution of S303, the terminal sends the first signal in a radio frequency manner. In other words, the terminal sends, on the N subcarriers, the first signal carrying the sequence $\{f_n\}$.

In a possible example, the terminal may send, on one OFDM symbol, the first signal carrying the sequence $\{f_n\}$, or may send, on a plurality of OFDM symbols, the first signal carrying the sequence $\{f_n\}$.

Optionally, the first signal is a reference signal. Specifically, the first signal may be UCI and a DMRS. Alternatively, the first signal may be acknowledgement (ACK) information, negative acknowledgement (NACK) information, or uplink scheduling request (SR) information. In this embodiment of this application, the first signal is not limited to the foregoing information.

Optionally, the first signal is a signal used to carry communication information. During specific implementation, the communication information may be carried in a sequence selection manner, or may be carried in a sequence modulation manner, but is not limited thereto.

Optionally, the sequence selection manner means allocating $2^n$ orthogonal sequences to one terminal. Optionally, the $2^n$ orthogonal sequences may be $2^n$ cyclic shifts of one root sequence, and the $2^n$ orthogonal sequences can carry information of n bits. For example, the $2^n$ orthogonal sequences are four sequences numbered 0, 1, 2, and 3. 00 corresponds to a sequence 0, 01 corresponds to a sequence 1, 10 corresponds to a sequence {2}, and 11 corresponds to a sequence 3. In this case, the four sequences can carry information of 2 bits.

It should be noted that in the sequence selection manner, different values of a in the sequence $\{f_n\}$ are used to indicate different cyclic shifts. Optionally, a may carry different information.

Optionally, the sequence modulation manner means allocating one sequence to one user and generating a modulation symbol by using information that needs to be transmitted by the user. The modulation symbol includes but is not limited to a BPSK symbol, a QPSK symbol, an 8QAM symbol, a 16QAM symbol, or the like. The modulation symbol is multiplied by the sequence to generate an actually to-be-sent sequence. For example, one BPSK symbol may be 1 or −1, and for one sequence $\{f_n\}$, a to-be-sent sequence may be $\{f_n\}$ or $\{-f_n\}$ after modulation is performed based on the BPSK symbol.

In a possible example, in descriptions corresponding to FIG. 2 in the specification, after accessing the network, the terminal may determine, by using A and the sequence $\{x_n\}$, the sequence $\{f_n\}$ consisting the N elements that is configured by the network device.

It should be noted that in the sequence modulation manner, different values of A in the sequence $\{f_n\}$ are used to carry different information.

Optionally, A may be a modulation symbol. In this case, a data information bit or control information bit are modulated to obtain A. A is carried on the N elements included in the sequence $\{f_n\}$, and A does not vary with n.

Optionally, A is a constant. For example, A=1. For example, A may be a symbol known to both the terminal and the network device. Alternatively, A may indicate an amplitude.

It should be noted that, that A is a constant in a transmission time unit does not mean that A is fixed, and A may change when the first signal is sent at different moments. For example, all the N elements included in the sequence $\{f_n\}$ or the sequence $\{x_n\}$ are a reference signal, and A is an amplitude of the reference signal. When the terminal sends the first signal for the first time, A may be equal to 1. When the terminal sends the first signal for the second time, A may be equal to 2.

S103. The network device receives the first signal carried on the N subcarriers, to obtain the N elements in the sequence $\{f_n\}$.

It can be learned from S102 that the first signal is generated by respectively mapping the N elements in the sequence $\{f_n\}$ consisting the N elements to the N subcarriers. For specific descriptions of the sequence $\{f_n\}$, refer to the corresponding descriptions in S101 and S102, and details are not described herein again.

Optionally, during execution of S103, a process in which the network device receives the first signal carried on the N subcarriers is as follows: a time domain signal is obtained and a cyclic prefix is removed from the signal. Then, M-element FFT is performed on a signal obtained after the cyclic prefix is removed, to obtain an N-element frequency domain signal, where M is greater than or equal to N. Then, the network device receives the first signal carried on the N subcarriers. The first signal is the sequence $\{f_n\}$ consisting the N elements. For example, the network device receives the signal on the N subcarriers based on locations that are of the N subcarriers in subcarriers in the communications system and that are predefined or configured by the network device.

During specific implementation, after the terminal accesses the network, the terminal sends a PUCCH by using the configured sequence $\{f_n\}$, and the network device receives the PUCCH by using the sequence $\{f_n\}$ configured for the terminal.

S104. The network device processes the first signal based on the N elements in the sequence $\{f_n\}$.

Figure 5:
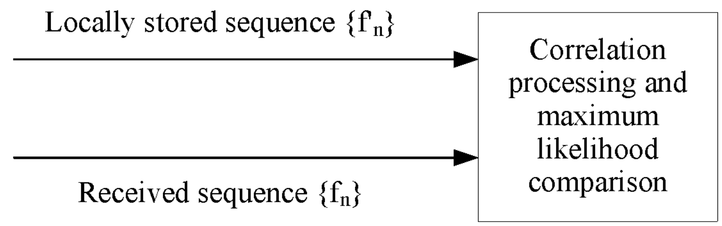
FIG. 5 is a schematic diagram of processing a first signal by a network device according to an embodiment of this application.

Optionally, FIG. 5 is a schematic diagram of a process of processing the first signal by the network device. Through traversing a sequence $\{f'_n\}$ that are locally stored, the network device obtains all possible sequences. The network device separately performs correlation processing and maximum likelihood comparison on the obtained sequence $\{f_n\}$ and all the possible sequences of the sequence $\{f'_n\}$, to obtain data transmitted by the terminal.

With reference to descriptions corresponding to S102 in the specification, a value combination of information of 2 bits is {(0, 0), (0, 1), (1, 0), (1, 1)}. With reference to FIG. 2, when the information of 2 bits is (0, 0), the obtained sequence $\{f'_n\}$ is a sequence $\{f'_{1,n}\}$; when the information of 2 bits is (0, 1), the obtained sequence $\{f'_n\}$ is a sequence $\{f'_{2,n}\}$; when the information of 2 bits is (1, 0), the obtained sequence $\{f'_n\}$ is a sequence $\{f'_{3,n}\}$; or when the information of 2 bits is (1, 1), the obtained sequence $\{f'_n\}$ is a sequence $\{f'_{4,n}\}$. Correlation is separately performed between the sequence $\{f_n\}$ and $\{f'_{1,n}\}$, $\{f'_{2,n}\}$, $\{f'_{3,n}\}$, and $\{f'_{4,n}\}$, to obtain four correlation values. A value of the information of 2 bits that is corresponding to a largest correlation value is data obtained by the network device. For example, if the largest correlation value is obtained through correlation between the sequence $\{f_n\}$ and $\{f'_{1,n}\}$, the information of 2 bits is (0, 0).

According to the sequence-based signal processing method disclosed in this embodiment of this application, a sequence meeting a requirement for sending a signal by using a PUCCH is determined, where the sequence is the sequence $\{f_n\}$ consisting the N elements, $f_n$ is an element in the sequence $\{f_n\}$, the determined sequence $\{f_n\}$ is a sequence meeting the preset condition, the preset condition is $f_n = A \cdot x_n \cdot e^{2\pi j \cdot a \cdot n}$, the value of n ranges from 0 to N−1, A is a non-zero complex number, a is a real number, $j=\sqrt{-1}$, the element $x_n = u \cdot e^{\pi \cdot j \cdot s_n / 4}$, u is a non-zero complex number, and the sequence $\{s_n\}$ consisting of the elements $s_n$ is a sequence in the first sequence set or an equivalent sequence of a sequence in the first sequence set, or a sequence in the second sequence set or an equivalent sequence of a sequence in the second sequence set, or a sequence in the third sequence set or an equivalent sequence of a sequence in the third sequence set; then, the N elements in the sequence $\{f_n\}$ are respectively mapped to the N subcarriers to generate the first signal; and the first signal is sent. By using the determined sequence, when a signal is sent from a PUCCH, a low sequence correlation can be maintained, and a relatively small PAPR value and CM value can also be maintained, thereby meeting a requirement of a communication application environment in which a signal is sent by using a PUCCH.

Still further, based on the sequence-based signal processing method disclosed in this embodiment of this application, the sequence $\{s_n\}$ that consists of the elements $s_n$ and to which the sequence $\{f_n\}$ consisting the N elements that is determined in S101 relates may be a sequence in a fourth sequence set or an equivalent sequence of a sequence in the fourth sequence set. A peak to average power ratio of a sequence $\{f_n\}$ corresponding to the sequence in the fourth sequence set is less than 2.8 dB, and a value of a correlation between any cyclic shift of any one of sequences $\{f_n\}$ corresponding to the fourth sequence set and any cyclic shift of another sequence in the sequences $\{f_n\}$ is less than 0.52. PAPRs of many of 30 length-24 sequences in LTE are greater than 3 dB, and values of correlations between the sequences in LTE are generally relatively large through comparison between correlation value distribution of the sequences in LTE and correlation value distribution of sequences in the fourth sequence set.

During specific implementation, the sequence in the fourth sequence set includes at least one of the following: a sequence in a sequence set 4A, a sequence in a sequence set 4B, and a sequence in a sequence set 4C.

The sequence in the sequence set 4A includes some or all of the following 30 length-18 sequences, PAPRs of the sequences are less than 3.0 dB, and values of correlations between the sequences are less than 0.543:

{−3, −3, 1, 1, −3, −3, −3, −3, 1, 1, −3, 1, 1, −3, 1, −3, 1, −3}, {−3, 1, −3, 1, −3, 1, 1, −3, 1, 1, −3, −3, −3, −3, 1, 1, −3, −3}, {−3, 1, 1, −3, −3, 1, 1, −3, 1, −3, 1, 1, 1, 1, −3, −3, −3, −3}, {−3, 1, −3, −1, 3, −1, −1, 1, 3, −1, −1, 1, 1, 1, −1, −3, −3, −3}, {−3, 1, −3, 3, −1, 3, 3, 1, −1, 3, 3, 1, 1, 1, 3, −3, −3, −3}, {−1, 1, −1, 1, 3, 1, 3, −1, −3, 3, 1, 1, −3, −1, −1, 3, −3, −3}, {3, 1, 3, 1, −1, 1, −1, 3, −3, −1, 1, 1, −3, 3, 3, −1, −3, −3}, {−1, 1, −3, −1, 3, −1, −3, −1, −3, 3, 3, 1, −1, 3, 3, −3, −3, −3}, {3, 1, −3, 3, −1, 3, −3, 3, −3, −1, −1, 1, 3, −1, −1, −3, −3, −3}, {3, 3, −3, −1, −3, −3, −3, 1, 1, −1, 3, −1, −1, −1, −3, 1, −3, −3}, {1, 3, −1, 1, 3, −1, −3, −3, −3, −3, 3, −1, −3, −1, 3, 1, −3, −3}, {1, −1, 3, 1, −1, 3, −3, −3, −3, −3, −1, 3, −3, 3, −1, 1, −3, −3}, {1, 3, −1, −1, 3, 3, −1, 3, −1, 1, −1, −3, 3, −3, 3, −3, −3, −3}, {1, −1, 3, 3, −1, −1, 3, −1, 3, 1, 3, −3, −1, −3, −1, −3, −3, −3}, {−3, 3, −1, −1, −1, 1, 1, 3, −1, 3, −1, 1, 3, −1, −1, −1, −3, −3}, {−3, −1, 3, 3, 3, 1, 1, −1, 3, −1, 3, 1, −1, 3, 3, 3, −3, −3}, {3, −1, −3, −1, 3, 3, −1, −3, −1, 1, 3, 1, 1, −3, −3, −1, −3, −3}, {−3, 1, 1, −1, 1, 3, 1, 1, −3, 3, −1, 3, −1, −1, −1, 3, −3, −3}, {3, 3, 3, −3, −3, 1, 3, −1, 3, −3, −1, 3, 1, −3, 1, −1, −3, −3}, {3, −1, −1, −3, 1, 1, −3, −3, −1, 3, 1, −3, 1, −3, −3, −3, −3, −3}, {−3, −3, −1, −3, −3, 3, −3, 3, −1, −1, 1, −1, 3, −3, 1, 1, −3, −3}, {1, 1, −1, 3, 1, 3, 3, −1, −3, 1, 3, −1, −1, 1, −3, −1, −3, −3}, {−3, 1, −1, −3, −1, −3, 3, 1, 1, −3, 3, −3, −1, −3, −1, 3, −3, −3}, {−3, −1, −1, 3, −1, −3, 3, −3, 1, −1, 1, 3, 1, 3, 1, 1, −3, −3}, {3, −1, 1, −3, 1, 1, 3, −3, −3, −3, 1, −1, −3, −1, −1, −3, −3, −3}, {−1, −3, 3, 1, −1, −1, 1, −3, −1, 1, −1, 1, −1, 1, −1, 3, −3, −3}, {1, −3, −1, −1, 1, 3, −1, −3, 1, −1, 1, 3, 1, 1, −3, −1, −3, −3}, {−1, −3, −1, 3, 3, −3, 1, −1, −3, 1, 1, −3, 3, −3, −1, −3, −3, −3}, {3, −1, 1, 3, 1, 3, −1, −3, 1, −1, −3, −3, 3, 3, 3, 1, −3, −3}, and {1, 1, −1, −1, 1, −3, 3, −1, 3, −3, 3, −3, −1, 3, 3, 1, −3, −3}.

The sequence set 4B includes the following 31 length-18 sequences, peak to average power ratios of sequences $\{f_n\}$ corresponding to the sequences in the sequence set are all less than 2.8 dB, and a value of a correlation between any cyclic shift of a sequence $\{f_n\}$ corresponding to any sequence in the sequence set and any cyclic shift of a sequence $\{f_n\}$ corresponding to another sequence in the sequence set is less than 0.54:

{−3, −3, 1, 1, −3, −3, −3, −3, 1, 1, −3, 1, 1, −3, 1, −3, 1, −3}, {−3, 1, −3, 1, −3, 1, 1, −3, 1, 1, −3, −3, −3, −3, 1, 1, −3, −3}, {−3, 1, 1, −3, −3, 1, 1, −3, 1, −3, 1, 1, 1, 1, −3, −3, −3, −3}, {−3, 1, −3, −1, 3, −1, −1, 1, 3, −1, −1, 1, 1, 1, −1, −3, −3, −3}, {−3, 1, −3, 3, −1, 3, 3, 1, −1, 3, 3, 1, 1, 1, 3, −3, −3, −3}, {−1, 1, −1, 1, 3, 1, 3, −1, −3, 3, 1, 1, −3, −1, −1, 3, −3, −3}, {3, 1, 3, 1, −1, 1, −1, 3, −3, −1, 1, 1, −3, 3, 3, −1, −3, −3}, {3, 3, −3, −1, −3, −3, −3, 1, 1, −1, 3, −1, −1, −1, −3, 1, −3, −3}, {1, 3, −1, 1, 3, −1, −3, −3, −3, −3, 3, −1, −3, −1, 3, 1, −3, −3}, {1, −1, 3, 1, −1, 3, −3, −3, −3, −3, −1, 3, −3, 3, −1, 1, −3, −3}, {1, 3, −1, −1, 3, 3, −1, 3, −1, 1, −1, −3, 3, −3, 3, −3, −3, −3}, {3, 1, −1, −1, 3, 3, −1, 3, −1, −1, 1, 3, −3, 3, −3, 3, −3, −3}, {−3, 3, −1, −1, −1, 1, 1, 3, −1, 3, −1, 1, 3, −1, −1, −1, −3, −3}, {−3, −1, 3, 3, 3, 1, 1, −1, 3, −1, 3, 1, −1, 3, 3, 3, −3, −3}, {3, −1, −3, −1, 3, 3, −1, −3, −1, 1, 3, 1, 1, −3, −3, −1, −3, −3}, {−3, 1, 1, −1, 1, 3, 1, 1, −3, 3, −1, 3, −1, −1, −1, 3, −3, −3}, {3, 3, 3, −3, −3, 1, 3, −1, 3, −3, −1, 3, 1, −3, 1, −1, −3, −3}, {3, −1, −1, −3, 1, 1, −3, −3, −1, 3, 1, −3, 1, −3, −3, −3, −3, −3}, {3, 3, −3, 1, −1, 1, −3, 1, −1, 3, 3, −1, 1, −3, −3, 3, −3, −3}, {−3, 1, −1, −3, −1, −3, 3, 1, 1, −3, 3, −3, −1, −3, −1, 3, −3, −3}, {−3, −1, −1, 3, −1, −3, 3, −3, 1, −1, 1, 3, 1, 3, 1, 1, −3, −3}, {3, 1, 3, −1, 3, 1, 3, −3, 1, 1, −3, 1, 1, 1, 1, −3, −3, −3}, {−1, −3, 3, 1, −1, −1, 1, −3, −1, 1, −1, 1, −1, 1, −1, 3, −3, −3}, {3, −3, −1, −1, 3, −1, 1, −1, −3, 3,

−1, −3, 1, −1, −1, −3, −3, −3}, {1, 1, −3, 3, −1, 1, −1, 1, −3, 1, 3, 3, 1, 3, 1, 1, −3, −3}, {3, −3, −1, 3, −3, 3, 3, −3, −3, −1, 3, 1, −3, 1, 1, −1, −3, −3}, {3, −3, −1, −3, 3, 1, 1, −3, 1, −3, 3, 3, −3, 1, −3, 3, −3, −3}, {1, 3, 3, −1, −1, −3, 3, 1, 3, 3, 1, 3, −3, 1, −3, 1, −3, −3}, {−1, 3, −1, 3, 1, −3, 1, 1, −3, −3, −3, −1, 1, −3, −3, −3, −3, −3}, {−3, −3, −1, 3, −1, 1, 3, 1, −1, −1, −3, −3, −1, −3, 1, −1, −3, −3}, and {−1, −1, 1, 1, −3, 1, −3, 1, 1, −3, −3, 1, 1, −1, −3, −1, −3, −3}.

The sequence in the sequence set 4C includes some or all of the following sequences, peak to average power ratios of sequences corresponding to sequences in the sequence set are all less than 2.8 dB, and a value of a correlation between any cyclic shift of a sequence corresponding to any sequence in the sequence set and any cyclic shift of a sequence corresponding to another sequence in the sequence set is less than 0.56:

{3, −1, 1, −3, −3, 1, 3, 1, −3, −3, 1, −1, 3, −3, −3, −3, −3, −3}, {−1, −1, 3, 1, 3, 3, −1, 3, −3, −1, 3, −1, −3, −1, 1, −1, −3, −3}, {−1, −3, −3, −3, 1, −3, −1, 1, −3, 1, −3, 3, −1, −1, 3, 3, −3, −3}, {−3, 1, 3, −3, 3, −1, 1, 3, 1, −1, 3, −3, 3, 1, −3, −3, −3, −3}, {3, 3, 1, 1, 1, −1, 3, −1, 1, −3, 1, 1, −3, 3, 1, 3, −3, −3}, {3, 1, −3, 3, −1, 3, −3, 3, −3, −1, −1, 1, 3, −1, −1, −3, −3, −3}, {−1, 1, 1, −3, 3, −1, −3, −1, 3, −3, 3, −3, 3, 3, −1, −1, −3, −3}, {1, 3, −1, 3, −1, 1, −1, −1, −1, 3, 3, 3, 1, −3, 3, 1, −3, −3}, {−1, 3, 1, −3, −3, −1, 3, −3, 3, 1, −1, −1, 3, −3, 3, −3, −3, −3}, {−3, 1, 1, −3, 3, 3, −3, −1, −3, −1, 3, 1, −3, −1, −1, −3, −3, −3}, {−1, 3, 1, 3, −3, −1, −3, 1, −1, −3, −3, 1, 1, −3, −1, −3, −3, −3}, {1, 3, −3, −1, 3, −1, 3, −1, −3, −1, −1, 3, 1, −1, −3, −3, −3, −3}, {−3, 1, 1, −1, 1, 3, 1, 1, −3, 3, −1, 3, −1, −1, −1, 3, −3, −3}, {1, 1, 3, 3, 3, −3, 1, −1, 3, −3, 1, 1, −3, 1, −1, −1, −3, −3}, {−1, 3, 1, −3, −3, 1, −1, 1, −3, −3, 1, 3, −1, −3, −3, −3, −3, −3}, {−1, 3, 1, 3, −1, −3, 1, 1, 3, 1, 1, 3, 1, 1, −3, −1, −3, −3}, {−1, 1, −3, 1, −3, −3, −3, 1, −3, −3, 1, −3, 3, 1, 1, 1, −3, −3}, {1, −3, 1, −3, −1, 3, 1, 3, 3, −3, 3, 1, 3, 3, 1, 1, −3, −3}, {3, 1, 3, 1, −1, 1, −1, 3, −3, −1, 1, 1, −3, 3, 3, −1, −3, −3}, {−1, −3, 1, −1, 3, −1, 1, 1, 1, −1, 1, −3, −1, 3, 1, 1, −3, −3}, {3, −3, −3, 1, −1, −3, 1, −1, −1, −1, −3, −1, 3, −1, 1, −3, −3, −3}, {3, −3, 3, 1, −1, 1, 3, 1, −1, −3, 1, 3, 3, 3, −1, 3, −3, −3}, {1, −3, 3, 1, −1, 1, −1, −1, 1, 3, 1, −1, 1, −3, 1, 3, −3, −3}, {−1, 1, 1, 3, −3, 3, −1, 3, 1, −1, −3, −1, 3, −3, −1, −3, −3, −3}, {1, −3, −3, 1, 1, −3, −1, 3, −1, 3, −1, −1, 1, −1, −3, −3, −3, −3}, {−1, −1, −1, −3, −3, 1, −1, 3, −3, 3, −3, 1, 1, −3, 1, 3, −3, −3}, {3, −3, 1, −1, −1, 3, 1, −3, −3, −1, 3, 3, −3, 1, −3, −3, −3, −3}, {−3, −1, 1, −3, −1, −3, −3, −3, −1, −3, 1, −1, −3, 1, 1, 1, −3, −3}, {1, −3, 3, 1, −3, 3, −3, 1, −3, −1, −3, −3, −1, 1, 3, −3, −3, −3}, {−3, 1, −3, −3, −3, 1, −1, −1, −1, 1, 1, −3, 1, −1, −1, 1, −3, −3}, {−1, −1, 1, −1, 3, 1, −3, 1, −1, 1, −3, −1, −3, 3, 3, −1, −3, −3}, and {−3, 3, 1, −3, 3, −3, −3, −3, 3, −3, 1, 3, −3, 1, 1, 1, −3, −3}.

Still further, based on the sequence-based signal processing method disclosed in this embodiment of this application, a set including the sequence $\{s_n\}$ that consists of the elements $s_n$ and to which the sequence $\{f_n\}$ consisting the N elements that is determined in S101 relates may include some or all of sequences in a fifth sequence set or some or all of equivalent sequences of sequences in the fifth sequence set.

The sequence in the fifth sequence set includes at least one of the following: a sequence in a sequence set 5A, a sequence in a sequence set 5B, a sequence in a sequence set 5C, a sequence in a sequence set 5D, and a sequence in a sequence set 5E. A correlation between sequences $\{f_n\}$ determined by using sequences in the sequence set 5D is less than 0.49, and a correlation between sequences $\{f_n\}$ determined by using sequences in the sequence set 5E is less than 0.48.

The sequence in the sequence set 5A includes some or all of the following 30 length-24 sequences, peak to average power ratios of sequences $\{f_n\}$ corresponding to sequences in the sequence set are all less than 2.8 dB, and a value of a correlation between the sequences $\{f_n\}$ is less than 0.53:

{−1, −1, −3, −3, 3, −3, 1, 3, −3, 1, 1, −3, 3, 1, 1, −3, 3, −1, 3, 1, 3, 3, −3, −3}, {−3, 3, 1, 3, −1, 1, −3, 1, −3, 1, −1, −3, −1, −3, −3, −3, −3, −1, −1, −1, 1, 1, −3, −3}, {3, −1, −3, 1, −1, −3, 1, 3, 1, 3, −3, −3, −3, −3, 1, 3, −1, −1, −1, −3, −1, −1, −3, −3}, {−1, 1, 3, −3, −1, −1, −3, 1, −3, 1, −1, 3, 1, 3, −1, −3, −3, 3, −3, 3, 3, −1, −3, −3}, {−1, 3, −1, 1, −3, 1, −1, −1, −3, 3, −3, −3, 1, 3, 3, −1, −1, 3, 3, 3, 3, −3, −3, −3}, {−3, 3, −1, 1, −1, −3, −3, −3, 3, −3, −3, −3, 1, −1, −1, 3, −1, −1, 3, −1, 1, 3, −3, −3}, {−1, 3, 1, −3, −1, 3, 1, −3, −1, −1, −3, 1, −1, 1, 3, −3, 3, −3, −1, 1, −1, −1, −3, −3}, {1, 1, −3, −3, −3, 3, −1, −1, 3, 1, 1, −3, 1, −3, −1, 3, −3, −3, −1, −3, −1, −3, −3, −3}, {−1, 1, 3, −1, 3, −3, −1, 3, 3, −3, −3, −3, 3, −3, 3, −1, 1, −1, −3, 3, 1, −3, −3, −3}, {−1, 3, 3, 1, 1, −1, −1, 1, −3, 1, −3, −1, 3, 1, −3, −3, 1, 1, 3, 3, −3, 3, −3, −3}, {−1, −1, −3, −3, −1, −3, 3, −3, 3, −1, −1, −3, −3, 1, 1, −3, 1, −1, 1, 3, 1, 3, −3, −3}, {3, 1, 3, 1, 3, 3, 1, −3, 1, −3, 3, 3, 3, −3, −1, −1, 3, 1, 1, −3, 1, 1, −3, −3}, {1, −1, −3, 1, −3, 1, −3, −3, 1, −1, 3, −3, 1, 3, 3, −3, 3, 3, 1, 1, 3, −3, −3, −3}, {3, −3, −3, −1, 1, −1, 3, −1, 1, 1, −3, 1, 1, −3, 1, 1, −1, 3, 1, 1, −1, −1, −3, −3}, {−3, −3, −1, 1, 1, −3, 3, −3, −3, 1, 3, −1, −1, 3, 3, 1, −3, 1, −3, −1, −3, −1, −3, −3}, {3, −1, −3, 1, 1, −3, −3, 1, 3, −1, 3, −1, 3, −3, −3, 1, −1, −1, −1, −3, −3, −3, −3, −3}, {−1, 3, 1, −1, −3, 3, −3, −1, 3, −1, 1, −3, −3, −3, 3, −1, 1, −1, −3, −1, −1, 1, −3, −3}, {−1, −1, 1, 1, 1, −1, −1, 3, −3, 1, −1, −1, 3, −1, 3, 1, 3, −1, 1, −1, −3, 1, −3, −3}, {−3, 1, −1, 1, 3, −3, −1, 3, 1, 3, −3, 1, −1, −3, −1, 3, 3, −1, −3, −3, −3, −1, −3, −3}, {1, −3, 3, −1, −3, 1, −3, −3, −3, −1, −1, 3, −3, 1, −3, −1, 3, 1, 1, −1, −3, −3, −3, −3}, {−1, 1, 3, −1, −1, 3, −3, −1, −3, −1, 3, −1, 3, 1, −3, 3, −3, 3, 1, −1, −3, −3, −3, −3}, {1, 1, 1, 1, −3, −3, −1, −3, 3, −1, 3, −3, 3, 1, −3, −1, 3, −3, 3, −3, 1, 3, −3, −3}, {−3, −1, 3, 1, 3, −1, 3, 3, −3, 1, −1, −3, −1, −3, −1, −1, 3, 1, −1, −3, −1, −1, −3, −3}, {1, −1, −3, 1, −1, −3, −3, 3, −1, 3, −3, 3, −3, −1, −1, −3, −3, −1, 1, 1, −1, 3, −3, −3}, {1, −3, −1, 1, −1, −3, 1, −1, −3, 1, −3, −1, −1, 3, 3, 3, −3, 3, 3, 1, 1, −3, −3, −3}, {−1, 3, −1, 3, −1, 1, 1, 1, −3, −3, 3, 3, −1, −3, 1, 1, −3, −1, 1, −1, −1, 1, −3, −3}, {3, 1, −3, −3, 1, −1, −1, −1, −3, −1, 1, −3, 1, −3, 1, −3, −3, −1, 1, 1, −3, −1, −3, −3}, {−3, −1, 1, 1, −3, −3, −1, 3, 1, 3, 1, −3, −1, −3, −1, −1, 1, −1, −1, 3, −1, −1, −3, −3}, {−1, 3, 1, −1, −3, −1, 3, 1, 3, −3, −1, −3, 1, −3, −1, 3, 3, −3, 1, −3, −3, −3, −3, −3}, and {−1, 3, 1, 3, 1, −1, −3, −1, −3, −3, 1, 3, −3, 1, 3, −3, −3, −1, −3, −3, 3, −1, −3, −3}.

The sequence in the sequence set 5B includes some or all of the following 30 length-24 sequences, peak to average power ratios of sequences $\{f_n\}$ corresponding to sequences in the sequence set are all less than 2.8 dB, and a value of a correlation between the sequences $\{f_n\}$ is less than 0.5:

{−1, −3, 3, 1, 1, −3, 1, −3, −3, 1, −3, −1, −1, 3, −3, 3, 3, 3, −3, 1, 3, 3, −3, −3}, {1, 3, −3, −1, 3, −1, −3, 1, −3, −1, 1, 1, 3, 3, −1, −3, 3, 1, −1, −1, −3, −3, −3, −3}, {1, −1, −1, −1, 3, 3, 3, −3, −3, 1, −3, 1, −3, −3, 1, −3, −3, 1, −3, −3, −3, 1, −3, −3}, {3, −3, 3, 3, 3, 3, 3, −3, −1, 1, −3, −3, 3, 1, 3, −1, −3, 1, −1, 3, 1, 1, −3, −3}, {−1, −3, 3, −1, 3, 1, 3, −1, 1, −3, −1, −3, −1, 1, 3, −3, −1, −3, 3, 3, 3, −3, −3, −3}, {−3, 3, 1, 3, −1, 1, −3, 1, −3, 1, −1, −3, −1, −3, −3, −3, −3, −1, −1, −1, 1, 1, −3, −3}, {3, −1, 3, −1, 1, −3, 1, 1, −3, −3, 3, −3, −1, −1, −1, −1, −1, −3, −3, −1, 1, 1, −3, −3}, {1, −1, 1, −3, 3, 1, 3, −1, −3, 3, −1, −3, 3, 1, −3, −1, −1, −1, −3, −1, 3, −3, −3, −3}, {−1, 3, 1, −3, 1, −1, −3, 1, 1, −1, −3, −1, 1, −3, −1, 1, 1, 1, 3, −3, −1, −3, −3, −3}, {3, −1, 1, −1, 3, −3, 1, 1, 3, −1, −3, 3, 1, −3, 3, −1, −1, −1, −1, 1, −3, −3, −3, −3}, {1, −3, 3, −1, −3, −1, 3, 3, 1, −1, 1, 1, 3, −3, −1, −3, −3, −3, −1, 3, −3, −1,

−3, −3}, {−3, −1, 1, −3, −3, 1, 1, −3, 3, −1, −1, −3, 1, 3, 1, −1, −3, −1, −3, 1, −3, −3, −3, −3}, {−3, 1, −3, 1, −3, −3, 1, −3, 1, −3, −3, −3, −3, −3, 1, −3, −3, 1, 1, −3, 1, 1, −3, −3}, {3, −3, −3, −1, 3, 3, −3, −1, 3, 1, 1, 1, 3, −1, 3, −3, −1, 3, −1, 3, 1, −1, −3, −3}, {1, 1, −1, −3, −1, 1, 1, −3, 1, −1, 1, −3, 3, −3, −3, 3, −1, −3, 1, 3, −3, 1, −3, −3}, {−3, 1, −1, −3, 1, −3, 1, −1, −1, 3, 1, 1, −1, 1, −1, −3, −1, 1, −1, −1, 1, 3, −3, −3}, {−1, −3, −3, 1, −1, −1, −3, 1, 3, −1, −3, −1, −1, −3, 1, 1, 3, 1, −3, −1, −1, 3, −3, −3}, {3, −3, 3, −1, −3, 1, 3, 1, −1, −1, −3, −1, 3, −3, 3, −1, −1, 3, 3, −3, −3, 3, −3, −3}, {−1, 3, −3, −3, −1, 3, −1, −1, 1, 3, 1, 3, −1, −1, −3, 1, 3, 1, −1, −3, 1, −1, −3, −3}, {−3, −3, 1, −1, 1, −3, 3, 1, −3, 1, −3, −1, −3, −3, 3, 1, −3, −1, 1, −3, −3, −1, −3, −3}, {−3, 1, 1, −3, −1, −3, 3, −3, −3, −1, 3, −1, 1, 3, 1, 3, 3, 3, −1, 3, 1, 1, −3, −3}, {3, −3, −1, 1, 3, −1, −1, −3, −1, 3, −1, −3, −1, −3, 3, −1, 3, 1, 1, −3, 3, −3, −3, −3}, {−1, 3, −1, −1, 3, 3, −1, −1, −1, 3, −1, −3, 1, 3, 1, 1, −3, −3, −3, −1, −3, −1, −3, −3}, {3, −1, 3, 1, −1, 3, −1, 1, −1, 1, 3, 1, 3, 3, −3, −1, 3, −3, −3, 1, 1, −1, −3, −3}, {3, 1, −3, 3, −3, 1, −3, −1, 3, −1, 1, 3, 3, 1, 1, 3, −3, −1, 1, 1, −1, −3, −3, −3}, {−1, 1, 3, −1, 3, −1, −3, −1, 1, −3, −3, −3, −3, 1, −1, −3, 3, 3, 1, 3, 3, −1, −3, −3}, {3, −3, −1, −3, 1, 3, 1, −1, −3, 1, −1, 1, −1, −3, −3, 3, −3, 3, 3, −3, −1, 3, −3, −3}, {1, 3, 1, 3, −1, 1, 1, −1, 1, −3, 3, −1, −3, 3, −1, −1, 3, −3, −3, 1, 1, −1, −3, −3}, {1, 1, 3, −3, −1, −1, −3, 3, 1, 1, 1, −1, 1, 1, −1, 1, −1, 3, −1, 3, −3, 1, −3, −3}, and {−3, −3, −1, −1, −3, −1, 1, −3, 1, −3, −3, 3, 3, −1, −3, 3, 3, −3, 1, −1, 1, −1, −3, −3}.

The sequence in the sequence set 5C includes some or all of the following 24 sequences, peak to average power ratios of sequences $\{f_n\}$ corresponding to sequences in the sequence set are all less than 2.8 dB, and a value of a correlation between the sequences $\{f_n\}$ is less than 0.482:

{−3, −3, −3, −3, 3, −1, 1, 1, −1, 3, −3, −1, −3, 1, −1, 3, −1, 1, −3, −3, 1, 1, −3, −3}, {−3, −3, −3, −1, −1, −1, 3, −1, 1, −3, −3, 1, −3, −1, 3, 1, −3, 3, 1, −1, 1, −1, −3, −3}, {−3, −3, −3, −1, 1, 3, −3, 1, 1, −3, 1, 1, −1, −3, 3, 1, 1, 1, 1, −3, 1, −3, 1, −3}, {−3, −3, −3, 1, 3, −3, 1, 1, −1, −1, −3, −1, −3, 1, −3, 1, −1, −3, 3, 1, 3, 3, −3, −3}, {−3, −3, −1, −3, −3, −1, −1, 3, 1, 3, −3, 3, −1, 3, −1, 3, 3, −3, 3, 1, 1, −1, −3, −3}, {−3, −3, −1, −1, 3, −1, −3, 3, −1, −3, −1, 3, 3, −3, 1, 1, 1, −1, 3, −3, 1, −3, −3, −3}, {−3, −3, −1, 3, −3, 3, −3, 3, 1, −1, −3, 3, 1, −3, 1, −3, 1, 1, 3, 1, 1, 3, −3, −3}, {−3, −3, 1, −3, 3, −1, −3, −1, 3, −1, 1, −1, −1, −3, −3, 3, −3, −1, 1, 3, 3, −1, −3, −3}, {−3, −3, 1, −1, 1, −3, 3, 1, −3, 1, −3, −1, −3, −3, 3, 1, −3, −1, 1, −3, −3, −1, −3, −3}, {−3, −1, −3, −1, −1, −1, −3, 1, 3, −3, 3, −3, 3, 1, −1, 1, −3, 3, −3, −3, 1, 1, −3, −3}, {−3, −1, −3, 1, −3, 1, 3, −1, 1, −3, −1, −1, −1, −1, −3, 3, 3, 3, −1, −3, 3, 3, −3, −3}, {−3, −1, −3, 1, 3, 3, −1, 3, 1, 3, −3, 1, 1, −3, −3, 1, −3, −3, 3, 3, 3, −1, −3, −3}, {−3, −1, −3, 3, −1, −3, −3, −1, 1, 1, −1, 1, −1, 1, −3, −1, −3, 1, 1, −1, −1, 3, −3, −3}, {−3, 1, −3, −1, −1, 3, −3, −1, −1, −3, 3, −1, −1, −3, 1, −3, 1, 1, 1, 1, −3, −3, −3, −3}, {−3, 1, −3, −1, 1, 3, 1, −3, 1, −1, 3, −3, −1, −3, −3, −3, 3, 1, −1, −3, 3, −3, −3, −3}, {−3, 1, −1, 1, 3, 1, −3, 3, 3, 3, −3, 3, 1, 1, −1, −3, −3, −1, 3, −1, −1, 3, −3, −3}, {−3, 3, −1, −3, 3, 3, 1, 1, 3, −3, 3, −1, −3, −1, 1, −3, 3, −3, −1, 1, −3, −1, −3, −3}, {−3, 3, −1, 3, −1, −3, −1, −1, −3, 1, −3, −1, 1, 3, −3, −1, −1, 3, 1, 1, −3, −3, −3, −3}, {−1, −3, 1, −1, 3, 3, −3, 3, −3, 1, 3, −3, 1, −1, 1, −3, −3, −3, 3, −3, −1, −1, −3, −3}, {−1, −1, 1, −1, −3, 3, 3, −1, 3, −3, 3, 3, −1, −3, −3, −1, −3, 1, −3, −1, −1, 3, −3, −3}, {−1, 1, 3, −3, 3, −3, −3, 3, −3, 1, −3, 1, −3, 1, −1, −3, −3, −1, 3, 3, 1, −1, −3, −3}, {−1, 3, −3, −3, 1, −1, 1, −3, −1, −3, 1, 3, 3, 3, −3, 3, 3, 1, 1, 3, 3, 1, −3, −3}, {3, −3, 1, 1, 1, −3, 3, −1, 1, 3, 1, −1, 3, −3, 1, 1, 1, 1, −3, 3, −3, −3, −3, −3}, and {3, −1, −1, −3, 1, 3, −1, 1, 3, −3, −3, 3, −3, 3, 1, 3, −1, −3, −1, −3, 3, −3, −3, −3}.

The sequence in the sequence set 5D includes some or all of the following sequences:

{−1, 3, −1, 3, −1, 3, 3, −1, −1, 3, −1, −1, −1, −1, 3, 3, 3, −1, −1, 3, 3, 3, 3, 3}, {3, 3, −1, −1, −1, 3, 3, −1, −1, 3, 3, −1, 3, 3, −1, 3, −1, 3, −1, 3, 3, 3, 3, 3}, {−3, −3, −3, −3, −3, 1, 1, −3, −3, −3, −3, −3, 1, −3, 1, 1, −3, 1, 1, −3, 1, −3, 1, −3}, {1, −3, −1, −3, 1, −3, 1, 1, −3, −3, −3, 1, −1, −1, 3, −1, −1, 3, 3, 3, 3, 1, 3, 3}, {1, −3, 3, 1, −3, 3, −1, 1, −3, 1, 1, 3, −3, 1, 1, 1, 3, 3, 1, 1, −1, −3, −3, −3}, {−1, 3, −3, −1, 3, −3, 1, −1, 3, −1, −1, −3, 3, −1, −1, −1, −3, −3, −1, −1, 1, 3, 3, 3}, {1, 1, −3, 1, 1, 3, −1, 3, −1, 3, −1, −3, −3, 1, −3, −3, −3, −3, 1, 1, 1, 1, −3, −3}, {1, −3, −1, 3, 3, −1, 3, −3, −3, −1, −3, 1, −1, 3, 3, −1, −3, 1, 3, −3, −3, −3, 3, 3}, {−1, 3, 1, −3, −3, 1, −3, 3, 3, 1, 3, −1, 1, −3, −3, 1, 3, −1, −3, 3, 3, 3, −3, −3}, {−1, −3, 3, 3, 1, −3, −3, 1, −1, 1, 1, −1, 3, −3, −3, 3, −3, 3, −3, −3, −1, 3, −3, −3}, {−1, −3, 3, −1, −3, 1, 1, −3, 1, 3, 1, −3, −3, −3, −3, −1, 3, 3, 3, 1, −3, −1, 3, 3}, {1, 3, −3, 1, 3, −1, −1, 3, −1, −3, −1, 3, 3, 3, 3, 1, −3, −3, −3, −1, 3, 1, −3, −3}, {3, −1, −1, 1, −1, −1, −3, 1, 1, 3, 1, 1, −1, 3, 1, 3, −1, −1, −3, 1, −1, 1, −3, −3}, {3, −1, −1, 3, 1, −3, −3, −1, −1, 3, −3, 1, −1, −3, −3, 3, 1, 3, −1, 3, −3, −3, −3, −3}, {−1, 3, 3, −1, 1, −3, −3, 3, 3, −1, −3, 1, 3, −3, −3, −1, 1, −1, 3, −1, −3, −3, −3, −3}, {1, 1, −3, −1, 1, 3, −3, 3, 1, −1, 1, −1, −3, 1, −3, 1, −3, −1, 3, 1, 1, 3, 3, 3}, {1, −3, −3, 1, −3, 1, 1, 1, −3, −3, 1, 1, 1, −3, 1, 1, 1, 1, 1, −3, 1, −3, −3, −3}, {−1, 1, 1, 1, −3, −3, −3, 3, 3, −1, 3, −1, 3, 3, −1, 3, 3, −1, 3, 3, 3, −1, 3, 3}, {−1, −3, 1, 1, 3, −3, −3, −1, −3, 3, 1, 3, 1, 1, 3, 3, −1, 3, −3, 3, −3, 1, −3, −3}, {−1, −3, −3, −1, 3, 1, −3, 1, −1, 3, 3, 1, −1, −3, 1, 1, 1, 3, 1, 3, −1, 1, −3, −3}, {3, −3, −3, 3, −1, 1, −3, 1, 3, −1, −1, 1, 3, −3, 1, 1, 1, −1, 1, −1, 3, 1, −3, −3}, {1, 1, −3, 3, −3, −1, −3, −3, 3, −1, 1, 3, −1, −1, 3, −3, 3, 3, 3, −1, 3, 1, 3, 3}, {−3, −1, 1, −3, 1, −3, −1, 3, 1, 3, 3, 3, 1, 3, 3, 3, 1, −1, −1, −3, 3, 1, 3, 3}, {3, 3, −1, 3, −1, 1, −3, 1, 3, 3, −1, 3, 1, −1, −1, −3, 1, 1, 3, −3, −3, 3, 3, 3}, {−3, 3, −3, 1, −3, 1, −1, −1, −3, −3, −1, −3, −3, 1, −3, −3, −1, −3, 3, −1, −1, 1, 3, 3}, {1, 1, 1, −3, 1, 1, 3, −1, 1, 1, −1, −1, −3, 3, 1, 3, −1, 3, −1, 1, 3, 1, −3, −3}, {−3, −3, −1, 3, 3, 3, −3, 3, 1, −3, 1, 1, 3, −1, 3, 1, 3, −3, 3, 3, 1, −1, −3, −3}, {−1, 1, −1, 1, 3, 1, −1, −3, −1, 1, −1, 3, −1, −3, 1, 1, 3, −1, −1, 1, −3, −3, 3, 3}, {1, 3, −3, −1, −1, −3, 1, 1, −1, −3, 1, −1, 3, 1, 3, −3, 1, −3, 1, −3, −3, 3, 3, 3}, {−3, −3, 1, 3, −1, −1, −1, −3, −1, 1, −1, 3, 3, −1, 1, −1, −3, −1, −1, −1, 3, 1, −3, −3}, {−1, −3, 1, −3, −1, 3, 1, 3, −3, −1, 3, 3, 1, 3, 3, −1, 1, 1, 1, 1, −3, 3, 3, 3}, {3, 1, −3, 3, 1, −1, 3, −3, 3, 1, 3, 1, 3, −1, 1, 3, −1, 1, 1, 3, −3, −3, −3, −3}, {1, 3, −3, −1, −3, −3, 1, 3, 1, −3, 1, −1, −1, −3, −3, 1, −3, 3, −3, −3, 3, 3, −3, −3}, {−1, 1, −3, −3, 3, 1, −1, 3, −3, −1, −1, 3, −1, 1, −1, 3, −3, −3, 3, −1, 3, 1, 3, 3}, {3, 3, −1, 1, 1, 1, −1, −3, 1, 1, −1, 1, 3, −1, 1, −1, −1, 3, 1, 3, 1, 3, −3, −3}, {1, −1, 3, −3, 3, 1, −3, 3, −3, −1, −3, −1, −3, −1, −1, −1, 3, −3, −1, −3, −3, −1, 3, 3}, {3, −3, −1, 3, 3, 1, −1, 1, −3, −1, −3, −1, 3, 1, −3, 1, −1, −3, 3, 3, −3, −3, −3, −3}, {−3, 1, 3, 1, −3, 3, 3, 1, −1, 3, −1, 1, 3, −1, 1, 1, 1, −1, −1, −1, 1, 3, 3, 3}, {1, −3, 1, −3, −3, −1, 1, −3, 1, 3, −1, −3, −1, −1, −3, −1, 3, 1, −1, −3, 3, 3, 3, 3}, and {−1, 1, −1, −3, −3, 1, −1, 3, 3, −3, 1, −1, 1, −3, −1, 3, −3, 1, 1, 3, 1, 3, 3, 3}.

The sequence in the sequence set 5E includes some or all of the following sequences:

{−1, 3, −1, 3, −1, 3, 3, −1, −1, 3, −1, −1, −1, −1, 3, 3, 3, −1, −1, 3, 3, 3, 3, 3}, {3, 3, −1, −1, −1, 3, 3, −1, −1, 3, 3, −1, 3, 3, −1, 3, −1, 3, −1, 3, 3, 3, 3, 3}, {−3, −3, −3, −3, −3, 1, 1, −3, −3, −3, −3, −3, 1, −3, 1, 1, −3, 1, 1, −3, 1, −3, 1, −3}, {1, −3, −1, −3, 1, −3, 1, 1, −3, −3, −3, 1, −1, −1, 3, −1, −1, 3, 3, 3, 3, 1, 3, 3}, {1, −3, 3, 1, −3, 3, −1, 1, −3, 1, 1, 3, −3, 1, 1, 1, 3, 3, 1, 1, −1, −3, −3, −3}, {−1, 3, −3, −1, 3, −3, 1, −1, 3, −1, −1, −3, 3, −1, −1, −1, −3, −3, −1, −1, 1, 3, 3, 3}, {1, 1, −3, 1, 1, 3, −1, 3, −1, 3, −1, −3, −3, 1, −3, −3, −3, −3, 1, 1, 1, 1, −3, −3}, {−1, 3, 1, −3, −3, 1, −3, 3, 3, 1, 3, −1, 1, −3, −3, 1, 3, −1, −3, 3, 3, 3, −3, −3}, {−1, −3, 3, −1, −3, 1, 1, −3, 1, 3, 1, −3, −3, −3, −3, −1, 3, 3, 3, 1, −3, −1, 3, 3}, {1, 3, −3, 1, 3, −1, −1, 3, −1, −3, −1, 3, 3, 3, 3, 1, −3, −3, −3, −1, 3, 1, −3, −3}, {1, 3, −1, −1, 1, −1, 3, 1, −1, 1, 1, −3, 1, 3, 1, 3, −1, −3, −3, −1, −1, −3, 3, 3}, {−1, 1, −3, 1, 3, 3, −3, 1, −1, −1, 3, 3, 1, −1, 1, 1, −3, 1, −1, 3, 3, −3, 3, 3}, {−1, −3, 1, 1, −1, 1, −3, −1, 1, −1, −1, 3, −1, −3, −1, −3, 1, 3, 3, 1, 1, 3, −3, −3}, {−3, 1, −1, −3, 1, 1, −1, 1, −1, 1, −3, −3, 3, 3, 1, −3, 3, −3, 3, −3, −1, 1, 3, 3}, {1, 1, 3, 1, −3, −3, −1, −3, −1, 3, −3, 1, 3, 3, −3, 1, 3, 3, 3, 1, −1, −3, 3, 3}, {−1, 1, −3, −3, 3, −1, 1, −3, 3, 1, −3, −1, 1, −3, 3, −1, 3, 1, 1, 1, 1, 1, 3, 3}, {1, 1, 1, −1, 1, 3, −1, 1, −1, −3, 3, 1, −3, −3, 3, −1, 1, 1, 3, −1, −3, 1, 3, 3}, {3, 3, −3, 1, −1, 3, −3, −3, −1, 3, 1, 1, −3, 3, 1, −1, −3, −1, 3, −3, −1, −3, −3, −3}, {−1, 1, −3, 1, −3, −1, −1, −1, −3, 1, −1, −1, −1, 3, 3, −3, 1, 1, 1, −1, −3, 1, −3, −3}, {−3, −3, 1, 3, 1, −1, 3, −3, 3, 3, −3, −3, 1, 3, 1, −3, −3, 1, −1, −1, 3, −1, −3, −3}, {−3, −1, −1, 3, 1, −1, 3, −3, −3, 1, 3, −1, −3, 3, −1, 1, −3, 1, −3, −1, −3, −3, −3, −3}, {3, 1, −1, 3, 3, −1, −1, −3, −3, −3, −3, −3, 3, −1, 3, −1, −3, −3, 1, 3, 1, 3, −3, −3}, {3, 1, −1, 3, −3, 1, 3, −1, 3, 3, −3, 1, −1, 3, −3, −1, −1, 1, 1, −1, −3, −3, −3, −3}, {3, −1, 3, −3, −1, −3, 3, −3, 3, 1, −3, −1, −3, −3, −3, −3, −1, −1, 3, 3, 1, −1, 3, 3}, {1, 3, −3, 3, 3, −3, −1, 1, −3, 3, 3, −1, 3, 3, 1, −3, 1, −1, 3, −1, −3, −1, −3, −3}, {−1, 3, −1, 1, −1, −3, 1, −3, −3, 1, −3, −3, −1, −1, 3, −3, −1, −1, 1, 1, 1, −1, −3, −3}, {3, −1, 3, −1, 3, 1, −3, −1, −1, −3, −3, 3, −3, −1, 3, −3, −3, −1, −1, −3, 1, 1, 3, 3}, {−3, 3, 1, −3, 3, −1, 1, 3, −3, −3, −1, 3, −1, −3, −3, −3, −1, −1, −1, −1, 3, −3, 3, 3}, {3, −3, 3, 1, 3, −3, −1, −1, 3, −1, −1, −3, −1, 1, −3, 3, 3, −3, 1, −1, 1, −1, 3, 3}, and {3, 1, −1, −1, −1, 3, 3, −1, −3, 1, −3, −1, −3, 1, −1, 1, −3, −1, 1, −3, 1, 3, 3, 3}.

Optionally, a set including the sequence $\{s_n\}$ consisting of the elements $s_n$ is some or all of sequences in a sixth sequence set or some or all of equivalent sequences of sequences in the sixth sequence set. Peak to average power ratios of the sequences in the sixth sequence set are all less than 5.5 dB, and a value of a correlation between any cyclic shift of a sequences $\{f_n\}$ corresponding to any sequence in the sixth sequence set and any cyclic shift of a sequence $\{f_n\}$ corresponding to another sequence in the sixth sequence set is less than 0.75, 0.917, or 0.9.

The sequence in the sixth sequence set includes some or all of the following sequences:

{−1, 1, 1, −3, −3, 3}, {−1, −3, −3, 1, 1, 3}, {−1, −3, 1, 3, 3, 1}, {1, 3, −1, −3, −3, −1}, {−1, −3, −1, 1, −1, 1}, {−1, 1, −1, 1, 3, 1}, {3, 3, −1, −1, −1, −1}, {−3, −3, −3, −3, 1, 1}, {−3, 1, 1, −3, −3, 1}, {−3, −3, −3, 1, 1, 1}, {−3, 1, −1, −3, 3, 3}, {−3, −1, −1, −1, −1, −3}, {1, −3, −3, −3, −3, 1}, {−3, −1, 1, 1, −1, −3}, and {3, 1, −1, −1, 1, 3}.

Last three sequences in the sixth sequence set are sequences in the LTE standard specification: {1, −3, −3, −3, −3, 1}, {−3, −1, 1, 1, −1, −3}, and {3, 1, −1, −1, 1, 3}. Other sequences are sequences in a sequence set A3.

Alternatively, the sequence in the sixth sequence set includes at least one of the following: a sequence in a sequence set 6A and a sequence in a sequence set 6B.

The sequence in the sequence set 6A includes some or all of the following sequences:

{−1, −3, −3, 1, 1, 3}, {−1, 1, 1, −3, −3, 3}, {1, 1, −3, 1, −1, 1}, {3, 1, 3, −3, −3, 1}, {1, 1, −1, −3, 1, −3}, {1, 1, 1, 3, −3, 1}, {−3, −1, −3, −1, 3, 3}, {1, 1, −3, −3, 3, −3}, {−1, −3, −1, −1, 3, −3}, {1, 3, −1, −1, 1, −1}, {1, 1, 3, 3, −1, 3}, {1, 1, 1, −3, 3, −1}, {3, −3, 3, 1, −1, 1}, {1, 1, 1, −3, 1, −1}, {1, 1, 1, −3, 1, 3}, {1, 1, −1, −3, −1, 1}, {1, 1, 3, −3, 3, 1}, {1, 1, −3, −3, 1, −3}, {1, 3, −3, 3, −3, 3}, {−3, 1, −3, 3, 3, 3}, {−1, 3, −1, 1, 1, 1}, {1, 1, −3, 1, 3, 3}, {1, 1, 3, −1, 3, 3}, {1, 3, −1, −3, −3, −1}, {−1, −3, 1, 3, 3, 1}, {1, 1, 3, −1, 1, −1}, {1, 1, −3, 3, −1, 1}, {1, 1, −3, −1, 3, 1}, {1, 1, −1, 3, 1, 3}, {3, −1, 1, 3, 3, 1}, {1, 1, 3, −3, 1, −1}, {−3, −1, −1, 3, 1, 1}, and {3, −1, −3, −1, −1, −3}.

The sequence in the sequence set 6B includes some or all of the following sequences:

{1, 1, 1, −3, 1, −1}, {1, 1, −1, −3, −1, 1}, {1, 1, −3, −1, −3, −1}, {−3, −1, −3, −1, 3, 3}, {1, 1, 3, 1, −1, 1}, {1, 1, −3, 1, 1, −1}, {1, 1, 1, 1, −3, 3}, {1, 1, −1, 1, 3, −3}, {1, 1, −3, 3, −1, 1}, {1, 1, −3, −1, 3, 1}, {1, 3, −3, 3, −3, 3}, {1, 1, 3, −1, −3, 1}, {1, 1, −1, 1, 3, 1}, {1, 1, 1, 1, −3, −1}, {1, 1, −3, 1, 1, 3}, {1, 1, 3, 1, −1, −3}, {1, 1, 3, −1, 1, −1}, {1, 1, −3, −3, 1, −3}, {1, 1, −1, 3, 1, 3}, {1, 1, 1, 1, −1, 3}, {1, 1, 3, −1, 3, −3}, {1, 1, −1, 3, −3, 1}, {1, 1, −3, 3, 3, 3}, {3, −3, 3, 1, −1, 1}, {1, 1, −1, −1, 1, −3}, {1, 1, 1, −1, 3, 3}, {1, 1, −3, −1, −1, −1}, {1, 1, 3, 1, −3, 1}, {1, 1, −1, 1, 1, −3}, {1, 3, 1, 1, −3, 3}, {−3, 1, −3, 3, 3, 3}, {−1, −3, 1, 3, 3, 1}, and {1, 3, −1, −3, −3, −1}.

To-be-sent sequences corresponding to the sequences in the sequence set 6A or the sequence set 6B have relatively small PAPRs and CM values. The PAPR and the CM value are respectively less than 2.4597 dB and 4.7 dB. A value of a correlation between transmission sequences corresponding to the sequences in the sequence set 6A and a value of a correlation between transmission sequences corresponding to the sequences in the sequence set 6B are respectively less than 0.917 and 0.9.

Generally, a sequence with a relatively small PAPR also has a relatively small CM value. Through verification, the foregoing sequences all have quite small CM values.

Based on the sequence-based signal processing method disclosed in this embodiment of this application, an equivalent sequence of each sequence set described above may be represented by $\{q_n\}$. An element $q_n$ in the equivalent sequence $\{q_n\}$ meets $q_n=s_n+u_n \pmod 8$.

During specific implementation, optionally, the sequence $\{u_n\}$ including $u_n$ includes:

$u_n=f+g\cdot n \pmod 8$, where n=0, 1, . . . , or N−1, N is a sequence length, $f\in\{0,2,4,6\}$, and $g\in\{0,2,4,6\}$, where (mod 8) indicates that the foregoing equation holds true after performing a modulo operation on both left-hand side and right-hand side using 8.

According to the sequence-based signal processing method provided in this embodiment of this application, a sequence meeting a requirement for sending a signal by using a PUCCH is determined, where the sequence is the sequence $\{f_n\}$ consisting the N elements, $f_n$ is an element in the sequence $\{f_n\}$, and the determined sequence $\{f_n\}$ is a sequence meeting the preset condition; then, the N elements in the sequence $\{f_n\}$ are respectively mapped to the N subcarriers to generate the first signal; and the first signal is sent. By using the determined sequence, when a signal is sent by using a PUCCH, a low sequence correlation can be maintained, and a relatively small PAPR value and CM value can also be maintained, thereby meeting a requirement of a communication application environment in which a signal is sent by using a PUCCH.

Based on the sequence-based signal processing method disclosed in the embodiments of this application, the embodiments of this application further disclose a signal processing apparatus and a communications system for performing the sequence-based signal processing method.

Figure 6:
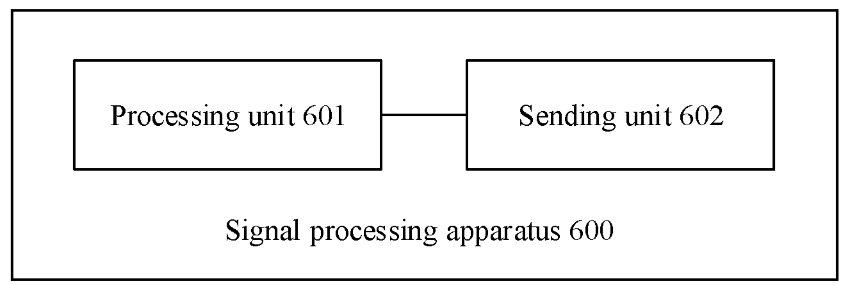
FIG. 6 is a schematic structural diagram of a terminal according to an embodiment of this application.

As shown in FIG. 6, FIG. 6 is a schematic structural diagram of a sequence-based signal processing apparatus 600 according to an embodiment of this application. The signal processing apparatus 600 may be a communications device, or may be a chip in a communications device. The signal processing apparatus 600 includes a processing unit 601 and a transceiver unit 602.

The processing unit 601 is configured to determine a sequence $\{f_n\}$ consisting of N elements, where $f_n$ is an element in the sequence $\{f_n\}$, and the sequence $\{f_n\}$ is a sequence meeting a preset condition.

For the preset condition to which the processing unit 601 relates, refer to the preset condition disclosed in the sequence-based signal processing method disclosed in the embodiments of this application. The two preset conditions are consistent, and details are not described herein again.

The processing unit 601 is further configured to respectively map the N elements in the sequence $\{f_n\}$ to N subcarriers to generate a first signal.

The transceiver unit 602 is configured to send the first signal.

For a corresponding operation in the signal processing apparatus 600 disclosed in this embodiment of this application, refer to a corresponding operation performed in the sequence-based signal processing method disclosed in the embodiments of this application, and details are not described herein again.

With reference to the sequence-based signal processing method disclosed in the embodiments of this application, the signal processing apparatus disclosed in this embodiment of this application may also be implemented directly by using a memory executed by hardware, or a memory executed by a processor, or a combination thereof.

Figure 7:
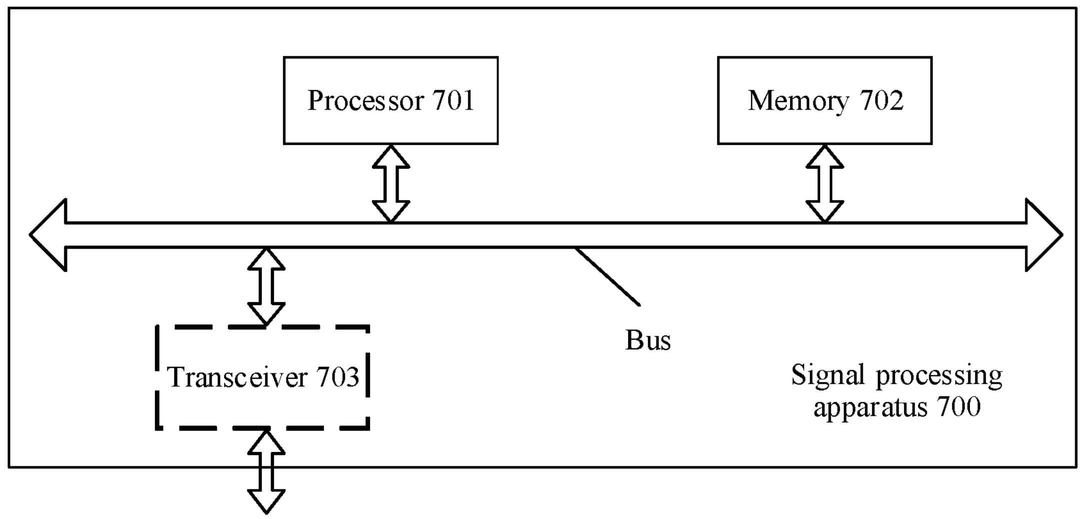
FIG. 7 is a schematic structural diagram of another terminal according to an embodiment of this application.

As shown in FIG. 7, a signal processing apparatus 700 includes a processor 701 and a transceiver 703. Optionally, the signal processing apparatus 700 further includes a memory 702.

The processor 701 is coupled to the memory 702 by using a bus, and the processor 701 is coupled to the transceiver 703 by using the bus.

The processor 701 may be specifically a central processing unit (CPU), a network processor (NP), an application-specific integrated circuit (ASIC), or a programmable logic device (PLD). The PLD may be a complex programmable logical device (CPLD), a field-programmable gate array (FPGA), or generic array logic (GAL).

The memory 702 may be specifically a content-addressable memory (CAM) or a random-access memory (RAM). The CAM may be a ternary content-addressable memory (TCAM).

When the signal processing apparatus 700 is a communications device, the transceiver 703 may be a radio frequency circuit. When the signal processing apparatus 700 is a chip in a terminal, the transceiver 703 may be an input/output interface, a pin, a circuit, or the like in the chip.

The memory 702 may also be integrated into the processor 701. If the memory 702 and the processor 701 are mutually independent components, the memory 702 is connected to the processor 701. For example, the memory 702 and the processor 701 may communicate with each other by using the bus. The transceiver 703 and the processor 701 may communicate with each other by using the bus, or the transceiver 703 may be directly connected to the processor 701.

The memory 702 is configured to store an operation program, code, or an instruction for sequence-based signal processing. Optionally, the memory 702 includes an operating system and an application program, and is configured to store an operation program, code, or an instruction for sequence-based signal processing.

When the processor 701 or a hardware device needs to perform an operation related to sequence-based signal processing, the processor 701 or the hardware device may invoke and execute the operating program, the code, or the instruction stored in the memory 702, to complete a sequence-based signal processing process performed by the terminal in FIG. 1 to FIG. 5. For a specific process, refer to a corresponding part in the foregoing embodiment of this application, and details are not described herein again.

It may be understood that, FIG. 7 shows merely a simplified design of the signal processing apparatus 700. During actual application, the signal processing apparatus 700 may include any quantity of transceivers, processors, memories, and the like, and all signal processing apparatuses 700 that can implement the embodiments of this application fall within the protection scope of the embodiments of this application.

Figure 8:
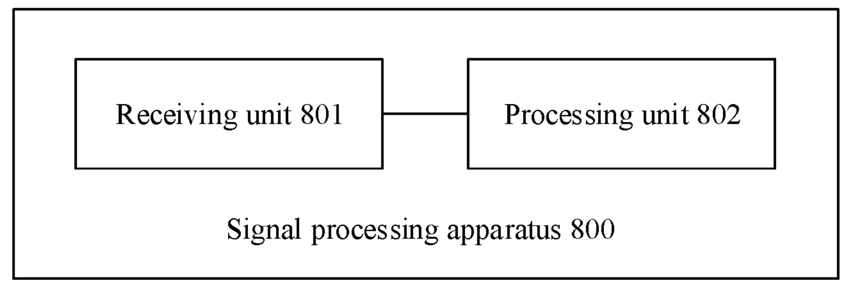
FIG. 8 is a schematic structural diagram of a network device according to an embodiment of this application.

As shown in FIG. 8, FIG. 8 is a schematic structural diagram of a sequence-based signal processing apparatus 800 according to an embodiment of this application. The signal processing apparatus 800 may be a communications device, or may be a chip in a communications device. The signal processing apparatus 800 includes a transceiver unit 801 and a processing unit 802.

The transceiver unit 801 is configured to receive a first signal carried on N subcarriers.

The processing unit 802 is configured to obtain N elements in a sequence $\{f_n\}$ where the first signal is generated by respectively mapping the N elements in the sequence $\{f_n\}$ consisting the N elements to the N subcarriers, $f_n$ is an element in the sequence $\{f_n\}$, and the sequence $\{f_n\}$ is a sequence meeting a preset condition.

For the preset condition to which the transceiver unit 802 relates, refer to the preset condition disclosed in the sequence-based signal processing method disclosed in the embodiments of this application. The two preset conditions are consistent, and details are not described herein again.

The processing unit 802 is further configured to process the first signal based on the N elements in the sequence $\{f_n\}$.

For a corresponding operation in the signal processing apparatus 800 disclosed in this embodiment of this application, refer to a corresponding operation performed in the sequence-based signal processing method disclosed in the embodiments of this application, and details are not described herein again.

With reference to the sequence-based signal processing method disclosed in the embodiments of this application, the signal processing apparatus disclosed in this embodiment of this application may also be implemented directly by using a memory executed by hardware, or a memory executed by a processor, or a combination thereof.

Figure 9:
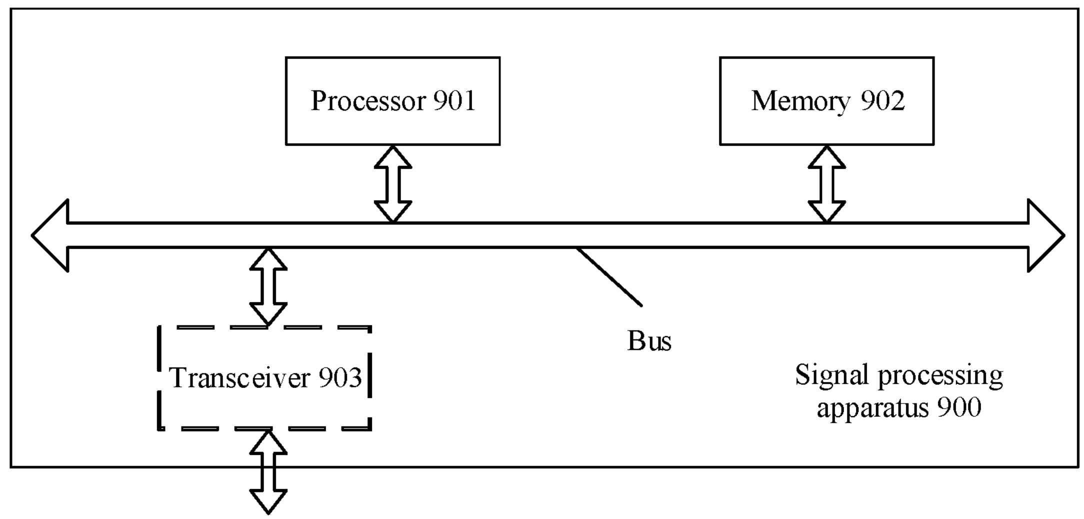
FIG. 9 is a schematic structural diagram of another network device according to an embodiment of this application.

As shown in FIG. 9, a signal processing apparatus 900 includes a processor 901 and a transceiver 903. Optionally, the signal processing apparatus 900 further includes a memory 902.

The processor 901 is coupled to the memory 902 by using a bus, and the processor 901 is coupled to the transceiver 903 by using the bus.

The processor 901 may be specifically a CPU, an NP, an ASIC, or a PLD. The PLD may be a CPLD, an FPGA, or GAL.

The memory 902 may be specifically a CAM or a RAM. The CAM may be a TCAM.

When the signal processing apparatus 900 is a communications device, the transceiver 903 may be a radio frequency circuit. When the signal processing apparatus 900 is a chip in a communications device, the transceiver 903 may be an input/output interface, a pin, a circuit, or the like in the chip.

The memory 902 may also be integrated into the processor 901. If the memory 902 and the processor 901 are mutually independent components, the memory 902 is connected to the processor 901. For example, the memory 902 and the processor 901 may communicate with each other by using the bus. The transceiver 903 and the processor 901 may communicate with each other by using the bus, or the transceiver 903 may be directly connected to the processor 901.

The memory 902 is configured to store an operation program, code, or an instruction for sequence-based signal processing. Optionally, the memory 902 includes an operating system and an application program, and is configured to store an operation program, code, or an instruction for sequence-based signal processing.

When the processor 901 or a hardware device needs to perform an operation related to sequence-based signal processing, the processor 901 or the hardware device may invoke and execute the operating program, the code, or the instruction stored in the memory 902, to complete a sequence-based signal processing process performed by the network device in FIG. 1 to FIG. 5. For a specific process, refer to a corresponding part in the foregoing embodiment of this application, and details are not described herein again.

It may be understood that, FIG. 9 shows merely a simplified design of the signal processing apparatus 900. During actual application, the signal processing apparatus 900 may include any quantity of interfaces, processors, memories, and the like, and all signal processing apparatuses 900 that can implement the embodiments of this application fall within the protection scope of the embodiments of this application.

Figure 10:
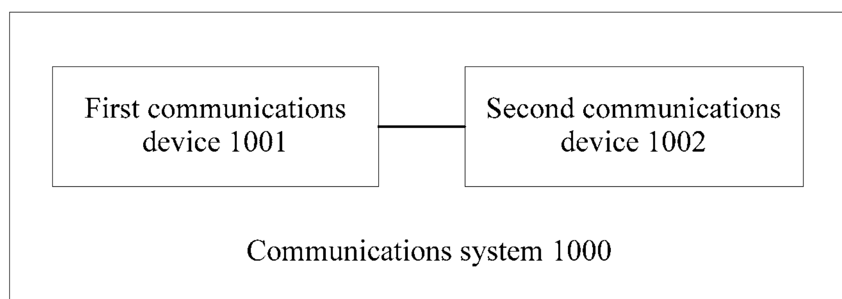
FIG. 10 is a schematic structural diagram of a communications system according to an embodiment of this application.

FIG. 10 is a communications system 1000 according to an embodiment of this application. The communications system 1000 includes a first communications device 1001 and a second communications device 1002. The first communications device 1001 is a device on a transmitter side, and the second communications device 1002 is a device on a receiver side.

The first communications device 1001 is configured to: determine a sequence $\{f_n\}$ consisting of N elements, respectively map the N elements in the sequence $\{f_n\}$ to N subcarriers to generate a first signal, and send the first signal to the second communications device 1002.

The second communications device 1002 is configured to: receive the first signal on the N subcarriers that is sent by the first communications device, obtain the N elements in the sequence $\{f_n\}$, and process the first signal based on the N elements in the sequence $\{f_n\}$.

A quantity of first communications devices 1001 and a quantity of second communications devices 1002 in the communications system disclosed in this embodiment of this application are not limited. The first communications device 1001 may be specifically the communications devices disclosed in FIG. 6 and FIG. 7. Optionally, the first communications device 1001 may be configured to perform corresponding operations performed by the terminal in FIG. 1 to FIG. 5 in the embodiments of this application. The second communications device 1002 may be specifically the communications devices disclosed in FIG. 8 and FIG. 9. Optionally, the second communications device 1002 may be configured to perform corresponding operations performed by the network device in FIG. 1 to FIG. 5 in the embodiments of this application. For a specific process and an execution principle, refer to the foregoing descriptions, and details are not described herein again.

Persons skilled in the art should be aware that in the foregoing one or more examples, functions described in this application may be implemented by hardware, software, firmware, or any combination thereof. When being implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a general-purpose or dedicated computer.

The embodiments in this specification are all described in a progressive manner, for same or similar parts in the embodiments, refer to these embodiments, and each embodiment focuses on a difference from other embodiments. Especially, apparatus and system embodiments are basically similar to the method embodiment, and therefore are described briefly; for related parts, refer to the descriptions in the method embodiment.

Finally, it should be noted that the foregoing embodiments are merely intended to describe examples of the technical solutions of this application instead of limiting this application. Although this application and benefits of this application are described in detail with reference to the foregoing embodiments, persons of ordinary skill in the art should understand that they may still make modifications to the technical solutions described in the foregoing embodiments or make equivalent replacements to some technical features thereof, without departing from the scope of the claims of this application.

The invention claimed is:

1. A sequence-based signal processing method comprising:

receiving, by a network device, a first signal occupying 24 subcarriers; and processing, by the network device, the first signal based on a sequence $\{f_n\}$, wherein $f_n$ is an element in the sequence $\{f_n\}$, $f_n$ meets $f_n = x_n \cdot e^{2\pi \cdot j \cdot a \cdot n}$, $0 \le n \le 23$, n is an integer, a is a real number, $x_n = e^{\pi \cdot j \cdot s_n/4}$, $s_n$ is an element in a sequence $\{s_n\}$ consisting of 24 elements, the sequence $\{s_n\}$ belongs to a sequence set, and the sequence set comprises the following sequences: {−3, 3, 1, 3, −1, 1, −3, 1, −3, 1, −1, −3, −1, −3, −3, −3, −3, −1, −1, −1, 1, 1, −3, −3}, {−1, −3, 3, 1, 1, −3, 1, −3, −3, 1, −3, −1, −1, 3, −3, 3, 3, 3, −3, 1, 3, 3, −3, −3}, {−1, −3, 3, −1, 3, 1, 3, −1, 1, −3, −1, −3, −1, 1, 3, −3, −1, −3, 3, 3, 3, −3, −3, −3}, {3, −1, 3, −1, 1, −3, 1, 1, −3, −3, 3, −3, −1, −1, −1, −1, −1, −3, −3, −1, 1, 1, −3, −3}, {3, −1, 1, −1, 3, −3, 1, 1, 3, −1, −3, 3, 1, −3, 3, −1, −1, −1, −1, 1, −3, −3, −3, −3}, {1, −3, 3, −1, −3, −1, 3, 3, 1, −1, 1, 1, 3, −3, −1, −3, −3, −3, −1, 3, −3, −1, −3, −3}, {−3, −1, 1, −3, −3, 1, 1, −3, 3, −1, −1, −3, 1, 3, 1, −1, −3, −1, −3, 1, −3, −3, −3, −3}, {−3, 1, −3, 1, −3, −3, 1, −3, 1, −3, −3, −3, −3, −3, 1, −3, −3, 1, 1, −3, 1, 1, −3, −3}, and {3, −3, −3, −1, 3, 3, −3, −1, 3, 1, 1, 1, 3, −1, 3, −3, −1, 3, −1, 3, 1, −1, −3}.

2. The signal processing method according to claim 1, wherein the sequence set further comprises at least one of the following sequences: {1, 1, −1, −3, −1, 1, 1, −3, 1, −1, 1, −3, 3, −3, −3, 3, −1, −3, 1, 3, −3, 1, −3, −3}, {−1, −3, −3, 1, −1, −1, −3, 1, 3, −1, −3, −1, −1, −3, 1, 1, 3, 1, −3, −1, −1, 3, −3, −3}, {3, −3, 3, −1, −3, 1, 3, 1, −1, −1, −3, −1, 3, −3, 3, −1, −1, 3, 3, −3, −3, 3, −3, −3}, {−1, 3, −3, −3, −1, 3, −1, −1, 1, 3, 1, 3, −1, −1, −3, 1, 3, 1, −1, −3, 1, −1, −3, −3}, {3, −3, −1, 1, 3, −1, −1, −3, −1, 3, −1, −3, −1, −3, 3, −1, 3, 1, 1, −3, 3, −3, −3, −3}, and {−1, 3, −1, −1, 3, 3, −1, −1, −1, 3, −1, −3, 1, 3, 1, 1, −3, −3, −3, −1, −3, −1, −3, −3}.

3. The signal processing method according to claim 1, wherein the 24 subcarriers are consecutive.

4. The signal processing method according to claim 1, wherein the 24 subcarriers are equally spaced.

5. The signal processing method according to claim 1, wherein the first signal is a reference signal.

6. The signal processing method according to claim 1, wherein the first signal is a signal carrying uplink control information (UCI).

7. A sequence-based signal processing apparatus comprising:

a storage medium including executable instructions; and a processor coupled to the storage medium wherein the executable instructions, when executed by the processor, cause the apparatus to:

receive a first signal occupying 24 subcarriers; and process the first signal based on a sequence $\{f_n\}$, wherein $f_n$ is an element in the sequence $\{f_n\}$, $f_n$ meets $f_n = x_n \cdot e^{2\pi \cdot j \cdot a \cdot n}$, $0 \le n \le 23$, n is an integer, a is a real number, $x_n = e^{\pi \cdot j \cdot s_n / 4}$, $s_n$ is an element in a sequence $\{s_n\}$ consisting of 24 elements, the sequence $\{s_n\}$ belongs to a sequence set, and the sequence set comprises the following sequences: {−3, 3, 1, 3, −1, 1, −3, 1, −3, 1, −1, −3, −1, −3, −3, −3, −3, −1, −1, −1, 1, 1, −3, −3}, {−1, −3, 3, 1, 1, −3, 1, −3, −3, 1, −3, −1, −1, 3, −3, 3, 3, 3, −3, 1, 3, 3, −3, −3}, {−1, −3, 3, −1, 3, 1, 3, −1, 1, −3, −1, −3, −1, 1, 3, −3, −1, −3, 3, 3, 3, −3, −3, −3}, {3, −1, 3, −1, 1, −3, 1, 1, −3, −3, 3, −3, −1, −1, −1, −1, −1, −3, −3, −1, 1, 1, −3, −3}, {3, −1, 1, −1, 3, −3, 1, 1, 3, −1, −3, 3, 1, −3, 3, −1, −1, −1, −1, 1, −3, −3, −3, −3}, {1, −3, 3, −1, −3, −1, 3, 3, 1, −1, 1, 1, 3, −3, −1, −3, −3, −3, −1, 3, −3, −1, −3, −3}, {−3, −1, 1, −3, −3, 1, 1, −3, 3, −1, −1, −3, 1, 3, 1, −1, −3, −1, −3, 1, −3, −3, −3, −3}, {−3, 1, −3, 1, −3, −3, 1, −3, 1, −3, −3, −3, −3, −3, 1, −3, −3, 1, 1, −3, 1, 1, −3, −3}, and {3, −3, −3, −1, 3, 3, −3, −1, 3, 1, 1, 1, 3, −1, 3, −3, −1, 3, −1, 3, 1, −1, −3}.

8. The signal processing apparatus according to claim 7, wherein the sequence set further comprises at least one of the following sequences: {1, 1, −1, −3, −1, 1, 1, −3, 1, −1, 1, −3, 3, −3, −3, 3, −1, −3, 1, 3, −3, 1, −3, −3}, {−1, −3, −3, 1, −1, −1, −3, 1, 3, −1, −3, −1, −1, −3, 1, 1, 3, 1, −3, −1, −1, 3, −3, −3}, {3, −3, 3, −1, −3, 1, 3, 1, −1, −1, −3, −1, 3, −3, 3, −1, −1, 3, 3, −3, −3, 3, −3, −3}, {−1, 3, −3, −3, −1, 3, −1, −1, 1, 3, 1, 3, −1, −1, −3, 1, 3, 1, −1, −3, 1, −1, −3, −3}, {3, −3, −1, 1, 3, −1, −1, −3, −1, 3, −1, −3, −1, −3, 3, −1, 3, 1, 1, −3, 3, −3, −3, −3}, and {−1, 3, −1, −1, 3, 3, −1, −1, −1, 3, −1, −3, 1, 3, 1, 1, −3, −3, −3, −1, −3, −1, −3, −3}.

9. The signal processing apparatus according to claim 7, wherein the 24 subcarriers are consecutive.

10. The signal processing apparatus according to claim 7, wherein the 24 subcarriers are equally spaced.

11. The signal processing apparatus according to claim 7, wherein the first signal is a reference signal.

12. The signal processing apparatus according to claim 7, wherein the first signal is a signal carrying uplink control information (UCI).

13. A non-transitory computer-readable storage medium comprising computer-executable instructions, wherein the computer-executable instructions, when executed by a computer, cause the computer to:

receive a first signal occupying 24 subcarriers; and process the first signal based on a sequence $\{f_n\}$, wherein $f_n$ is an element in the sequence $\{f_n\}$, $f_n$ meets $f_n = x_n \cdot e^{2\pi \cdot j \cdot a \cdot n}$, $0 \le n \le 23$, n is an integer, a is a real number, $x_n = e^{\pi \cdot j \cdot s_n / 4}$, $s_n$ is an element in a sequence $\{s_n\}$ consisting of 24 elements, the sequence $\{s_n\}$ belongs to a sequence set, and the sequence set comprises the following sequences: {−3, 3, 1, 3, −1, 1, −3, 1, −3, 1, −1, −3, −1, −3, −3, −3, −3, −1, −1, −1, 1, 1, −3, −3}, {−1, −3, 3, 1, 1, −3, 1, −3, −3, 1, −3, −1, −1, 3, −3, 3, 3, 3, −3, 1, 3, 3, −3, −3}, {−1, −3, 3, −1, 3, 1, 3, −1, 1, −3, −1, −3, −1, 1, 3, −3, −1, −3, 3, 3, 3, −3, −3, −3}, {3, −1, 3, −1, 1, −3, 1, 1, −3, −3, 3, −3, −1, −1, −1, −1, −1, −3, −3, −1, 1, 1, −3, −3}, {3, −1, 1, −1, 3, −3, 1, 1, 3, −1, −3, 3, 1, −3, 3, −1, −1, −1, −1, 1, −3, −3, −3, −3}, {1, −3, 3, −1, −3, −1, 3, 3, 1, −1, 1, 1, 3, −3, −1, −3, −3, −3, −1, 3, −3, −1, −3, −3}, {−3, −1, 1, −3, −3, 1, 1, −3, 3, −1, −1, −3, 1, 3, 1, −1, −3, −1, −3, 1, −3, −3, −3, −3}, {−3, 1, −3, 1, −3, −3, 1, −3, 1, −3, −3, −3, −3, −3, 1, −3, −3, 1, 1, −3, 1, 1, −3, −3}, and {3, −3, −3, −1, 3, 3, −3, −1, 3, 1, 1, 1, 3, −1, 3, −3, −1, 3, −1, 3, 1, −1, −3, −3}.

14. The non-transitory computer-readable storage medium according to claim 13, wherein the sequence set further comprises at least one of the following sequences: {1, 1, −1, −3, −1, 1, 1, −3, 1, −1, 1, −3, 3, −3, −3, 3, −1, −3, 1, 3, −3, 1, −3, −3}, {−1, −3, −3, 1, −1, −1, −3, 1, 3, −1, −3, −1, −1, −3, 1, 1, 3, 1, −3, −1, −1, 3, −3, −3}, {3, −3, 3, −1, −3, 1, 3, 1, −1, −1, −3, −1, 3, −3, 3, −1, −1, 3, 3, −3, −3, 3, −3, −3}, {−1, 3, −3, −3, −1, 3, −1, −1, 1, 3, 1, 3, −1, −1, −3, 1, 3, 1, −1, −3, 1, −1, −3, −3}, {3, −3, −1, 1, 3, −1, −1, −3, −1, 3, −1, −3, −1, −3, 3, −1, 3, 1, 1, −3, 3, −3, −3, −3}, and {−1, 3, −1, −1, 3, 3, −1, −1, −1, 3, −1, −3, 1, 3, 1, 1, −3, −3, −3, −1, −3, −1, −3, −3}.

15. The non-transitory computer-readable storage medium according to claim 13, wherein the 24 subcarriers are consecutive.

16. The non-transitory computer-readable storage medium according to claim 13, wherein the 24 subcarriers are equally spaced.

17. The non-transitory computer-readable storage medium according to claim 13, wherein the first signal is a reference signal.

18. The non-transitory computer-readable storage medium according to claim 13, wherein the first signal is a signal carrying uplink control information (UCI).

* * * * *

UNITED STATES PATENT AND TRADEMARK OFFICE
CERTIFICATE OF CORRECTION

PATENT NO. : 11,464,032 B2
APPLICATION NO. : 16/991141
DATED : October 4, 2022
INVENTOR(S) : Qu et al.

Page 1 of 1

It is certified that error appears in the above-identified patent and that said Letters Patent is hereby corrected as shown below:

In the Claims

Claim 1: Column 42, Line 58: "3, -1, 3, 1, -1, -3}." should read -- 3, -1, 3, 1, -1, -3, -3}. --.

Claim 7: Column 43, Line 40: "1, -1, -3}." should read -- 1, -1, -3, -3}. --.

Signed and Sealed this
Twenty-first Day of March, 2023

*Katherine Kelly Vidal*

Katherine Kelly Vidal
*Director of the United States Patent and Trademark Office*